United States Patent
Hart et al.

(10) Patent No.: US 11,012,477 B2
(45) Date of Patent: *May 18, 2021

(54) METHODS, APPARATUS AND SYSTEMS TO INCREASE MEDIA RESOURCE FUNCTION AVAILABILITY

(71) Applicant: Ribbon Communications Operating Company, Inc., Westford, MA (US)

(72) Inventors: Justin Hart, Purton (GB); Ashish Sharma, Bangalore (IN); Nagesh Kumar Bollapalli, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,402

(22) Filed: Jan. 3, 2019

(65) Prior Publication Data

US 2019/0141084 A1    May 9, 2019

Related U.S. Application Data

(63) Continuation of application No. 14/812,999, filed on Jul. 29, 2015, now Pat. No. 10,205,753.

(30) Foreign Application Priority Data

Jun. 9, 2015  (IN) .......................... 2878/CHE/2015

(51) Int. Cl.
  *H04L 29/06* (2006.01)
  *H04L 12/26* (2006.01)
  (Continued)

(52) U.S. Cl.
  CPC ...... *H04L 65/1006* (2013.01); *H04L 41/0668* (2013.01); *H04L 43/0811* (2013.01);
  (Continued)

(58) Field of Classification Search
  CPC .................................................. H04L 65/1006
  See application file for complete search history.

(56) References Cited

U.S. PATENT DOCUMENTS 9,253,326 B2 *  2/2016  Kumarasamy .......... H04M 3/53
2007/0071221 A1 *  3/2007  Allen .................... H04L 61/157
                                                      379/265.01

(Continued)

*Primary Examiner* — Esther B. Henderson
(74) *Attorney, Agent, or Firm* — Straub & Straub; Stephen T. Straub; Michael P. Straub

(57) ABSTRACT

Communications methods, apparatus and systems for detecting a status condition indicative of a failure of a media processing entity and providing media redirection to increase media resource function availability. One embodiment of the present invention is a method that includes directing, by a first Session Border Controller (SBC), a first media call flow of a first call through a first media content processing entity to a second SBC, detecting, at one of said first or second SBCs, a status condition indicative of a failure condition for the first media content processing entity, and redirecting, by the SBC that detects the status condition indicative of a failure condition, the first media call flow for the first call so that the first media call flow passes through a second media content processing entity instead of through the first media content processing entity without terminating the first call.

20 Claims, 21 Drawing Sheets

(51) Int. Cl.
*H04L 12/24* (2006.01)
*H04L 29/14* (2006.01)
(52) U.S. Cl.
CPC ............ *H04L 65/608* (2013.01); *H04L 65/80* (2013.01); *H04L 69/40* (2013.01)

(56) References Cited

U.S. PATENT DOCUMENTS

| | | | | |
|---|---|---|---|---|
| 2007/0258456 | A1* | 11/2007 | Khouderchah | H04L 12/4633 370/392 |
| 2009/0055540 | A1* | 2/2009 | Foti | H04L 65/4076 709/228 |
| 2010/0034079 | A1* | 2/2010 | Boucadair | H04L 29/06027 370/218 |
| 2010/0265940 | A1* | 10/2010 | Tenenti | H04L 65/40 370/389 |
| 2012/0294159 | A1* | 11/2012 | Sridhar | H04L 43/08 370/252 |
| 2012/0294302 | A1* | 11/2012 | Ku | H04L 65/1016 370/352 |
| 2016/0050079 | A1* | 2/2016 | Martin De Nicolas | H04M 3/565 455/416 |

* cited by examiner

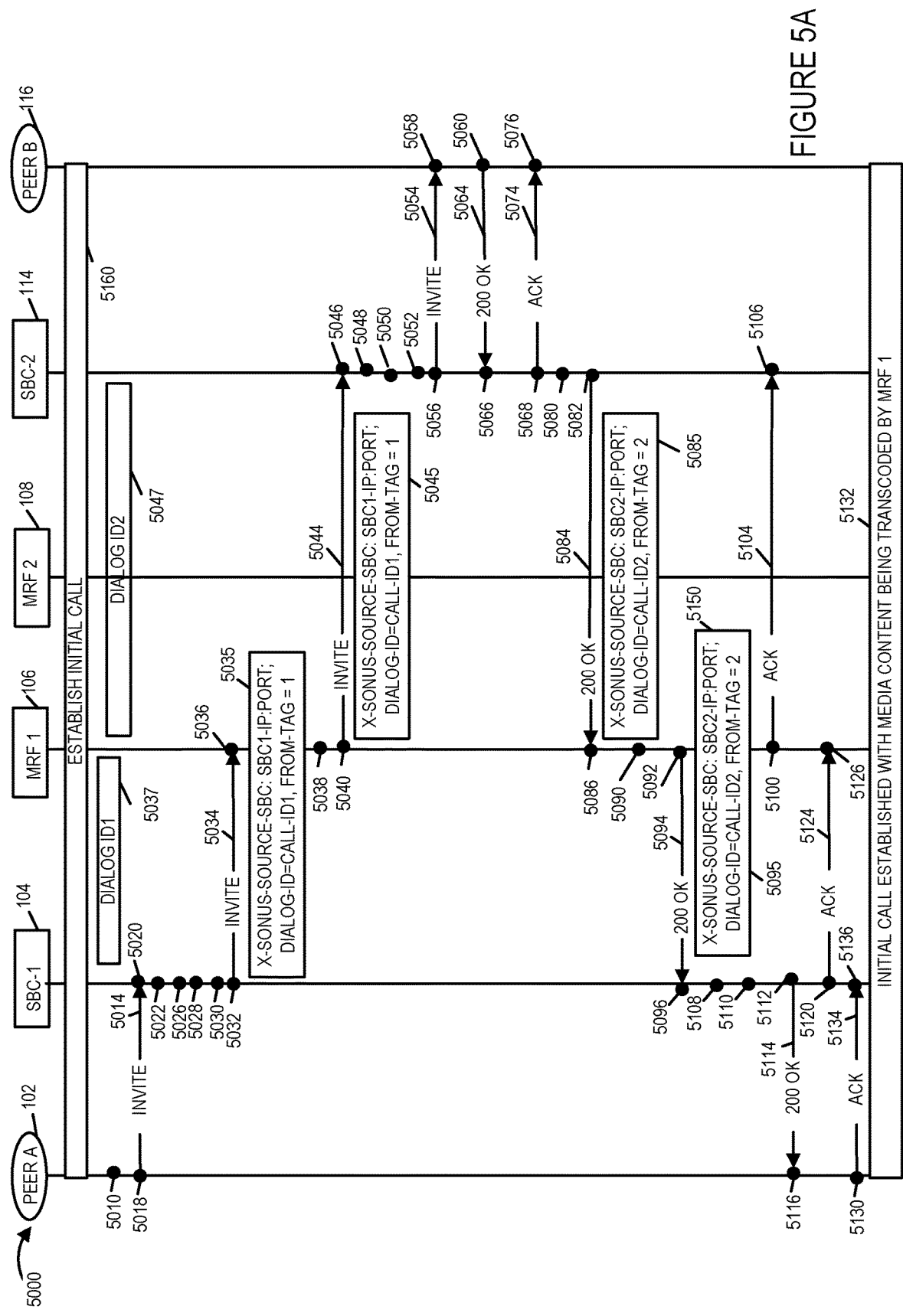

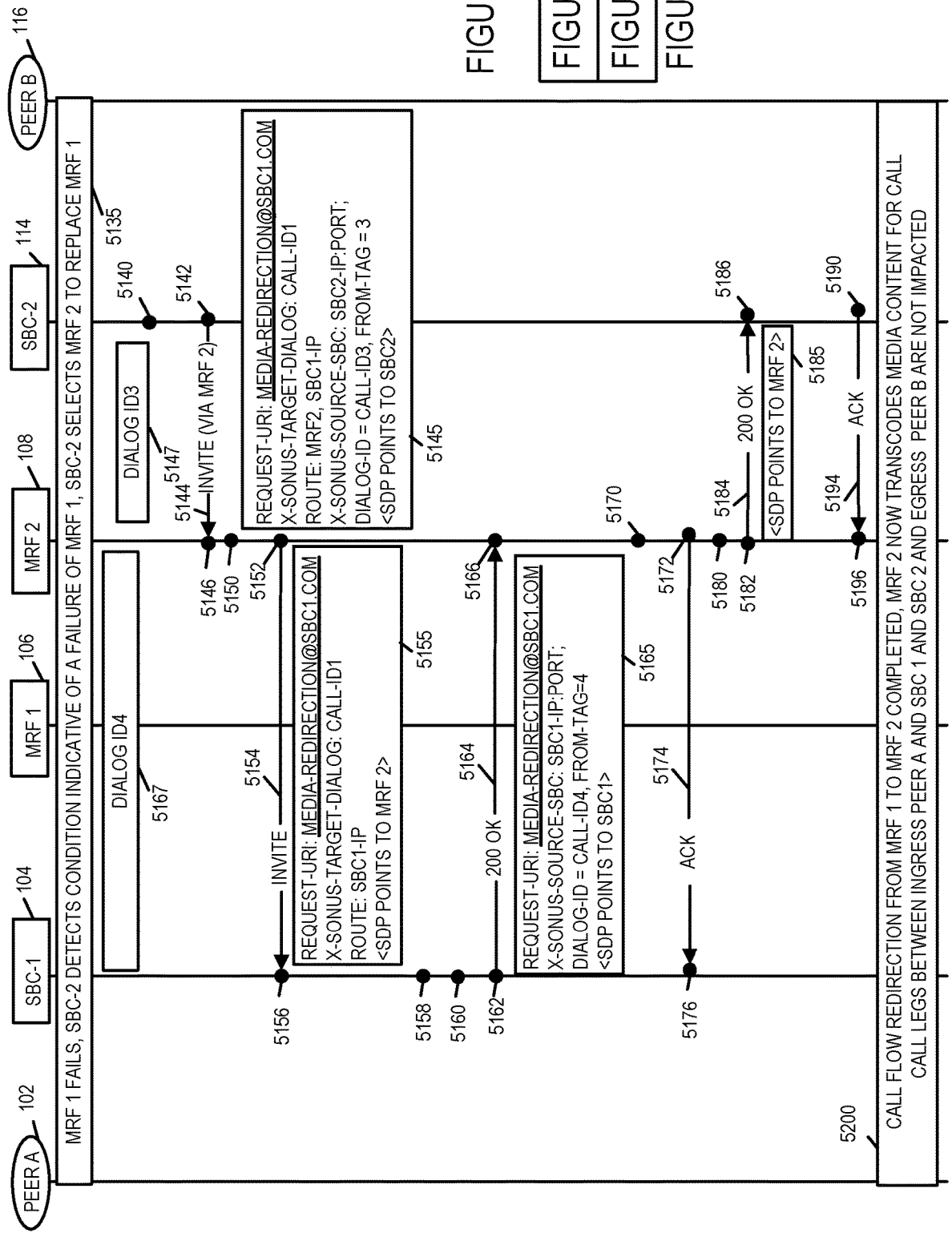

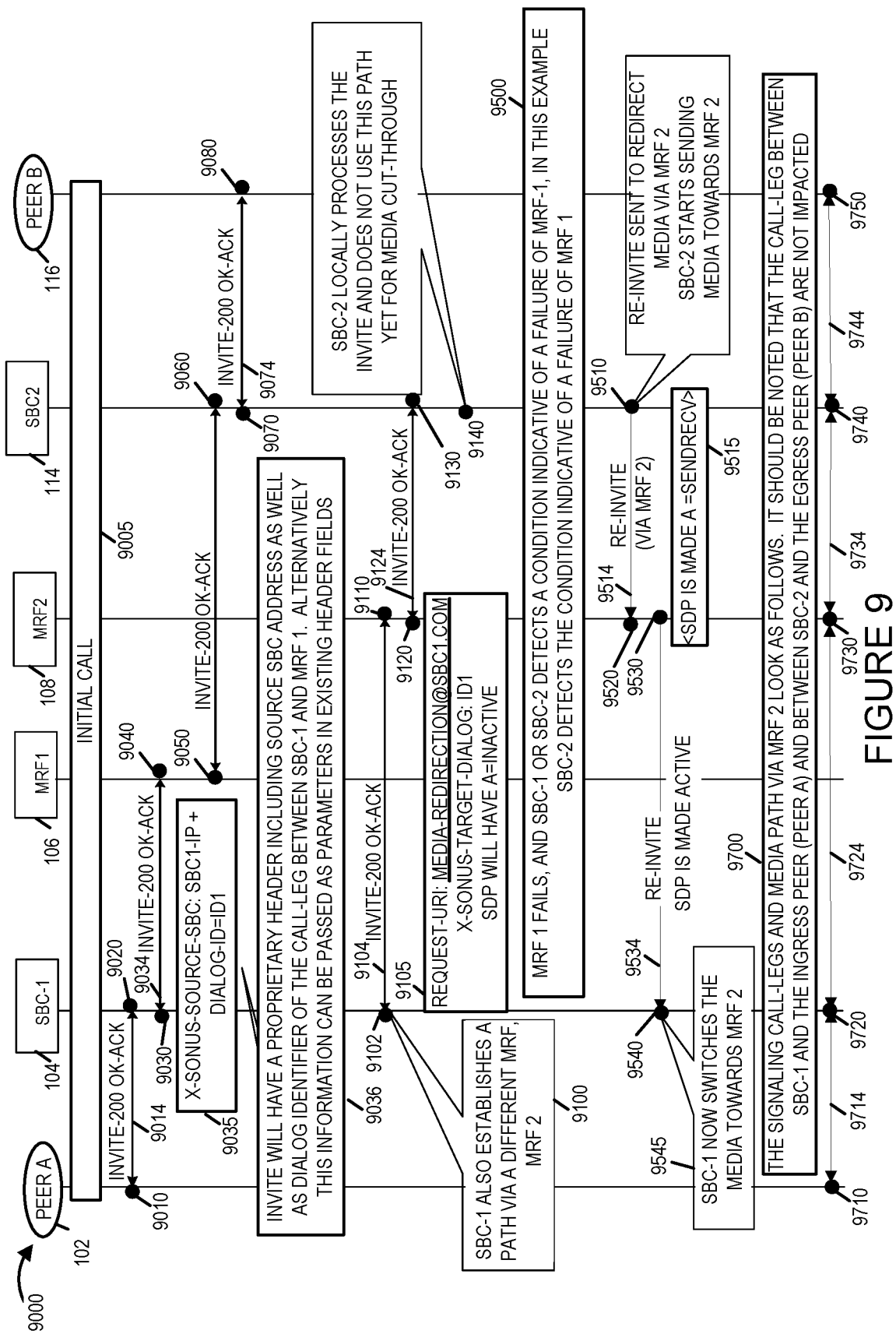

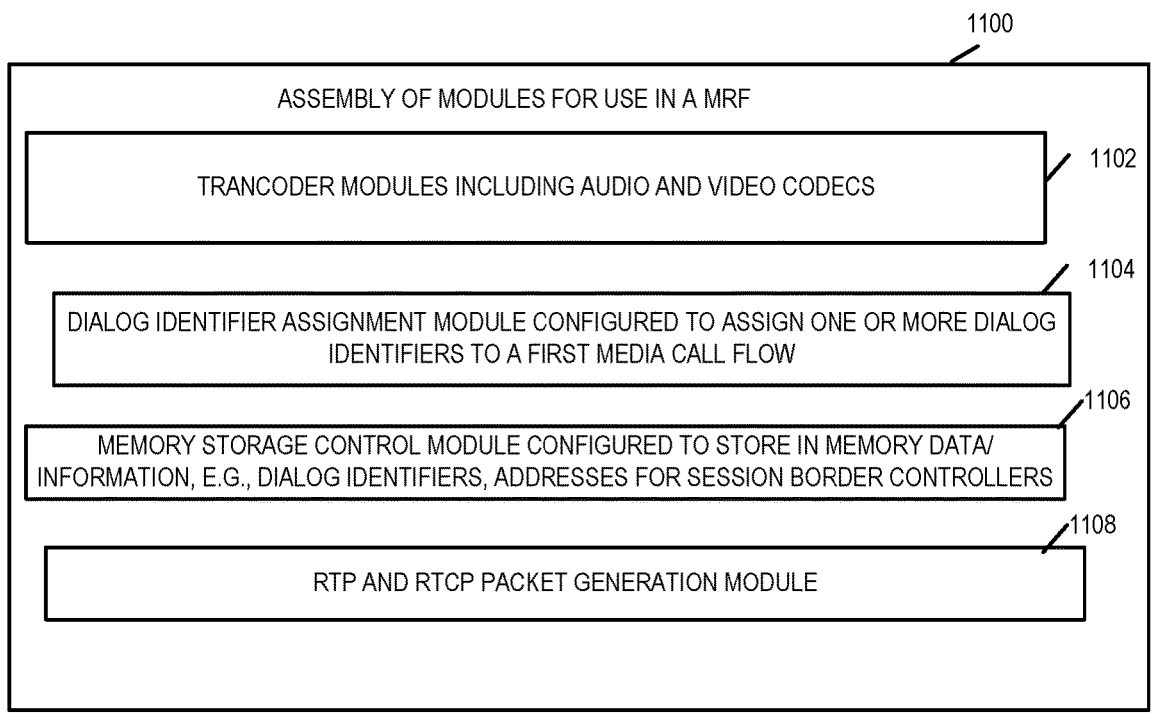
FIGURE 11
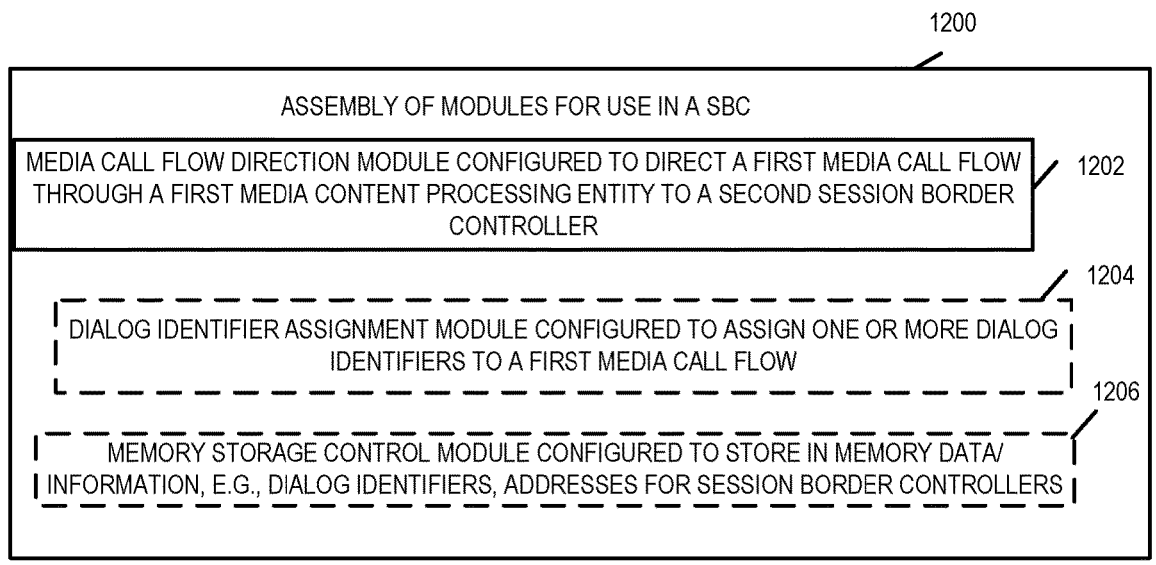
FIGURE 12A
| FIGURE 12A |
| FIGURE 12B |
| FIGURE 12C |
FIGURE 12

METHODS, APPARATUS AND SYSTEMS TO INCREASE MEDIA RESOURCE FUNCTION AVAILABILITY

RELATED APPLICATION

The present application is a continuation of U.S. patent application Ser. No. 14/812,999 filed on Jul. 29, 2015 and published on Dec. 16, 2016 as U.S. Patent Application Publication No. US 2016-0366189 A1 which claims the benefit of the filing date of Indian Provisional Application S.N. 2878/CHE/2015 which was filed on Jun. 9, 2015 all of which are hereby expressly incorporated by reference in their entirety.

FIELD

The present invention relates to communications methods, apparatus and systems and more particularly to detecting a failure of a MRF apparatus and providing media redirection between nodes to increase Media Resource Function (MRF) support and availability when Media Resource Function High Availability functionality is limited and/or not supported.

BACKGROUND

With the advent and proliferation of different technologies, each of which optimized different access-types and each of which employ different codecs, it is not an uncommon phenomenon that a call gets transcoded as it traverses various networks employing different kinds of technology. For example, different codecs are used for coding and decoding voice traffic carried in different networks. By way of example, in LTE networks Adaptive Multi-Rate codecs are used for voice; in CDMA networks Enhanced Variable-Rate Codecs (EVRCs) are used for voice, in Web Real-time Communication (WebRTC) networks OPUS codecs are used for voice; and in traditional Public Switched Telephone Networks (PSTNs) G711 codecs are used for voice. In a similar way, different codecs are employed for the transmission of video across different networks optimized for technologies. For example, in LTE networks the use of H.264 codecs is recommended for video while in a WebRTC network VP8 codecs are used for video transmission.

With unified communications, a user accesses the same set of services from multiple accesses using different types of endpoint equipment. For example, the same service may be, and often is, accessed by a user through a mobile smart phone having LTE access, through a web-browser on the mobile smart phone or a computer using WebRTC access. This necessitates the need for transcoding as the services are invoked by various users employing a mix of technologies. This transcoding is not just for audio streams but also for video streams. For example, to access a cloud-based video conferencing service, the clients (i.e., user device and related applications) may use either the more-prevalent H.264 based client and associated codec or may use the more recent WebTRC recommended VP8 based client and associated codec.

Session Border Controllers (SBCs) employed in these networks therefore need to be able to provide transcoding not only for audio streams but also video streams. SBC nodes typically provide video transcoding by invoking Media Resource Function nodes and/or equipment referred to herein as MRFs, which have specialized functions to provide audio and video transcoding. The SBCs typically invoke an MRF using a Session Initiation Protocol (SIP) based interface. With recent trends, software MRFs have become more common. While these software MRFs provide transcoding, they do not have built in High Availability (HA) functionality.

In view of the above discussion, there is a need for new methods and apparatus to provide media redirection between (the logical ingress and egress) SBC(s) with the ability to switch between different MRFs as a way to address the lack of High Availability functionality in some MRFs.

In view of the above discussion, there is also a need for new methods and apparatus for providing media redirection from a currently selected MRF (which is providing transcoding) towards a different MRF in such a way that the actual peers/clients receiving service from the currently selected MRF continue to receive service without any additional signaling towards the actual peers/clients.

In view of the above discussion, there is also a need for new methods and apparatus that provide MRF redundancy and resiliency and is transparent from the end users perspective.

In view of the above discussion, there is also a need for new methods and apparatus for minimizing the time it takes to detect a status condition indicative of a failure of a MRF.

In view of the above discussion, there is also a need to minimize the signaling required to redirect a media call flow from a first MRF to a second MRF after the detection of a status condition indicative of a failure of a MRF so as to minimize the interruption in the call experienced by the end devices of the media call flow.

SUMMARY

The present invention includes communications methods, apparatus and systems directed to detecting a failure condition of a media content processing entity and providing media redirection between nodes to increase media content processing when high availability media content processing functionality is limited and/or not supported. For example, in some methods and apparatus in accordance with some embodiments of the present invention SBCs monitors for a failure condition of an active Media Resource Function (MRF) and upon detection of the failure condition provides/performs media redirection to another MRF for one or more media call flows being serviced by the MRF detected as failing when Media Resource Function High Availability functionality is limited and/or not supported.

The present invention provides new methods, apparatus and systems that address one or more of the needs identified above.

An exemplary communications method in accordance with one embodiment of the present invention comprises directing, by a first Session Border Controller, a first media call flow through a first media content processing entity to a second Session Border Controller, said first media content processing entity, performing a media content processing function on the first media call flow, said first media call flow being part of a first call, detecting, at one of said first or second Session Border Controllers, a status condition indicative of a failure condition for the first media content processing entity, and redirecting, by the Session Border Controller that detects the status condition indicative of a failure condition, the first media call flow for the first call so that the first media call flow passes through a second media content processing instead of through the first media content processing entity (first Multimedia Resource Function apparatus) without terminating the first call. In some embodiments of the present invention, the communications method the redirecting of the first media call flow for the first call is performed in a manner that isolates endpoint devices from the signaling to redirect the first media call flow, said endpoint devices being user devices at which the first call was originated or terminated.

In some embodiments of the present invention, the first and second media content processing entities are Multimedia Resource Function entities that perform either transcoding, transrating or transizing on at least a portion of the media of the media call flow. In some embodiments of the present invention media content of the first media call flow includes at least one of audio, video, or auxiliary and the first and second media processing entities perform said transcoding, transrating or transizing on at least a portion of said audio, said video, or said auxiliary-video.

In some embodiments of the present invention, the detecting, at one of said first or second Session Border Controllers, a status condition indicative of a failure condition for the first media content processing entity of the exemplary method includes: (i) monitoring at least one of the first media call flow or a plurality of media call flows passing through the first media processing entity to the Session Border Controller performing the detection for a status condition, said status condition being a media inactivity period, (ii) detecting the media inactivity period, (iii) and determining if the media inactivity period is greater than a predetermined threshold, a period of media inactivity greater than said predetermined threshold being indicative of a failure condition of the first media processing entity.

In some embodiments of the present invention, the first media processing content entity performing a media content processing function on the first media call flow is a first Multimedia Resource Function apparatus that performs a transcoding function on said first media call flow, the first media call flow including a Real Time Transport Protocol (RTP) packet stream including a plurality of RTP packets, the media inactivity period being a period of time during which a consecutive number of the plurality of RTP packets passing through the first media content processing entity are not received by the Session Border Controller performing the detection and said predetermined threshold being determined based on the transcoding function being performed.

In some embodiments the detecting said media inactivity period step of the method includes at least one of: (i) determining for the first media call flow how many consecutive Real Time Transport Packets are not received by the Session Border Controller performing the detection over a first predetermined time period or(ii) determining for the plurality of media call flows passing through the first media processing entity and to the Session Border Controller performing the detection how many consecutive Real Time Transport Packets are lost over a second predetermined time period, said second predetermined time period being based on the encoding/decoding schemes being employed on the plurality of media call flows and the number of said plurality of media call flows.

The present invention is also directed to apparatus including systems. In an exemplary system in accordance with present invention, the system includes a first Session Border Controller including a media call flow direction module configured to direct a first media call flow through a first media content processing entity to a second Session Border Controller, the first media call flow being part of a first call; the second Session Border Controller including an Input/Output interface configured to receive said first media call flow; said first media content processing entity configured to perform a media content processing function on the first media call flow; and at least one of said first and second Session Border Controllers including a detection module configured to detect a status condition indicative of a failure condition for the first media content processing entity and a redirection module configured to redirect the first media call flow for the first call so that the first media call flow passes through a second media content processing entity (second Multimedia Resource Function apparatus) instead of through the first media content processing entity without terminating the first call when said detection module detects a status condition indicative of a failure condition for the first media content processing entity.

In some embodiments, the communications system includes a redirection module which is further configured to isolate endpoint devices from the signaling performed to redirect the first media call flow, the endpoint devices being user devices at which the first call was originated or terminated.

In some embodiments of the present invention, the first and second media content processing entities of the system are either Multimedia Resource Function apparatus or media recording servers.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 5 comprises the combination of FIG. 5A and FIG. 5B.

FIG. 5A illustrates a first part of an exemplary signaling diagram and method in accordance with an exemplary embodiment of the present invention.

FIG. 5B illustrates a second part of an exemplary signaling diagram and method in accordance with an exemplary embodiment of the present invention.

FIG. 6 comprises the combination of FIGS. 6A, 6B, 6C and 6D.

FIG. 9 illustrates an exemplary signaling diagram and method in accordance with an exemplary embodiment of the present invention.

FIG. 11 illustrates an exemplary assembly of modules for use in a media content processing entity, e.g., MRF, in accordance with an embodiment of the present invention.

FIG. 12 comprises FIGS. 12A, 12B, and 12C.

FIG. 12A illustrates a first part of an exemplary assembly of modules for use in a Session Border Controller in accordance with an exemplary embodiment of the present invention.

DETAILED DESCRIPTION

The present invention relates to methods and apparatus for using media redirection to increase MRF availability. The invention is particularly useful as an alternative method of providing reliable MRF functionality when the MRFs being utilized do not support or support only a limited form of High Availability functionality. The present invention further relates to new methods and apparatus for identifying when MRFs are experiencing problems and re-anchoring a media stream from the MRF experiencing problems to another MRF service without affecting the signaling toward the user devices of the media stream.

Figure 1:
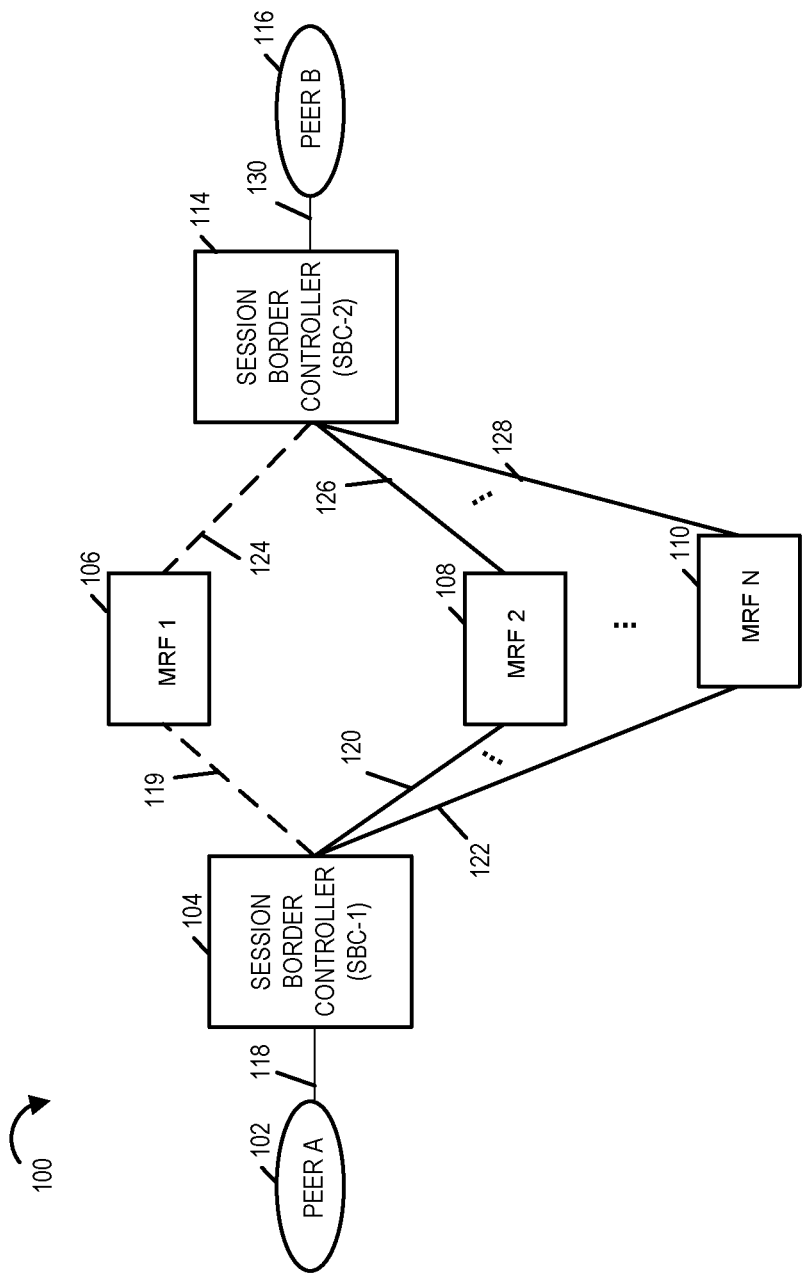
FIG. 1 illustrates an exemplary system implemented in accordance with an exemplary embodiment of the invention.

FIG. 1 is a drawing illustrating an exemplary communications system in accordance with an embodiment of the present invention. FIG. 1 includes a Peer node A 102, a Session Border Controller (SBC-1) 104, a MRF node 1 (MRF 1) 106, a MRF node 2 (MRF2) 108, . . . , MRF node N 110, a Session Border Controller (SBC-2) 114, a peer B 116, and communication links 118, 119, 120, . . . , 122, 124, 126, . . . , 128, and 130. The Peer node A 102 is coupled to SBC-1 104 via communication link 118. SBC-1 104 is coupled to MRF 1 106, MRF 2 108, . . . , MRF N 110 via communication links 119, 120, . . . , 122 respectively. SBC-2 114 is coupled to MRF 1 106, MRF 2 108, . . . , MRF N 110 via communication links 124, 126, . . . , 128 respectively. SBC-2 114 is coupled to peer B 116 via communication link 130. In the exemplary embodiment peer nodes A and B are user equipment such as for example, smart phones.

Figure 2:
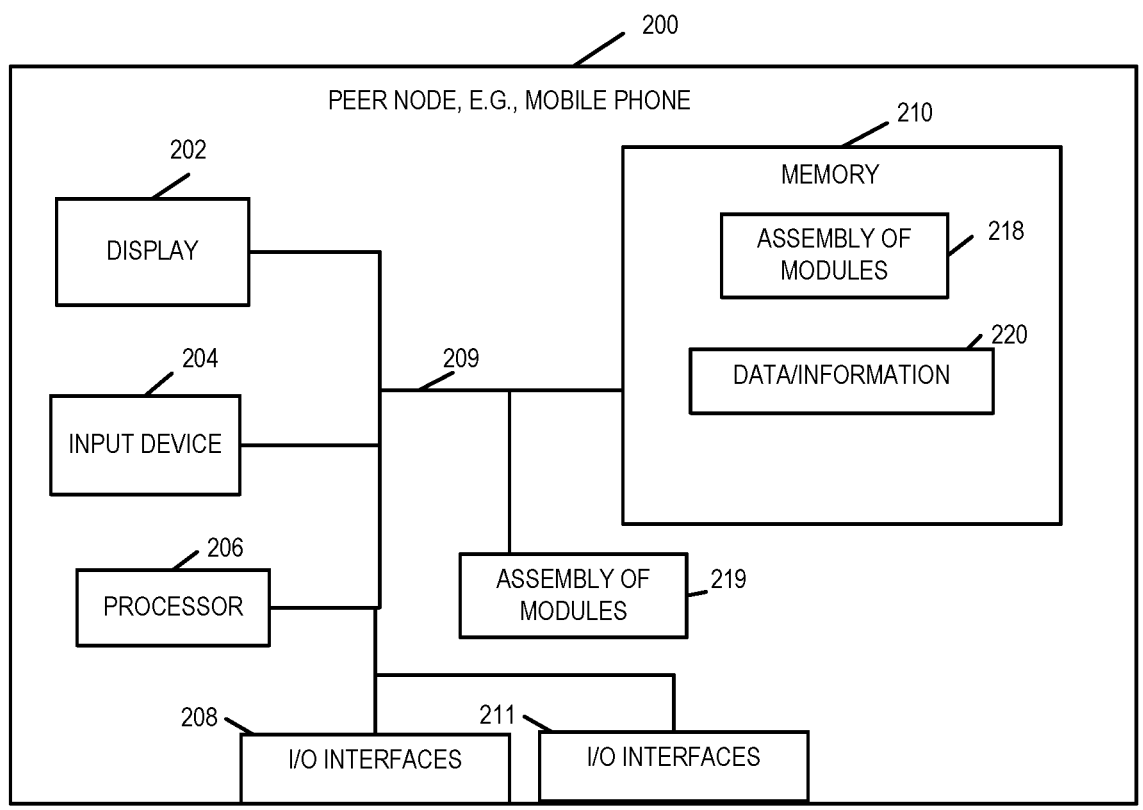
FIG. 2 illustrates an exemplary peer node in accordance with an exemplary embodiment of the invention.

FIG. 2 illustrates an exemplary embodiment of a peer node in accordance with one embodiment of the present invention. Exemplary peer node 200 includes a display 202, an input device 204 such as a keypad, a processor 206, e.g., a CPU, I/O interfaces 208 and 211 which include receivers and transmitters, which couple the peer node to various devices such as SBCs and networks, memory 210, and an assembly of modules 219, e.g., circuits corresponding to different modules, coupled together via a bus 209 over which the various elements may interchange data and information. Memory 210 includes an assembly of modules 218, e.g., an assembly of software modules, and data/information 220. The assembly of modules 219 and/or 218 include modules for communicating over Internet Protocol networks using Session Initiation Protocol (SIP) and Session Description Protocol (SDP). The exemplary Peer A node 102 and Peer B node 116 shown in FIG. 1, 5, respectively are in some embodiments implemented in accordance with exemplary Peer node 200 of FIG. 2. The exemplary peer node 200 may, and in some embodiments is, implemented as a device such a Voice Over Internet Phone, a mobile phone, smartphone, tablet, laptop computer or other communications device.

Figure 3:
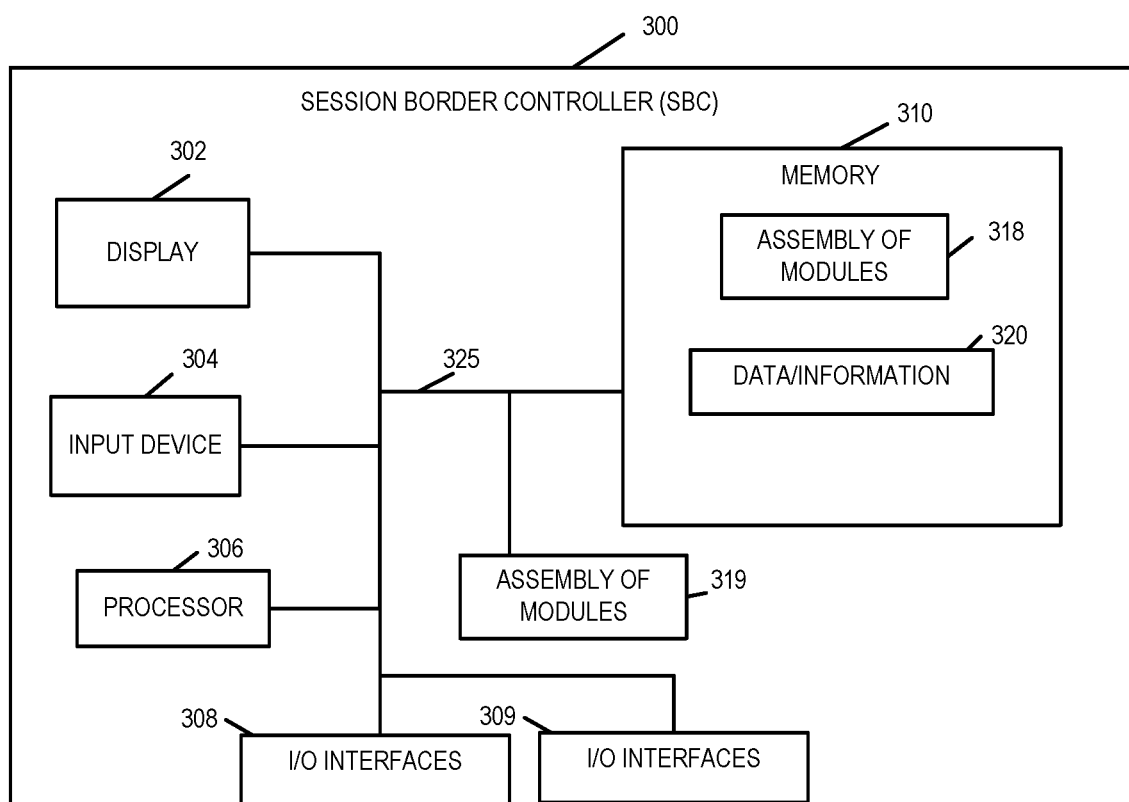
FIG. 3 illustrates an exemplary Session Border Controller in accordance with an exemplary embodiment of the invention.

FIG. 3 illustrates an exemplary embodiment of a Session Border Controller in accordance with one embodiment of the present invention.

Exemplary session border controller 300 includes a display 302, an input device 304, a processor 306, e.g., a CPU, I/O interfaces 308 and 309, which couple the SBC to a core network or various other devices including peer nodes, MRF nodes and user equipment, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320.

Figure 4:
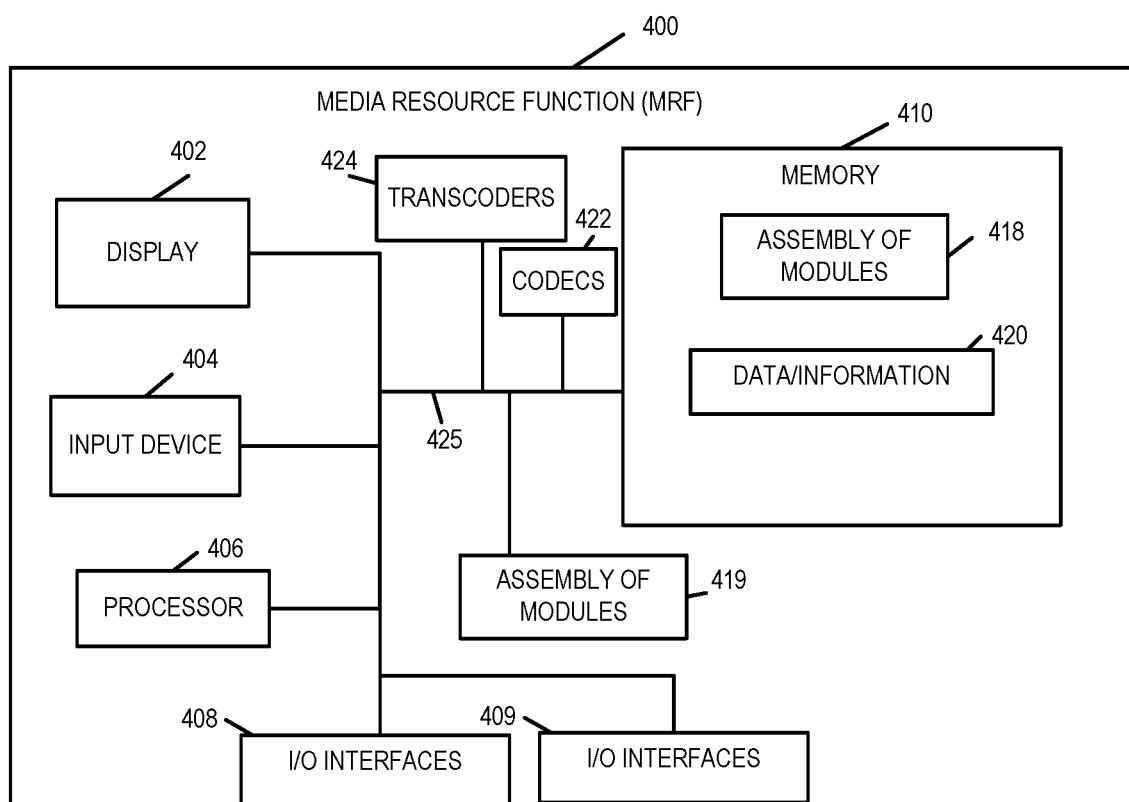
FIG. 4 illustrates an exemplary media content processing entity implemented as a Media Resource Function in accordance with an exemplary embodiment of the present invention.

FIG. 4 illustrates an exemplary embodiment of a Media Function Resource node 400 in accordance with one embodiment of the present invention. Exemplary MRF 400 includes a display 402, an input device 404, a processor 406, e.g., a CPU, I/O interfaces 408 and 409, which couple the MRF to a core network or various other devices such as for example SBCs, codecs 422 such as audio and video codecs used for coding and decoding various media signals, transcoders 424 used for transcoding media signals, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420.

In connection with exemplary embodiment of FIG. 1, Session Initiation Protocol (SIP) is used to manage communication streams, e.g., multimedia Voice Over Internet Protocol (VOIP) telephone calls over the communication links of the networks. The Peers A 102 and B 116 may be, and in some embodiments are, end user equipment such as smartphones. The Session Border Controllers SBC-1 104 and SBC-2 114 invoke Multimedia Resource Functions to perform services, e.g., transcoding of the audio and video, for the multimedia VOIP calls between Peer A 102 and Peer B 116. There are two modes by which an SBC invokes an MRF, e.g., SBC-1 104 invokes an MRF, e.g., MRF 1 106. The first mode of invocation is as a Back-to-Back User Agent (B2BUA) mode of invocation in which the MRF acts as a B2BUA. In this mode of invocation the MRF acts as a SIP Back-to-Back User Agent between both (logical) SBCs of a communication session. The MRF divides the communication channel into two call legs and manages the SIP signaling between both ends of the call from session establishment to session termination. With respect to the originating leg of the communication session the MRF acts as a SIP User Agent Server (UAS) and processes the request as a SIP User Agent Client (UAC) to the destination end in this way it processes the SIP signaling between the end points in a back-to-back manner. The second mode by which a SBC invokes an MRF for transcoding services is by the method described in the Internet Engineering Task Force Request for Comment 4117 entitled "Transcoding Services Invocation in the Session Initiation Protocol (SIP) Using Third Party Call Control (3pcc)."

An exemplary method of the present invention is now explained using the exemplary system 100 of FIG. 1 in which Peer A 102 is a user device such as a smartphone which has initiated a VOIP call to Peer B 116 a cellphone. In FIG. 1, the ingress SBC-1 104 receives a VOIP call over communications link 118 and invokes MRF-1 106 for transcoding. MRF-1 106 does not provide High Availability or redundancy functionality. SBC-1 104 sends the call to MRF-1 106 over communication link 119. MRF-1 106 receives the call and acts as a B2BUA and forwards the call after transcoding the media to the egress SBC-2 114 over communication link 124. The MRF 1 106 receives the address of the egress SBC-2 114 from the SBC-1 when it invokes MRF 1 106. The dashed lines of communication links 119 and 124 indicate the media path after the MRF1 106 has been invoked. The media path for the VOIP call is now anchored at MRF 1 106 which performs transcoding services for the call, such as audio/video transcoding. The egress SBC-2 114 sends the call to Peer B 116 over communication link 130. Once the call is setup the media path for the call includes MRF-1 106 so that it can transcode the media. When one of the SBCs, detect that there are problems or potential problems with the call media path and/or the MRF 1, e.g., MRF 1 is not functioning properly because of failure or other reasons, the media path for the call is redirected via a different MRF such as any of MRF 2 108, . . . , MRF N 110 which are available and functioning. In this example, the media path for the call is redirected via MRF2 108, e.g., over communication links 120 and 126. Since the SBC acts as a B2BUA and terminates the Session Description Protocol/media on both call-legs locally, there is no additional signaling towards Peer A 102 and Peer B 116 and the media redirection is handled locally between the SBC-1 104 and SBC-2 114. By redirecting the media path, the system 100 has been able to provide MRF functionality for the call even after the original MRF anchoring the call, MRF-1, has failed/crashed and/or experienced other operational problems causing it to cease to provide proper MRF functionality. This method provides redundancy and resiliency and is transparent from the end users perspective, e.g., users of Peer A 102 and Peer B 116 devices in this example, even when the MRFs of the system don't provide or only provide a limited form of High Availability or redundancy. Furthermore, the method has achieved this MRF redundancy with no extra logic being added at the MRF.

Figure 10:
FIG. 10 illustrates exemplary SIP proprietary header messages in accordance with an embodiment of the present invention.

In some embodiments Session Initiation Protocol (SIP) signaling is used to communicate between the various devices of FIG. 1 to setup and redirect the call flow. FIG. 10 illustrates the format of an exemplary proprietary SIP header 1010 which may be, and in some embodiments is, sent when the initial SIP INVITE signal is sent from SBC-1 104 to SBC-2 114 via MRF-1 106 to establish the call session or in a backward response SIP signal, e.g., SIP 200 OK signal from SBC-2 114 to SBC-1 104 (so that both the SBC's are aware of the respective peer SBC's contact information, i.e., IP address and the corresponding dialog information. FIG. 10 also illustrates the format of an exemplary proprietary SIP header 1020 which is sent when a special SIP INVITE to redirect the media call flow is sent from one of the SBC's to the other SBC via a different MRF then the MRF currently active, e.g., when SBC-2 114 detects a condition indicative of a failure of MRF 1 106 and wants to redirect the media flow for the call via MRF-2 108 instead of through MRF-1 106. Instead of proprietary SIP headers, in some embodiments the information contained in the proprietary SIP headers is exchanged as proprietary extensions of existing SIP headers such as for example, SIP From and Route headers.

FIG. 5 consisting of a first part FIG. 5A and a second part FIG. 5B shows a signaling diagram 5000 illustrating the exemplary communications system 100 with signaling and the steps implemented as part of an exemplary method of MRF media redirection in accordance with one embodiment of the present invention. Elements or steps with the same reference numbers used in different figures are the same or similar and those elements or steps will not be described in detail again.

In the signaling diagram 5000, each MRF acts as a B2BUA where the SBC's invoke the MRF to be included in the media path for media transcoding. The MRFs in this mode support Session Initiation Protocol Route header based loose routing as described in the Internet Engineering Task Force Request For Comment 3621. In this example a peering deployment is used wherein a centralized Session Initiation Protocol (SIP) policy and routing server is employed to provide end to end routing while an MRF is used as a centralized video transcoding/transrating/transizing resource to support various internetworking scenarios. In the example, the SBCs chain the MRF to setup a call that requires transcoding from the video perspective. The use of the term transcoding is used interchangeably with terms transrating and trans-sizing. Exemplary interworking transcoding scenarios include 1.) audio pass-through with video transcoding; 2.) audio transcoding with video transcoding, and 3.) audio transcoding with video pass through.

Operation of the method begins in step start step 5010. Operation proceeds from start step 5010 to step 5018.

In step 5018, Peer A 102 sends a SIP Invite message 5014 to initiate a Voice Over Internet Protocol call. Operation proceeds from step 5018 to step 5020. In step 5020 the ingress SBC-1 104 receives the SIP Invite message 5014. Operation proceeds from step 5020 to step 5022. In step 5022, the SBC-1 104 determines from the SIP policy and routing server which egress peer the call needs to be routed to and which egress SBC will be used. In this case, the determined egress peer is Peer B 116 and the determined egress SBC is SBC-2 114. Operation proceeds from step 5022 to step 5026. In step 5026, the SBC-1 104 makes a decision on whether to include an MRF into the call path. Based on the Packet Service Profile (PSP) of the ingress Trunk Group which includes entries for the audio/video encoding methods supported on the ingress Trunk Group and the Packet Service Profile of the egress Trunk Group which includes entries for the audio/video encoding methods supported on the egress Trunk Group facing the respective ingress and egress peers respectively, a decision is made, by SBC-1 104, apriori whether to invoke an MRF to be included in the path or not. If the decision is not to invoke an MRF then the MRF is not included in the media path and the SBC-1 104 sends the call to SBC-2 114. If the decision is to invoke an MRF to be included in the path, then SBC-1 104 invokes an MRF. In this example, the SBC-1 104 makes the decision to include an MRF in the media path for the call. Operation proceeds from step 5026 to step 5028.

In step 5028, the SBC-1 104 selects one of the available MRFs from a list of MRFs stored in its memory that are available to provide transcoding services to various media flows. Stored in memory along with the identity of the MRF is the address of the MRF. In this example, MRF 1 106 is selected. Operation proceeds from step 5028 to step 5030.

In step 5030, the SBC-1 104 generates a SIP INVITE message 5034 based on SIP INVITE message 5014 received by SBC-1 104 and the address of the selected MRF 1 106. The SIP INVITE message 5034 includes a route header including the address of the selected MRF 1 106 so that the call via the SIP INVITE message 5034 can be egressed towards the MRF 1 106. The generated SIP INVITE message 5034 in addition to the Route header field, also includes the ingress SBC-1 104 SIP contact address and a Dialog Identifier of the call leg between SBC-1 104 and MRF-1 106. In the exemplary embodiment, the ingress SBC-1 104 contact address and Dialog Identifier between SBC-1 104 and MRF 1 106 are included in a proprietary header field of the SIP INVITE message. As shown in box 5035 of FIG. 5A, the SIP INVITE message 5034 includes a proprietary header field X-SONUS-SOURCE-SBC: SBC1-IP; DIALOG-ID=CALL-ID1, FROM-TAG=1 wherein the SBC Source Address is SBC1-IP:PORT and the DIALOG-ID is ID1 and has a FROM-TAG=1. In some embodiments, the source SBC address which is invoking the MRF and the Dialog ID are passed that is included in existing proprietary header extension fields such as for example the From and Route proprietary header extension fields of the SIP INVITE message 5034. Box 5037 of FIG. 5A is included for explanatory purposes. It shows that Dialog ID 1 is for the call leg between SBC-1 104 and MRF 1 106. Operation proceeds from step 5030 to step 5032.

In step 5032, SBC-1 104 sends the generated SIP INVITE message 5034 to MRF 1 106 via communication link 119. Operation from step 5032 to step 5036. In step 5036, MRF 1 106 receives the SIP INVITE message 5034. Operation proceeds from step 5036 to step 5038.

In step 5038, MRF 1 106 generates a SIP INVITE message 5044 based on the SIP INVITE message 5034. The SIP INVITE message 5044 includes the SBC-1 104 address and the Dialog ID for the SBC-1 104 to MRF 1 106 call leg included in the SIP INVITE message 5034. In addition, the MRF 1 106 assigns and includes in the SIP INVITE message 5044, a DIALOG-ID to the call leg between the MRF 1 106 and the SBC-2 114. In this example the assigned DIALOG-ID=CALL-ID2, FROM TAG 2. Operation proceeds from step 5038 to step 5040. In step 5040, MRF 1 106 sends the SIP INVITE message 5044 to egress SBC 2 114 based on the Route header information included in the SIP INVITE 5044 message. Box 5045 shows the proprietary header information included in SIP message 5044 which includes X-SONUS-SOURCE-SBC: SBC1-IP:PORT; DIALOG-ID=CALL-ID1, FROM-TAG=1. Box 5047 of FIG. 5A is included for explanatory purposes. It shows that Dialog ID 2 is for the call leg between MRF 1 106 and SBC-2 114. Operation proceeds from step 5040 to step 5046. In step 5046, the SBC-2 114 receives the SIP INVITE message 5044. Operation proceeds from step 5046 to step 5048.

In step 5048, SBC-2 114 extracts the SBC-1 104 address and Dialog-ID for the call leg from SBC-1 104 to MRF 1 106 from the received SIP INVITE message 5044. The SBC-2 also extracts from the received SIP INVITE message 5044 the Dialog-ID for call leg from MRF 1 to SBC-2. Operation proceeds from step 5048 to step 5050.

In step 5050, the SBC-2 114 stores the source SBC address for SBC-1 104 X-SONUS-SOURCE-SBC: SBC1-IP: PORT, the Dialog-ID=CALL-ID1, FROM-TAG =1 for the call leg from the SBC 1 104 to MRF 1 106, and the Dialog-ID=CALL-ID2, FROM-TAG=2, for the call leg from MRF 1 106 to SBC-2 114 in memory associated with state information for the session which is supporting the call flow. Operation proceeds from step 5050 to step 5052.

In step 5052, the SBC-2 114 generates a SIP INVITE message 5054 based on the SIP INVITE message 5044 received from MRF 1 106. In some embodiments, the SIP INVITE message 5044 includes Route header information that the SBC-2 114 uses to perform a lightweight search of a database to identify the path to route the call to so that it reaches the egress PEER B 116. The SIP INVITE message 5054 in most, but not all embodiments, does not include any proprietary information. In most, but not all embodiments, the SIP INVITE message 5054 does not include the proprietary header including the SBC-1 104 address information and dialog identifier for the call leg between SBC-1 104 and MRF 1 106 or proprietary extensions which include this information. In this exemplary embodiment, the generated SIP INVITE message 5054 does not include the proprietary header information included in the SIP INVITE message 5044. SBC-2 is the intended receipt of this information and SBC-2 ensures that this information is not included in the information sent to Peer B. Operation proceeds from step 5054 to step 5056.

In step 5056, SBC-2 114 sends the generated SIP INVITE message 5054 to PEER B 116. Operation proceeds from step 5056 to step 5058. In step 5058, PEER B116 receives the SIP INVITE message 5054. Operation proceeds from step 5058 to step 5060. In step 5060, PEER B 116 generates and sends, a SIP 200 OK response message 5064 to SBC-2 114. Operation proceeds from step 5060 to step 5066. In step 5066, SBC-2 114 receives the SIP 200 OK response message 5064. Operation proceeds from step 5066 to steps 5068 and step 5080. In step 5068, SBC-2 114 generates and sends a SIP ACK message 5074 to PEER B acknowledging receipt of the SIP 200 OK response message 5064. Operation proceeds from step 5068 to step 5076. In step 5076, PEER B 116 receives the SIP ACK message 5074 from SBC-2 114.

In step 5080, SBC-2 114 generates a SIP 200 OK message 5084 in response to the SIP INVITE message 5044. The SIP 200 OK message 5084 includes the SBC-2 116 address and the Dialog-ID for the call leg between MRF1 106 and SBC-2 114 in a proprietary header. In some embodiments, the SBC-2 114 address and Dialog identifier are included as proprietary extensions of existing SIP message headers, e.g., SIP From header extension or Route header extension. Box 5085 shows the proprietary header information included in the SIP 200 OK message 5084 which includes the SBC-2 address "X-SONUS-SOURCE-SBC: SBC2-IP: PORT" and Dialog identifier for the call leg between MRF 1 106 and SBC-2 114 "DIALOG-ID=CALL-ID2, FROM-TAG=2". Operation proceeds from step 5080 to step 5082.

In step 5082, SBC-2 114, sends the generated SIP 200 OK message 5084 to MRF 1 106. Operation proceeds from step 5082 to step 5086. In step 5086, MRF 1 106 receives the SIP 200 OK message 5084. Operation proceeds from step 5086 to steps 5090 and step 5100.

In step 5100, MRF 1 106 generates and sends a SIP ACK message 5104 to SBC-2 114. Operation proceeds from step 5100 to step 5106. In step 5106, SBC-2 114 receives the SIP ACK message 5104.

In step 5092, MRF 1 106 generates a SIP 200 OK message 5094 in response to the SIP INVITE message 5034. The SIP 200 OK message 5094 includes the SBC-2 116 address and the Dialog-ID for the call leg between MRF1 106 and SBC-2 114 in a proprietary header. In some embodiments, the SBC-2 114 address and Dialog identifier are included as proprietary extensions of existing SIP message headers, e.g., SIP From header extension or Route header extension. Box 5095 shows the proprietary header information included in the SIP 200 OK message 5094 which includes the SBC-2 address "X-SONUS-SOURCE-SBC: SBC2-IP: PORT" and Dialog identifier for the call leg between MRF 1 106 and SBC-2 114 "DIALOG-ID =CALL-ID2, FROM-TAG =2". Operation proceeds from step 5090 to step 5092.

In step 5092, MRF 1 106 sends the generated SIP 200 OK message 5094 to SBC-1 104. Operation proceeds from step 5092 to step 5096. In step 5096, SBC-1 104 receives the SIP 200 OK message 5094. Operation proceeds from step 5096 to steps 5108 and step 5120.

In step 5120, SBC-1 104 generates and send a SIP ACK message 5124 to MRF 1 106 to acknowledge receipt of SIP 200 OK message 5094. Operation proceeds from step 5120 to step 5126. In step 5126, MRF 1 106 receives the SIP ACK message 5124.

In step 5108, the SBC-1 104 extracts from the received SIP 200 OK message 5094 the proprietary information, i.e., the source SBC address for SBC-2 114 X-SONUS-SOURCE-SBC: SBC2-IP: PORT, the Dialog-ID =CALL-ID2, FROM-TAG=2 for the call leg from the MRF 106 to SBC-2 114. The SBC-1 104 then stores this information along with the Dialog-ID=CALL-ID1, FROM-TAG=1, for the call leg from SBC-1 104 to MRF 1 in memory associated with state information for the session which is supporting the call flow. Operation proceeds from step 5108 to step 5110.

In step 5110, SBC-1 104 generates a SIP 200 OK message 5114 in response to SIP INVITE message 5014. The SIP 200 OK message 5114 in most, but not all embodiments, does not include any proprietary information. In most, but not all embodiments, the SIP 200 OK message 5114 does not include the proprietary header including the SBC-2 114 address information and the dialog identifier for the call leg between the MRF 1 106 and SBC-2 114 or proprietary extensions which include this information. In this exemplary embodiment, the generated SIP 200 OK message 5114 does not include the proprietary header information included in the SIP 200 OK message 5094. SBC-1 is the intended receipt of this information and SBC-1 ensures that this information is not included in the information sent to Peer A. Operation proceeds from step 5110 to step 5112.

In step 5112, SBC-1 104 sends the SIP 200 OK message 5114 to PEER A 102. Operation proceeds from step 5112 to step 5116. In step 5116, PEER A 102 receives the SIP 200 OK message 5114. Operation proceeds from step 5116 to step 5130.

In step 5130, PEER A 102 generates and sends SIP ACK message 5134 to SBC-1 104 in response to the received SIP 200 OK message 5114.

Operation proceeds from step 5130 to step 5132. At this point, the initial call is established with the media content of the call being transcoded by MRF 1 106. A media path for the VOIP call has been established from Peer A 102 to Peer B 116 with the media passing through SBC-1 104, MRF 1 106 and SBC-2 114 respectively when sent from Peer A 102 to Peer B 116 and with the media passing through SBC-2 114, MRF 1 106, and SBC-1 104 respectively when sent from Peer B 116 to Peer A 102. SBC-1 104 and SBC-2 114 monitor for a status condition indicative of a failure of MRF 1 such as for example a period of media inactivity. As both the ingress SBC-1 104 and the egress SBC-2 114 both have contact information for the other SBC either of the SBC-1 or SBC-2 entities can perform a redirection of the media call flow if it detects a condition indicative of a failure of the MRF 1 106. Operation proceeds from step 5132 to step 5135. In this example, MRF 1 has failed. In step 5135, SBC-2 detects a condition indicative of a failure of MRF 1 The SBC-2 114 upon the detection of a condition indicative of a failure of MRF 1 takes steps to redirect the call via a different available media MRF within a time period that does not cause appreciable change for the users in this case the PEER A 102 and PEER B 116. In this example, SBC-2 114 selects MRF 2 to replace MRF 1.

To accomplish this redirection, the SBC-2 114 triggers a SIP INVITE message towards SBC-1 104 by using a new active MRF address in this case the address of MRF2. The SIP INVITE message uses the Route header to route the call towards SBC-1 104 and contains the current selected codec for the call towards the SBC-1 114. The SIP INVITE message also contains the identifier that was passed in the initial call flow for the call leg between the SBC 1 104 and MRF 106. MRF 2 108 on receiving this SIP invite views this a fresh or new SIP INVITE and generates a SIP INVITE message based on this received message adding the various possible codecs to the generated SIP INVITE message. The MRF 2 108 then sends the generated SIP INVITE message with the additional codecs to the SBC-1 104 based on the Route header information in the received SIP INVITE message from SBC-2 114. When the SBC-1 104 receives the SIP INVITE message sent from MRF 2 108, it extracts the Dialog Identifier and uses the Dialog Identifier to merge the dialog and pulls the current selected codec(s) for the call. The SBC-1 104 responds to the SIP INVITE from the MRF 2 108 with the current selected codec towards MRF 2 by merging the legs and passes its own local SDP in the SIP 200 OK response. The call is now routed via the new MRF, MRF 2 108, without PEER A 102 or PEER B 116 knowing about the redirection and re-anchoring of the call through MRF 2.

The steps and signals of the redirection of the call flow from MRF 1 106 to MRF 2 108 are now explained in connection with the method and signaling flow diagram 5000.

Operation proceeds from step 5135 to step 5140. In step 5140, SBC-2 116 generates a SIP INVITE message 5144 to be sent to SBC-1 via MRF 2. The SIP INVITE message 5144 includes a proprietary header. Some of the information included in the SIP INVITE message 5144 headers is shown in box 5145 which is: (REQUEST-URI: MEDIA-REDIRECTION (SBC1.COM; X-SONUS-TARGET-DIALOG: CALL-ID1; ROUTE: MRF 2, SBC1-IP; X-SONUS-SOURCE-SBC: SBC2-IP: PORT; DIALOG-ID=CALL-ID3, FROM-TAG=3 <SDP POINTS TO SBC2>). This includes proprietary header information such as the X-SONUS-TARGET-DIALOG: CALL-ID1 which is the dialog ID of the call leg from SBC-1 104 to MRF 1 106; the X-SONUS-SOURCE-SBC: SBC2-IP:PORT which is the address of the SBC-2 114 and DIALOG-ID=CALL-ID3, FROM-TAG=3 which is the Dialog-ID for the call leg from SBC-2 114 to MRF 2 108. The header information also includes a ROUTE header including the address of the destination of the message which is SBC1-IP and that the message is to be routed via MRF2. The Session Description Protocol portion of the message 5144 points to SBC2. It should be noted that SBC-2 114 in this example does not send any signaling messages to PEER B 116 concerning the redirection of the media call flow. Box 5147 of FIG. 5B is included for explanatory purposes. It shows that Dialog ID 3 is for the call leg between SBC-2 114 and MRF 2 108. Operation proceeds from step 5140 to step 5142. In step 5142, the SIP INVITE message 5144 is sent from SBC-2 114 to MRF 2 108. Operation proceeds from step 5142 to step 5146. In step 5146, the SIP INVITE message 5144 is received by the MRF-2 108. Operation proceeds from step 5146 to step 5150. In step 5150, MRF 2 108 generates from the received SIP INVITE message 5144 a SIP INVITE message 5154 with SBC-1 104 as the destination. The SIP INVITE message includes a proprietary header. Some of the information included in the headers for the SIP INVITE message 5154 is included in box 5155 which is "REQUEST-URI: MEDIA-REDIRECTION@SBC1.COM; X-SONUS-TARGET-DIALOG: CALL-ID1; ROUTE: SBC1-IP; <SDP POINTS To MRF 2>.

Operation proceeds from step 5150 to step 5152. In step 5152, MRF 2 108 sends the SIP INVITE message 5154 to SBC-1 104. Operation proceeds from step 5152 to 5156.

In step 5156, SBC-1 104 receives the SIP 5154 message. Operation proceeds from step 5156 to step 5158. In step 5158, the SBC-1 104 identifies this SIP INVITE message 5154 as a special INVITE and replaces the original egress call-leg towards MRF 1 106 based on Dialog ID: CALL-ID1. SBC-1 104 switches the media from PEER A 102 towards MRF 2 108 instead of MRF 1 104. Note that SBC-1 104 does not send any signaling messages relating to the redirection of the media for the call flow to PEER A 102. Operation proceeds from step 5158 to step 5160.

In step 5160, SBC-1 104 generates a SIP 200 OK message 5164 in response to the SIP INVITE message 5154. The SIP 200 OK message 5164 includes a proprietary header. Some of the header information included in the SIP 200 OK message 5164 headers is shown in box 5165 it includes "REQUST-URI: MEDIA-REDIRECTION (SBC1.COM, X-SONUS-SOURCE-SBC: SBC-IP:PORT; DIALOG-ID=CALL-ID4, FROM TAG=4; <SDP POINTS TO SBC1>". Box 5167 of FIG. 5B is included for explanatory purposes. It shows that Dialog ID 4 is for the call leg between MRF 2 108 and SBC-1 104. Operation proceeds from step 5160 to step 5162.

In step 5162, SBC-1 104 sends the SIP 200 OK message 5164 to MRF 2 108. Operation proceeds from step 5162 to step 5166. In step 5166, MRF 2 108 receives the SIP 200 OK message 5164 from SBC-1 104. Operation proceeds from step 5166 to steps 5170 and 5180.

In step 5170 MRF 2 generates a SIP ACK message 5174 in acknowledgement of the receipt of the SIP 200 OK message 5164. Operation proceeds from step 5170 to step 5172. In step 5172, MRF 2 108 send SIP ACK message 5174 to SBC-1 104. Operation proceeds from step 5172 to step 5176. In step 5176, SBC-1 receives SIP ACK message 5174.

In step 5180, MRF 2 108 generates a SIP 200 OK message 5184 in response to SIP INVITE message 5144. The SIP 200 OK response message 5184 includes a SDP message that points to MRF 2 108 as shown in box 5185. Operation proceeds from step 5180 to step 5182. In step 5182, MRF 2 108 sends the SIP 200 OK message 5184 to SBC-2 114. Operation proceeds from step 5182 to step 5186. In step 5186, SBC-2 114 receives the SIP 200 OK message 5184. Operation proceeds from step 5186 to step 5190. In step 5190, SBC-2 114 generates and sends SIP ACK message 5194 to MRF 2 in response to the SIP 200 OK message 5184. Operation proceeds from step 5190 to step 5200.

In step 5200, the call flow redirection from MRF 1 106 to MRF 2 108 is completed. MRF 2 108 now transcodes media content for the call. The call legs between the ingress PEER A 102 and SBC 1 and SBC 2 and egress PEER B 116 have not been impacted by the redirection. PEER A and PEER B have not participated in the redirection of the call flow from MRF 1 to MRF 2 and are unaware that the call flow for the media has been redirected. The redirection of the media call flow has been performed without terminating the call. PEER A 102 and PEER B 116 have not received signals related to the redirection of the media content for the call between MRF 1 106 and MRF 2 108.

While in this example, SBC-2 detected the condition indicative of a failure of MRF 1 106 and initiated the call flow redirection, the method is equally applicable to SBC-1 detecting the condition indicative of a failure of MRF 1 106 and redirecting the call flow from MRF 1 106 to MRF 2 108.

Another exemplary method of the present invention is now explained using the exemplary system 100 of FIG. 1. In this mode of operation, the SBC invokes MRF in accordance with the procedures of RFC 4117. In this example, Peer A 102 is a user device such as a smartphone which has initiated a VOIP call to Peer B 116 a cellphone. In FIG. 1, the ingress SBC-1 104 receives a VOIP call over communications link 118. With respect to the media flow for the call, the media flow is the same as that of the B2BUA mode of invocation. However, the difference lies in how the SBC invokes the MRF. To start with, the SBC-1 104 forwards the call to SBC2 114 directly and not via a MRF on a communication link not shown. SBC-2 114 invokes MRF 1 106 for transcoding (by passing both SBC-1 104's SDP and SBC-2 114's SDP). MRF 1 106 allocates two ports: a) one towards SBC-1 104 and b) one towards SBC-2 114. The passing of both the SBC-1 104 SDP and SBC-2 114 SDP to the MRF-1 and MRF-1, in turn, allocating two ports is as specified in RFC 4117. When either SBC-1 104 or SBC-2 114 detect a status condition indicative of a failure of MRF-1, the media flow for the call is redirected via a different MRF (e.g., MRF-2 108). Since the SBCs act as B2BUA and terminate media on both call-legs locally, there is no additional signaling towards PEER A 102 and PEER B 116 and the media redirection for the call is handled locally between SBC-1 104 and SBC-2 114. In this example, MRF-1 106 does not provide High Availability or redundancy functionality. SBC-1 104 sends the media for the call it receives from PEER A 102 to MRF-1 106 over communication link 119 once the media call flow has been established. MRF-1 106 receives the media for the call and forwards the media for the call after transcoding the media to the egress SBC-2 114 over communication link 124. The dashed lines of communication links 119 and 124 indicate the media path after the MRF-106 has been invoked. The media path for the VOIP call is now anchored at MRF 1 106 which performs transcoding services for the call, such as audio transcoding. The egress SBC-2 114 sends media for the call that it receives from MRF-1 106 to Peer B 116 over communication link 130.

As explained above in connection with this example, when one of the SBCs, detect that there are problems or potential problems with the call media path and/or the MRF1, e.g., MRF 1 is not functioning properly because of failure or other reasons, the media path for the call is redirected via a different MRF such as any of MRF 2 108, . . . , MRF N 110 which are available and functioning. In this example, the media path for the call is redirected via MRF2 108, e.g., over communication links 120 and 126. Since the SBC acts as a B2BUA and terminates the Session Description Protocol/media on both call-legs locally, there is no additional signaling towards Peer A 102 and Peer B 116 and the media redirection is handled locally between the SBC-1 104 and SBC-2 114. By redirecting the media path, the system 100 has been able to provide MRF functionality for the call even after the original MRF anchoring the call, MRF-1, has ceased to provide MRF functionality. This method provides redundancy and resiliency from the end users perspective, e.g., users of Peer A 102 and Peer B 116 devices, in this example, even when the MRFs of the system don't provide or only provide a limited form of High Availability or redundancy. Furthermore, the method has achieved this MRF redundancy with no extra logic being added at the MRF.

Figure 6A:
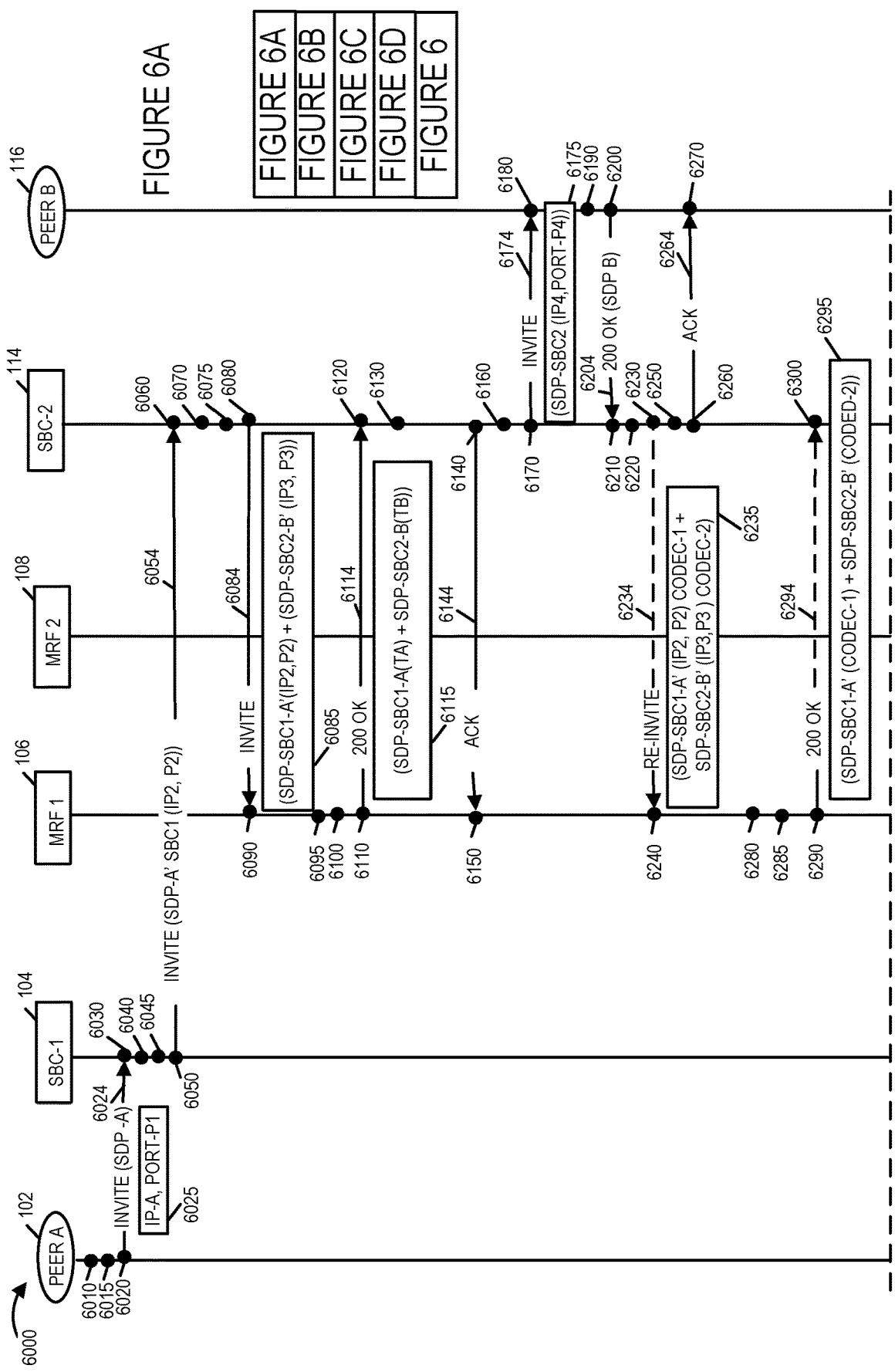
FIG. 6A illustrates a first part of an exemplary signaling diagram and method in accordance with an exemplary embodiment of the present invention.
Figure 6B:
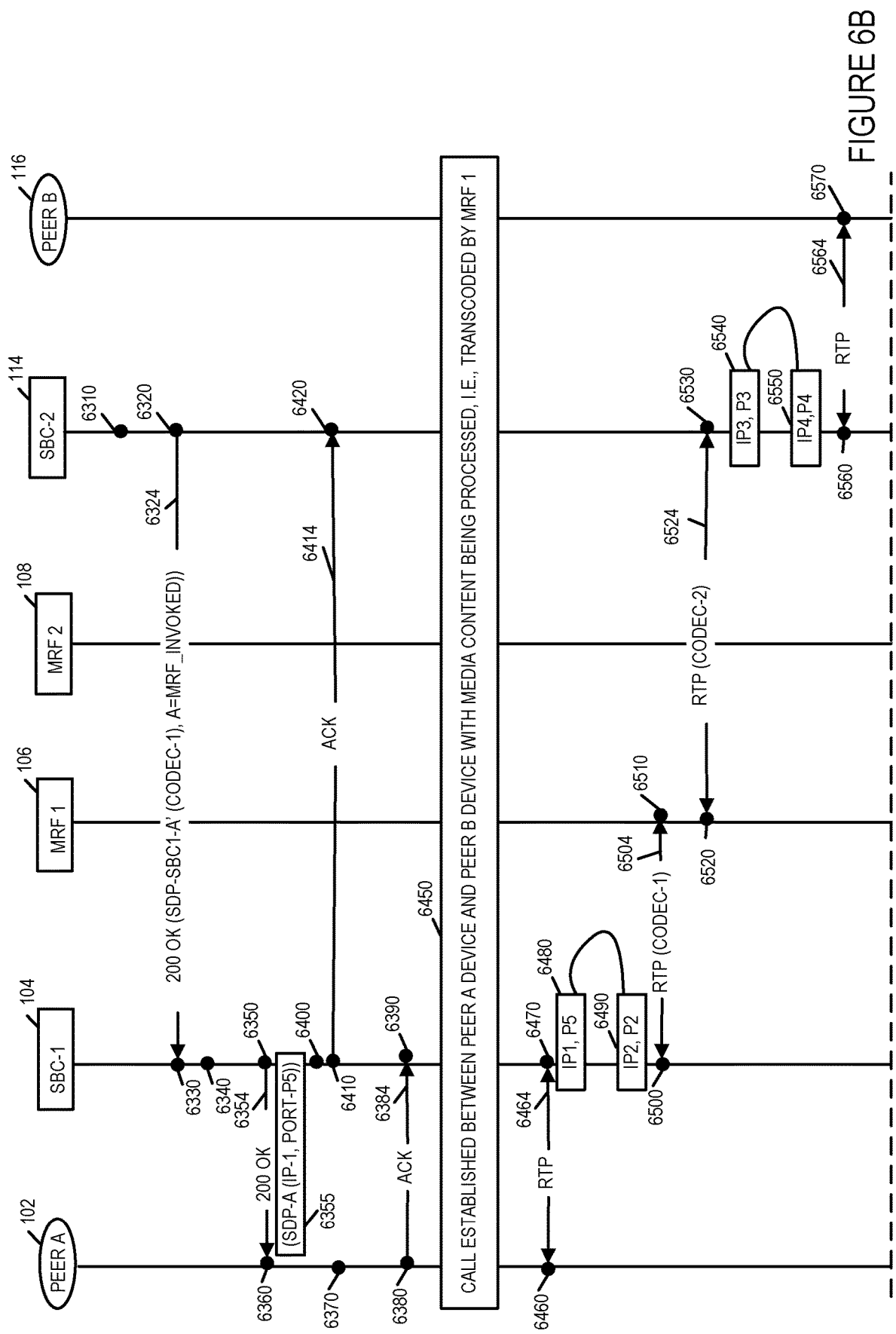
FIG. 6B illustrates a second part of an exemplary signaling diagram and method in accordance with an exemplary embodiment of the present invention.
Figure 6C:
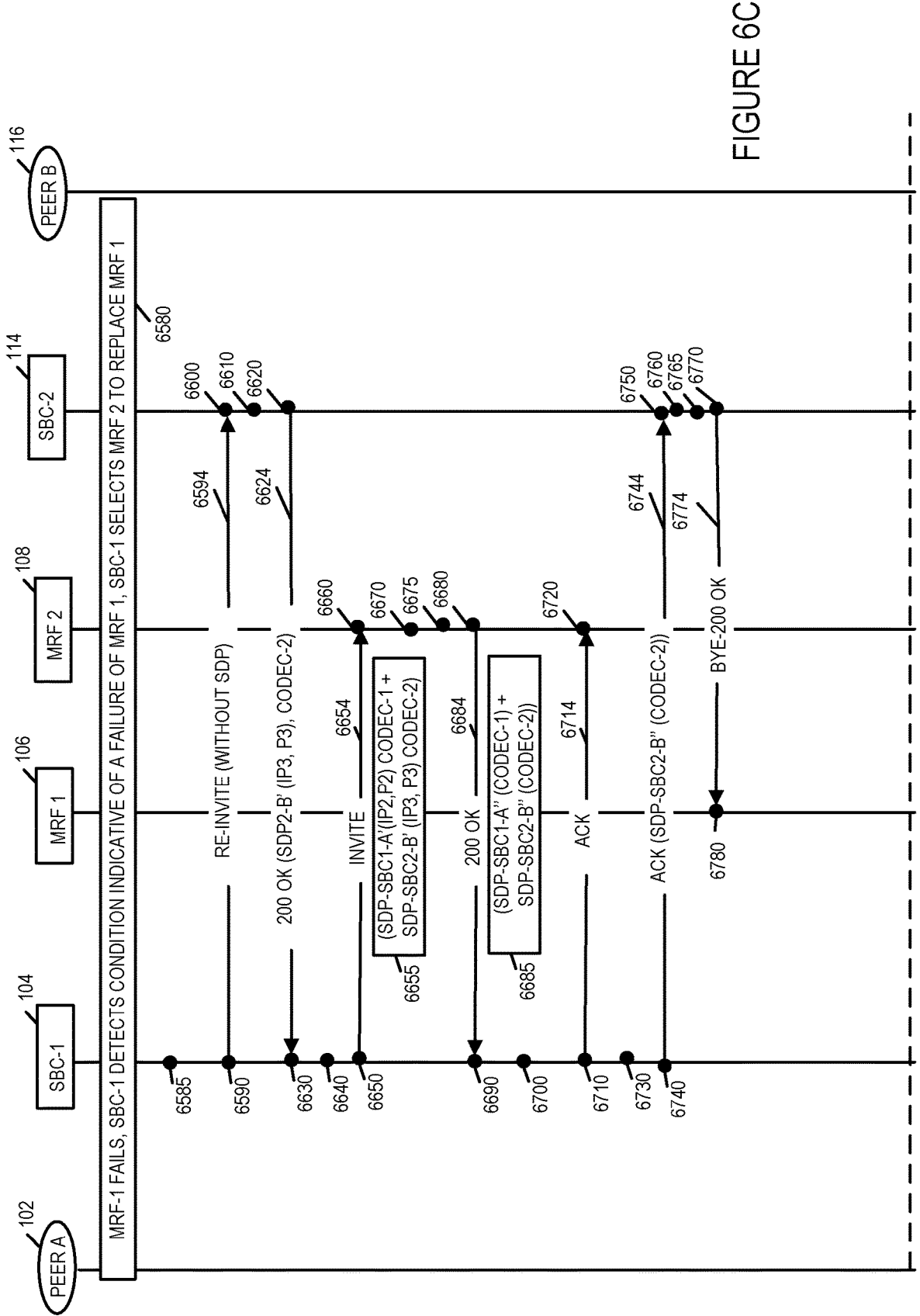
FIG. 6C illustrates a third part of an exemplary signaling diagram and method in accordance with an exemplary embodiment of the present invention.
Figure 6D:
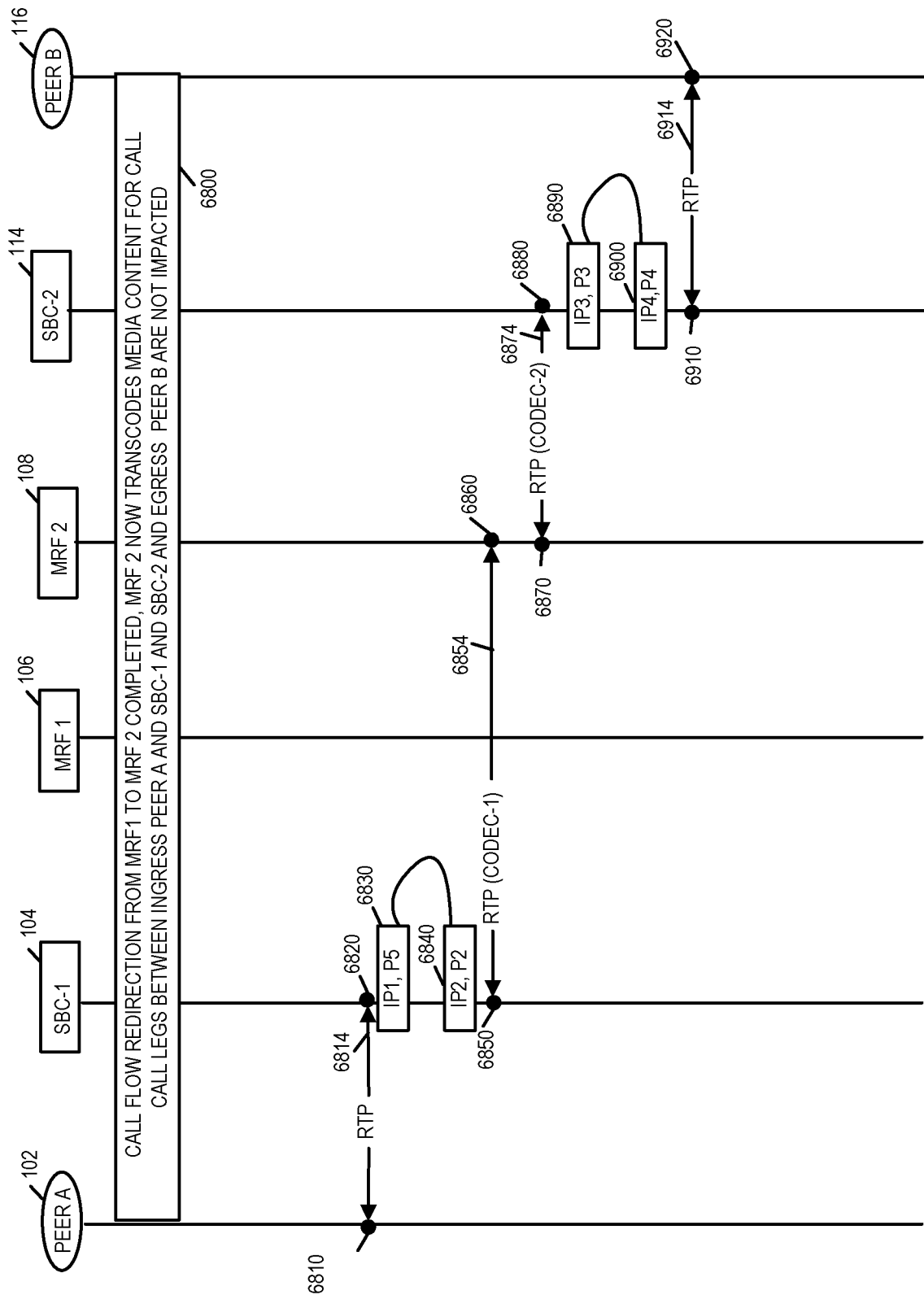
FIG. 6D illustrates a four part of an exemplary signaling diagram and method in accordance with an exemplary embodiment of the present invention.

FIG. 6 consisting of a first part FIG. 6A, a second part FIG. 6B, a third part FIG. 6C and a fourth part FIG. 6D shows a signaling diagram 6000 illustrating the exemplary communications system 100 with signaling and the steps implemented as part of an exemplary method of MRF media redirection in accordance with one embodiment of the present invention. Elements or steps with the same reference numbers used in different figures are the same or similar and those elements or steps will not be described in detail again.

In the example shown in signaling diagram 6000 of FIG. 6, the MRF-1 106 and MRF-2 108 act as a SIP User Agent (UA) where the SBC triggers a MRF to reserve resources if transcoding, e.g., video transcoding, is required. MRF-1 106 and MRF-2 108 in this mode use a SIP mechanism to provide control to their transcoding resource. The call flow is similar to what is specified in RFC-4117 to invoke an external media content processing resource, e.g., a MRF transcoding resource and similar systems.

In the example illustrated in FIG. 6, the ingress SBC-1 104 receives a call from PEER A 102. The SBC-1 104 obtains from a SIP routing and policy server which egress peer the call needs to be routed using an egress SBC. The call is routed to the egress SBC, in this case SBC-2 based on the information obtained from the SIP routing and policy server. Based on the Packet Service Profile (PSP) of the gateway and egress trunk group facing the egress peer respectively, a decision is made whether to reserve resources on an external MRF or not. In this example, the egress peer is PEER B 116, the egress SBC is SBC-2 114 and the decision that is made is that an external MRF resource is to be reserved for transcoding video media content of the call. The egress SBC, SBC-2 114, is configured with a list of MRF addresses of MRFs that are providing service to transcode various media flows and the MRFs availability. On receiving an indication that a MRF will be needed to transcode the video media content of the call, SBC-2 114 selects one of the available MRFs. In this example, MRF 1 106 is available and is selected. After SBC-2 114 selects MRF 1 106, SBC-2 114 generates a SIP INVITE message and sends it to MRF-1 106. The MRF-1 upon receipt of the SIP INVITE message responds back to the SIP INVITE message from SBC-2 114 in a SIP 200 OK response message. The SIP INVITE message sent to MRF-1 106 from SBC-2 114 includes the SDP received from the ingress SBC-1 104 [IP2, P2] as well as SBC-2 114's SDP that it reserves locally towards SBC-1 which is SBC-2 [IP3, P3]. The SDPs (SBC-1 SDP and SBC-2 SDP) respectively include the codec list of each side based on which MRF takes a decision to reserve a media DSP resource call or not. MRF-1 provides its own SDP [TA and TB] where TA and TB are list of codecs which are included in a response in a SIP 200 OK message back to SBC-2 114.

SBC-2 114 receives and processes the SIP 200 OK response message. SBC-2 114 then generates and sends a SIP INVITE message to the egress peer, PEER B 116. On receiving and processing a SIP 200 OK message from the PEER B 116 in response to the SIP INVITE message, SBC-2 114 makes a determination on whether MRF-1 106 needs to be included in the media call path or not based on information it has obtained from gateway PSP, MRF-1 and the codec identified in the SIP 200 OK response from the PEER 116. If SBC-2 114 determines that MRF-1 106 is not be included in the media call path, SBC-2 114 generates and sends a SIP BYE message to MRF-1 106 and a 200 OK message to SBC-1 104 which contains the SBC-2 [IP2, P2].

In this example, however, transcoding is required as PEER B 116 selects codec-2 which is not present in the gateway PSP, so the SBC-2 114 determines that MRF-1 106 will need to be included in the media call flow. The SBC-2 114 upon deciding that MRF-1 will need to be included in the media call flow generates and sends a SIP RE-INVITE message to MRF-1 106 to indicate the final selected codec to MRF-1 106 on both sides of its call leg. The MRF-1 106 upon receiving the SIP RE-INVITE message actives its digital signal processor (DSP) to support transcoding between Codec-1 and Codec-2 and responds back SBC-2 114's SIP RE-INVITE message with a SIP 200 OK message.

After receiving the SIP 200 OK message from MRF-1 106, SBC-2 114 generates and sends in a SIP 200 OK message the MRF-1 106 SDP TA to the SBC-1 104 so the SBC-1 104 will include MRF-1 in the backward path for media packets. MRF-1 106 TA being the MRF1's port towards SBC-1 104. After SBC-1 104 receives the SIP 200 OK message from SBC-2 114, it updates its remote SDP and generates and sends a SIP 200 OK message to the ingress peer, PEER A 102, which includes its own SDP towards Peer A. In the present example of FIG. 6, the MRFs do not support redundancy by design such as for example, software implemented MRFs. As a result there is a need as previously discussed for the SBC's to plug the call via a different available MRF within a time period that does not cause appreciable change for the user when there is a failure of the MRF providing transcoding services for the media content of the call.

In this example, when either SBC-1 104 or SBC-2 114 detects a condition indicative of a failure of MRF-1 106, the SBC that detected the indication of a failure condition sends a SIP RE-INVITE message without SDP information to the SBC that did not detect the indication of the failure of MRF-1 106 to obtain from non-detecting SBC its local SDP that it uses facing towards the MRF-1 106 resource. In this example, SBC-1 104 detects a condition indicative of a failure of MRF-1 106 and sends a SIP RE-INVITE message without SDP to SBC-2 114. The SBC-2 which did not detect the condition indicative of a failure of MRF-1 106, responds with a SIP 200 OK message that includes its current active local SDP facing MRF-1 (SDP2-B'(IP3,P3), Codec-2). SBC-1 104, after receiving the SBC-2 114 response SIP 200 OK message, delays sending a SIP ACK message to acknowledge the RE-INVITE but rather uses the non-detecting SBC's (in this case SBC-2 114) SDP along with its own local SDP which is SBC-1 104 SDP [IP2, P2, Codec-1] to create a new session with the MRF selected to replace MRF-1 106. In this case SBC-1 104 selects MRF 2 108 from the list of available MRFs to be the MRF to replace MRF-1 106. SBC-1 sends an INVITE message to MRF-2 108 with SBC-1 104 SDP and SBC-2 114 SDP. In this case the SIP INVITE message includes SDP-SBC1-A'(IP2,P2) Codec-1 and SDP-SBC2-B'(IP3,P3) Codec-2). Since single codecs (Codec-1 and Codec-2) are sent in each of the respective SBCs SDP with their corresponding IP addresses, the MRF-2 108 allocates media resources and DSP.

MRF-2 108 responds to the SIP INVITE message from SBC-1 104 in a SIP 200 OK message with its local SDP information [TA and TB]. After receiving the SIP 200 OK response message from MRF-2 108 at SBC-1 104, the SBC-1 104 generates and sends a SIP ACK message to SIP 200 OK message from MRF-2 108 and also generates and sends a SIP ACK message to SIP 200 OK message from SBC-2 114 in response to the SIP RE-INVITE message SBC-2 114 was sent by SBC-1 104. In the SIP ACK message sent to SBC-2 114 from SBC-1 104 the MRF-2 SDP TB address is sent. After receiving the SIP ACK message with the SDP information for MRF-2 108, connects to the media chain and begins sending and receiving the re-directed media call flow from MRF-2 108. In some embodiments, the SBC-2 114 also after receiving the SIP ACK from SBC-1 104 sends a SIP BYE message to MRF-1 106 to close the initial call leg. If the MRF-1 106 has only partially failed and receives and is able to process the message it will close the original call leg. The media call flow has now been successfully redirected from MRF-1 106 to MRF-2 108 without involvement from Peer A 102 or Peer B 116.

The signaling flow of this exemplary method will now be described in detail in connection with the signaling flow diagram 6000 of FIG. 6. Operation commences in start step 6010 and proceeds to step 6015. In step 6015, PEER A 102 begins the process of setting up a VOIP session with PEER B 116 by generating a SIP INVITE message 6024. The SIP INVITE message 6024, SIP INVITE (SDP-A (IP-A, PORT-P1)), includes a Session Description Protocol message SDP-A with information regarding PEER A including its contact information in the form of its IP (Internet Protocol) address and port. Box 6025 shows the PEER A address IP-A and PEER A port PORT-P1 included the SIP INVITE message. Operation proceeds from step 6015 to step 6020. In step 6020, PEER A 102 transmits the SIP INVITE message 6024 to SBC-1 104. Operation proceeds from step 6020 to step 6030. In step 6030, SBC-1 104 receives the SIP INVITE message 6024. Operation proceeds from step 6030 to step 6040.

In step 6040, SBC-1 processes the received SIP INVITE message 6024 and determines the destination of the message, the egress SBC and the routing path to reach PEER B. Operation proceeds from step 6040 to step 6045.

In step 6045, SBC-1 104 generates SIP INVITE (SDP-A'SBC1 (IP2, P2)) message 6054 based on the received SIP INVITE message 6024. SIP INVITE message 6054 includes a SDP message with information about SBC-1 including its contact information which are its Internet Protocol address, IP2, and port, P2. Operation proceeds from step 6045 to step 6050. In step 6050, SBC-1 104 sends the SIP INVITE message 6054 to SBC-2 114. Operation proceeds from step 6050 to step 6060. In step 6060, SBC-2 114 receives SIP INVITE message 6054. Operation proceeds from step 6060 to step 6070. In step 6070, SBC-2 114 processes the received SIP INVITE message 6054 and determines that transcoding is required for call being established between PEER A 102 and PEER B 116 and selects from a list of potential MRFs an available MRF to contact in connection with performing the transcoding required for the call. In this example, SBC-2 114 selects MRF 1 106. Operation proceeds from step 6070 to step 6075. In step 6075, SBC-2 114 generates SIP INVITE message 6084 which includes the received SDP message information from SBC-1 104 in SBC1-A'(IP2, P2) and also an augmented SDP in SDP2-B'(IP3, P3) shown in box 6085. The SDP2-B' SDP message includes media port information for SBC-2 114 including its IP address, IP3, and port, P3. The SDP messages (SDP SBC1-A'and SDP SBC-2B') respectively include the codec list of each side based on which SBC takes a decision to reserve a media DSP resource call or not. Operation proceeds from step 6075 to step 6080. In step 6080, SBC-2 114 sends the SIP INVITE (SDP-SBC1-A'(IP2,P2) (SDP-SBC2-B'(IP3,P3) message 6084 to MRF-1 106. Operation proceeds from step 6080 to step 6090.

In step 6090, MRF-1 106 receives the SIP INVITE message 6084. Operation proceeds from step 6090 to step 6095. In step 6095, MRF 1 106 processes the receiving SIP INVITE message 6084 and reserves the list of codecs received in each of the SDP-SBC1-A' and SDP-SBC2-B' messages. Operation proceeds from step 6095 to step 6100. In step 6100, MRF 1 106 generates a SIP 200 OK message 6114 in response to the SIP INVITE message 6084. The SIP 200 OK 6114 includes the list of reserved codecs TA for PEER A and TB for PEER B, e.g., SIP 200 OK (SDP-SBC1-A(TA))(SDP-SBC2-B(TB) 6114. Box 6115 shows SDP messages included in SIP 200 OK message 6114. Operation proceeds from step 6100 to step 6110. In step 6110, MRF 1 106 sends the SIP 200 OK message 6114 to SBC-2 114. Operation proceeds from step 6110 to step 6120.

In step 6120, SBC-2 114 receives the SIP 200 OK 6114. Operation proceeds from step 6120 to steps 6130 and 6160.

In step 6130, SBC-2 114 generates a SIP ACK message 6144 in response to the SIP 200 OK message 6114 it received. Operation proceeds from step 6130 to step 6140. In step 6140 SBC-2 114 sends the SIP ACK message 6144 to MRF 1 106. Operation proceeds from step 6140 to step 6150. In step 6150, MRF 1 106 receives and processes the SIP ACK message 6144.

In step 6160, SBC-2 generates a SIP INVITE message 6174 including a SDP message (SDP-SBC2 (IP4, PORT-P4)) as shown in box 6175. The SDP message includes the media port information for SBC-2 114 for PEER B 116 which IP address IP4 and port PORT-P4. Operation proceeds from step 6160 to step 6170. In step 6170, SBC-2 114 sends the SIP INVITE message 6174 to PEER B 116. Operation proceeds from step 6170 to step 6180. In step 6180, PEER B 116 receives the SIP INVITE message 6174. Operation proceeds from step 6180 to step 6190. In step 6190, PEER B processes the received SIP INVITE message 6174 and generates a SIP 200 OK SDP B) response message 6204. The SIP 200 OK message 6204 includes a SDP message SDP B including information about PEER B 116. Operation proceeds from step 6190 to step 6200. In step 6200, PEER B 116 sends the SIP 200 OK message 6204 to SBC-2 114. Operation proceeds from step 6200 to step 6210.

In step 6210, SBC-2 114 receives the SIP OK message 6204. Operation proceeds from step 6210 to steps 6220 and 6250. In step 6250 SBC-2 114 processes the received SIP 200 OK message 6204 and generates a SIP ACK message 6264 to acknowledge the receipt of the SIP 200 OK message 6204. Operation proceeds from step 6250 to step 6260. In step 6260, the SBC-2 114 sends the SIP ACK message 6264 to PEER B 116. Operation proceeds from step 6260 to step 6270. In step 6270, PEER B 116 receives and processes the SIP ACK message 6264.

Returning now to step 6220, in step 6220 SBC-2 114 processes the received SIP 200 OK message 6204 and selects the codec for both sides of the call and generates SIP RE-INVITE message 6234 which includes SDP messages shown in box 6235. Note that this step is optional and is not performed when the SIP INVITE message 6084 only includes a single codec instead of a list of codecs. When this optional step 6220 is performed optional steps 6230, 6240, 6280, 6290, 6300 are also performed otherwise these steps are bypassed during execution of the method and operation proceeds from 6210 to 6310 shown on FIG. 6B. In this example, CODEC-1 is selected for SBC1-A' side of the call and CODEC-2 is selected for SBC2-B' side of the call as shown in the SDP messages shown in box 6235, SDP-SBC1-A'(IP2, P2) CODEC-1 and SDP-SBC2-B'(IP3,P3) CODEC-2, which are part of SIP RE-INVITE message 6234. Operation proceeds from step 6220 to step 6230. In step 6230, the SIP RE-INVITE message 6234 is sent from SBC-2 114 to MRF 1 106. Operation proceeds from step 6230 to step 6240.

In step 6240, the MRF 1 106 receives the SIP RE-INVITE message 6234. Operation proceeds from step 6240 to step 6280. In step 6280, MRF 1 106 processes the SIP RE-INVITE message 6234, identifies the selected codecs in the message, CODEC-1 for the SBC1-A' side and CODEC-2 for the SBC2-B' side and locks down its resources for the codec on each side of the call so that it can provide transcoding between Codec-1 and Codec-2. Operation proceeds from step 6280 to step 6285. In step 6285, MRF 1 106 generates a SIP 200 OK message 6294 in response to the SIP RE-INVITE message 6234 it received from SDP-2 114. The SIP 200 OK message 6294 includes SDP messages shown in box 6295, SDP-SBC1-A'(CODEC-1) and SDP-SBC-2B'(CODEC-2). The SDP messages confirm that MRF 1 106 has the codecs configured to transcode the media of the call. Operation proceeds from step 6285 to step 6290. In step 6290, MRF 1 106 sends the SIP 200 OK message 6294 to SBC-2 114. Operation proceeds from step 6290 to step 6300. In step 6300, SBC-2 114 receives the SIP 200 OK message from MRF 1 106. Operation proceeds from step 6300 shown on FIG. 6A to step 6310 shown on FIG. 6B.

In step 6310, SBC-2 114 generates a SIP 200 OK message 6234 in response to the SIP INVITE message 6054 received from SBC-1 114 in step 6060. The SIP 200 OK (SDP-A' (CODEC-1), A=MRF INVOKED)) message 6324 includes a SDP message information with information informing SBC-1 104 that an MRF has been invoked identifying CODEC-1 as the codec the MRF will be utilizing to transcode media content received from SBC-1 104 with contact information IP2, P2. Operation proceeds from step 6310 to step 6320. In step 6320, SBC-2 114 sends the SIP 200 OK message 6234 to SBC-1 104. Operation proceeds from step 6230 to step 6330. In step 6330, SBC-1 104 receives the SIP 200 OK message 6324 from SBC-2 114. Operation proceeds from step 6330 to steps 6340 and 6400.

In step 6400, SBC-1 104 processes the received SIP 200 OK message 6324 and generates a SIP ACK message 6414 to acknowledge receipt of the SIP 200 OK message 6324. Operation proceeds from step 6400 to step 6410. In step 6410, SBC-1 104 sends the SIP ACK message 6414 to SBC-2 114. Operation proceeds from step 6410 to step 6420. In step 6420, SBC-2 114 receives and processes the SIP ACK message 6414 send from SBC-1 104.

In step 6340, SBC-1 104 generates a SIP 200 OK message 6354 in response to the SIP INVITE message 6024 received from PEER A 102 in step 6030. The SIP 200 OK message 6354 includes SDP message SDP-A(IP-1, PORT-PS) as shown in box 6355 providing media port information for SBC-1 104 the IP address IP-1 and the port PORT-P5 to which PEER A 102 is to communicate. Operation proceeds from step 6340 to step 6350. In step 6350, SBC-1 104 sends the SIP 200 OK message 6354 to PEER A 102. Operation proceeds from step 6350 to step 6360. In step 6360, PEER A 102 receives the SIP 200 OK message 6354 from SBC-1 104. Operation proceeds from step 6360 to step 6370 In step 6370, PEER A 102 processes the received SIP 200 OK message 6354 and generates SIP ACK message 6384 to acknowledge receipt of the SIP 200 OK message 6354. Operation proceeds from step 6370 to step 6380. In step 6380, PEER A 102 sends SIP ACK message 6384 to SBC-1 104. Operation proceeds from step 6380 to step 6390. In step 6390, SBC-1 104 receives and processes the SIP ACK message 6384. At this point as described in box 6450, the call has been established between PEER A 102 and PEER B 116 with the media content of the call being processed, i.e., transcoded by MRF 1 106.

The media call flow between PEER A 102 and PEER B 116 with the MRF-1 transcoding operation will now be explained with reference to the signaling flow diagram 6000. RTP packet streams are depicted by bi-directional arrows 6464, 6504, 6524 and 6564 in FIG. 6B. These RTP packet stream(s) show that RTP packets carrying media content payload such as for example, video content, are being exchanged between PEER A 102 and PEER B 116 and may be, and in some embodiments are, bi-directional media call flows. The media call flow from PEER A 102 to PEER B 116 traverses the following path. In step 6460 PEER A sends a RTP stream 6464 of RTP packets to SBC-1 104. In step 6470, SBC-1 104 receives the RTP packets of the RTP stream 6464 at its IP address IP1 on port P5 (see box 6480 of FIG. 6B). SBC-1 outputs packets of the RTP packet stream 6464 from its IP address IP2 on port P2 (see box 6490 on FIG. 6B), which was the contact address identified to MRF 1 106 for SBC-1 104, sending the RTP packet payloads in a CODEC-1 format as RTP stream 6504 to MRF-1 104 in step 6500. In step 6510, MRF-1 106 receives the RTP packets of RTP packet stream 6504 with its payload media content in CODEC-1 format. In step 6520, MRF-1 transcodes the media content of the received packets of the RTP stream 6504 from CODEC-1 format to CODEC-2 format, generates RTP packet stream 6524 with RTP packets with media content in CODEC-2 format and sends the packets of the RTP packet stream 6524 to SBC-2 114 at its IP address IP3, port P3. In step 6530, SBC-2 114 receives the RTP packets of the RTP stream 6524 with media content payload in CODEC-2 format at its IP address, IP3 on port P3 as illustrated by box 6540 and in step 6560 outputs or sends the received packets to PEER B via its IP address IP4, port P4, which is shown in box 6550, as RTP packets of RTP packet stream 6564. PEER B 116, receives the RTP packets of the RTP packet stream 6564 in step 6570. The media call flow of RTP packets from PEER B 116 to PEER A 102 is the reverse of the media call flow from PEER A 102 to PEER B 116. That is the RTP packets are sent from PEER B 116 to SBC-2 114 where they are received at IP address IP4, port P4. SBC-2 114 outputs the RTP packets from its address IP3, port P3 with the media content in CODEC-2 format to MRF-1 106. The RTP packets are received at MRF 1 106 with the media content being in CODEC-2 format. The MRF-1 106 transcodes the received media packets from CODEC-2 format to CODEC-1 format and generates and sends RTP packets with payloads in CODEC-1 format to SBC-1 at IP address IP2 and port P2. SBC-1 104 receives the RTP packets at its IP address port pair of IP2, P2 and then subsequently sends RTP packets with the media content to PEER A 102 via IP address port pair IP1, P5. The PEER A 102 receives the RTP packets from SBC-1 104 with the transcoded media content from PEER B 116.

Once the call media flow path has been established and exchange of RTP packets commences, SBC-1 104 and SBC-2 114 begin monitoring for a status condition indicative of a failure of MRF 1 106 such as for example, a period of media inactivity, e.g., RTP packet loss, which exceeds a predetermined threshold. In this example, MRF 106 fails and SBC-1 104 detects a condition indicative of a failure in step 6580 shown on FIG. 6C. Upon the detection of a condition indicative of a failure of MRF 1 106, SBC-1 104 in a sub-step of step 6580 selects a MRF from a list of available MRFs to replace MRF 1 106. In this case, SBC-1 106 selects MRF 2 108 to replace MRF 1 106. SBC-1 104 begins the redirection process of redirecting the call media content flow from MRF 1 106 to MRF 2 108. Operation proceeds from step 6580 to step 6585. In step 6585, SBC-1 104 generates a SIP RE-INVITE message 6594 which does not include a SDP message but indicates that MRF 2 108 is the newly selected MRF for the call flow. The SBC-1 104 will use this RE-INVITE message to learn the current active local SDP facing MRF 1. Operation proceeds from step 6585 to step 6590.

In step 6590, SBC-1 104 sends the SIP RE-INVITE message 6594 to SBC-2 114. Operation proceeds from step 6590 to step 6600. In step 6600, SBC-2 receives the SIP RE-INVITE message 6594. Operation proceeds from step 6600 to step 6610. In step 6610, SBC-2 generates a SIP 200 OK response message 6624 to SIP RE-INVITE message 6594. The SIP 200 OK response message 6624 which is SIP 200 OK (SDP2-B' (IP3,P3, CODEC-2) includes SBC-2's current local active SDP facing MRF 1 106 which includes the IP address and port (IP3, P3) by which it is communicating with MRF 1 106 and the selected CODEC-2 information. Operation proceeds from step 6610 to step 6620. In step 6620, SBC-2 114 sends the SIP 200 OK message 6624 to SBC-1 104. Operation proceeds from step 6620 to step 6630.

In step 6630, SBC-1 104 receives the SIP 200 OK message 6624. Operation proceeds to step 6640. In step 6640, generates a SIP INVITE message 6654 which includes the information shown in box 6655 which is the SDPs for SBC-1 104 and SBC-1 114 with the respective selected codecs. This SIP INVITE (SDP-SBC1-A'(IP2,P2) CODEC-1; SDP-SBC2-B'(IP3,P3) CODEC-2) message 6654 is to be passed to MRF-2 108 so that MRF 2 can reserve the resources to perform the transcoding for the media call flow and be provided the media port information for SBC-1 104 which is sending and receiving media in accordance with the CODEC-1 format and SBC-2 114 which will be sending and receiving media in accordance with CODEC-2 format. Operation proceeds from step 6640 to step 6650. In step 6650, SBC-1 104 sends SIP INVITE message 6654 to MRF 2 108. Operation proceeds from step 6650 to step 6660. In step 6660, MRF 2 receives the SIP INVITE message 6654. Operation proceeds from step 6660 to step 6670. In step 6670, MRF 2 108 reserves its DSP resources needed to perform the transcoding function for the media call flow. Operation proceeds from step 6670 to step 6675, in step 6675 MRF 2 108 generates a SIP 200 OK message 6684 in response to the SIP INVITE 6654 it received in step 6660. The SIP 200 OK message 6684 includes the information in box 6685 which is SDP messages SDP-SBC1-A" (CODEC-1) and SDP-SBC2-B" (CODEC-2). Operation proceeds from step 6675 to step 6680. In step 6680, SIP 200 OK message 6684 is sent by MRF 2 108 to SBC-1 104. Operation proceeds from step 6680 to step 6690.

In step 6690, SBC-1 104 receives the SIP 200 OK message 6684. Operation proceeds from step 6690 to step 6700. In step 6700, SBC-1 104 generates a SIP ACK message 6714 to acknowledge receipt of SIP 200 OK message 6684 from MRF 2 108. Operation proceeds from step 6700 to step 6710. In step 6710, SBC-1 104 sends the SIP ACK message 6714 to MRF 2 108. Operation proceeds from step 6710 to steps 6720 and 6730. In step 6720, MRF 2 108 receives and processes the SIP ACK message 6714.

In step 6730, SBC-1 104 generates a SIP ACK message 6744 in response to the SIP 200 OK message 6624 it received from SBC-2 114. The SIP ACK message 6744 includes SDP message (SDP-SBC2-B" (CODEC-2)) received from by the SBC-1 104 from MRF 2 108. Operation proceeds from step 6730 to step 6740.

In step 6740, SBC-1 104 sends the SIP ACK message 6744 to SBC-2 114. Operation proceeds from step 6740 to step 6750. In step 6750, SBC-2 receives the SIP ACK message 6744. Operation proceeds from step 6750 to step 6760. In step 6760, the SBC-2 114 processes the SIP ACK message 6744. SBC-2 on receiving the SDP from MRF 2 108 in the SIP ACK message 6744 with CODEC-2 updates its remote SDP to point to MRF 2 108 and connects MRF 2 108 to the media chain for the call. Operation proceeds from step 6760 to step 6765. In step 6765, SBC-2 114 generates a SIP BYE 200 OK message 6774 to send to MRF 1 106 to terminate the MRF 1 sessions regarding the media call flow should MRF 1 not have completed failed as the media for the call is being redirected through MRF 2 108 instead of MRF 1 106. Operation proceeds from step 6765 to step 6770. In step 6770, SBC-2 114 sends SIP BYE message 6774 to MRF 1 106. Operation proceeds from step 6770 to step 6780. In step 6780, MRF 1 106 receives the SIP BYE message 6774 if it is still operating and terminates its support for the transcoding of the media call flow and related sessions of the initial call leg.

At this point, as noted in box 6800 on FIG. 6D the call flow redirection from MRF 1 106 to MRF 2 108 has been completed. MRF 2 108 now transcodes media content for the call. It should also be noted that the call leg between ingress PEER A 102 and SBC-1 104 have not been impacted by the media redirection. Similarly the call leg between SBC-2 114 and PEER B has not been impacted by the media redirection.

The media call flow between PEER A 102 and PEER B 116 after the redirection will now be described reference to the signaling flow diagram 6000. RTP packet streams are depicted by bi-directional arrows 6814, 6854, 6874 and 6914. These RTP packet stream(s) shows that RTP packets carrying media content payload such as for exemplary, video content, are being exchanged between PEER A 102 and PEER B 116 and may be, and in some embodiments are, bi-directional media call flows. The media call flow from PEER A 102 to PEER B 116 traverses the following path. In step 6810 PEER A sends a RTP stream 6814 of RTP packets to SBC-1 104. In step 6820, SBC-1 104 receives the RTP packets of the RTP stream 6814 at its IP address IP1 on port P5 (see box 6830 of FIG. 6D). SBC-1 104 outputs packets of the RTP packet stream 6814 from its IP address IP2 on port P2 (see box 6840) which was the contact address identified to MRF 2 108 for SBC-1 104 sending the RTP in a CODEC-1 format as RTP stream 6854 to MRF-2 108 in step 6850. In step 6860, MRF-2 108 receives the RTP packets of RTP stream 6854 with its payload media content in CODEC-1 format. In step 6870, MRF-2 transcodes the media content of the received packets of the RTP stream 6854 from CODEC-1 format to CODEC-2 format, generates RTP packet stream 6874 with RTP packets with media content in CODEC-2 format and sends the packets of the RTP packet stream 6874 to SBC-2 114 at its IP address IP3, port P3. In step 6880, SBC-2 114 receives the RTP packets of the RTP stream 6874 with media content payload in CODEC-2 format at its IP address, IP3 on port P3 as illustrated by box 6890 and in step 6910 outputs or sends the received packets to PEER B via its IP address IP4, port P4, which is shown in box 6910, as RTP packets of RTP packet stream 6914. PEER B 116 receives the RTP packets of the RTP packet stream 6914 in step 6920.

The media call flow of RTP packets from PEER B 116 to PEER A 102 is the reverse of the media call flow from PEER A 102 to PEER B 116. That is the RTP packets are sent from PEER B 116 to SBC-2 114 where they are received at IP address IP4, port 4. SBC-2 114 outputs the RTP packets from its address IP3, port 3 with the media content in CODEC-2 format to MRF-2 108. The RTP packets are received at MRF-2 108 with the media content being transcoded by MRF-2 108 from CODEC-2 format to CODEC-1 format. The MRF-2 108 generates and sends RTP packets with payloads in CODEC-1 format to SBC-1 104 at IP address IP2 and port 2. SBC-1 104 receives the RTP packets at its IP address port pair of IP2, P2 and then subsequently sends RTP packets with the media content to PEER A 102 via IP address port pair IP1, P5. PEER A 102 receives the RTP packets from SBC-1 104 with the transcoded media content from PEER B 116.

In the example of FIG. 6, the SBCs act as a B2BUA and terminates the Session Description Protocol/media on both call-legs locally, there is no additional signaling towards Peer A 102 and Peer B 116 and the media redirection is handled locally between the SBC-1 104 and SBC-2 114. By redirecting the media path, the method of FIG. 6 and system 100 has been able to provide MRF functionality for the call even after the original MRF anchoring the call, MRF-1, has ceased to provide MRF functionality. This exemplary method of one embodiment of the invention provides redundancy and resiliency from the end users perspective, e.g., users of Peer A 102 and Peer B 116 devices, even when the MRFs of the system don't provide or only provide a limited form of High Availability or redundancy. Furthermore, the method has achieved this MRF redundancy with no extra logic being added at the MRF.

In the embodiments illustrated in FIGS. 5 and 6, the second MRF, MRF 2 108, is selected after the detection of an indication of a failure by one of the SBCs of the first MRF, MRF 1 106. This typically occurs after the first MRF has failed. The signaling procedures to establish an alternative media path via MRF 2 are therefore also invoked after the first MRF, MRF 1 106 fails. In another embodiment, illustrated in FIG. 9, the signaling path via both MRFs (MRF 1 106 and MRF 2 108) is established during the initial call setup but only one of the MRFs either MRF 1 106 or MRF 2 108 is used for transcoding. This embodiment, can be generalized to establishing multiple alternative media paths for the call beyond a single MRF backup and media path by selecting and establishing any number of alternative media paths via an equal number of alternative MRFs. In these embodiments, when either SBC 1 104 or SBC 2 114 detects a condition indicative of a failure of the currently active MRF, e.g., MRF 1 106, the media call flow is immediately switched to one of the alternative MRFs for which a signaling path has been established such as for example, MRF 2 108. In this way, additional time can saved in switching over from the MRF which has failed to the alternative MRF.

Signaling call flow 9000 of FIG. 9 provides an exemplary embodiment of the present invention wherein alternative media call flow paths through an MRF are established prior to the detection of a condition indicative of a failure of the currently active MRF. Elements or steps with the same reference numbers used in different figures are the same or similar and those elements or steps will not be described in detail again. In the signaling diagram the SIP signaling exchange of INVITE-200 OK -ACK represents three signals a SIP INVITE from the originating device to the destination device, a SIP 200 OK response from the destination device to the originating device of the SIP INVITE message, and a SIP ACK message from the originating device to the destination device acknowledging the receipt of the SIP 200 OK response to the SIP INVITE message. The method of the signaling call flow 9000 is broken down for ease of understanding purposes into three portions. The first portion of the signaling flow illustrates the establishment of the initial call and begins with the steps after box 9005.

The second portion of the signaling flow 9000 occurs when the active MRF performing a transcoding function on the media of the call, MRF 1 106, fails and SBC-1 104 or SBC-2 114 detects a status condition indicative of a failure of MRF 1 106. In this example, SBC-2 114 detects the status condition indicative of a failure of MRF 1 106. In the second portion of the signaling flow which begins with the steps after box 9500, SBC-2 114 and SBC-1 104 perform steps to re-direct the media call flow for the call established in the first portion of the signaling flow 9000 from the active MRF 1 106 to the alternative MRF 2 108.

The third portion of the signaling flow 9000 begins after the box 9700. The third portion of the signaling flow diagram 9000 illustrate the signaling media path via MRF 2 108 after the completion of the redirection of the media call flow for the call.

Returning to the first portion of the signaling flow 9000, the initial VOIP (Voice over Internet Protocol) session establishment begins with the exchange of the SIP INVITE-200 OK-ACK signals 9014 between the PEER A device 102 which originates the call by sending the SIP INVITE signal to SBC-1 104 and SBC-1 104 which receives the SIP INVITE signal. The exchange of SIP INVITE-200 OK -ACK is shown as occurring step 9010 and 9020. Operation proceeds from step 9020 to step 9030.

In step 9030, SBC-1 104 generates a SIP INVITE message to send to MRF 1 106. In sub-step 9036, the SIP INVITE message is generated to include a proprietary header including the source address of SBC-1 104, SBC-1 104's IP Address, as well as a dialog identifier of the call-leg between SBC-1 104 and MRF 1 106 which in this example is ID1. The proprietary header of the SIP INVITE message generated in sub-step 9036 is shown in box 9035 as X-SO-NUS-SOURCE-SBC: SBC1-IP, Dialog-ID=ID1. In some embodiments, instead of a SIP proprietary header being used the information contained in the proprietary header is passed in parameters in existing header fields.

The SIP INVITE message generated in sub-step 9036 is sent in the step 9034 SIP INVITE-200 OK-ACK message exchange between SBC-1 104 and MRF 1 106 which is shown as taking places in steps 9030 and 9040. SBC-1 104 sends the generated SIP INVITE message to MRF 1 106 which receives the SIP INVITE message and responds with a SIP 200 OK. Upon receiving the SIP 200 OK response, SBC-1 104 sends a SIP ACK message to MRF 1 106. Operation proceeds from step 9040 to step 9050.

In step 9050, MRF 1 106 exchanges SIP INVITE-200 OK-ACK signals 9054 with SBC-2 114. MRF 1 106 sends a SIP INVITE to SBC-2 114. The SIP INVITE message includes the proprietary header information received from SBC-1. SBC-2 114 in step 9060 receives the SIP INVITE message, extracts the proprietary header information and stores it in memory. SBC-2 114 responds to the SIP INVITE message to MRF-1 with a SIP 200 OK message. MRF 1 106 receives the 200 OK message and acknowledges it by sending SBC-2 114 a SIP ACK message. Operation proceeds from step 9060 to step 9070.

In step 9070, SBC-2 114 sends PEER B 116 which is the intended receipt device for the call from PEER A 102 a SIP INVITE message as part of the SIP INVITE-200 OK-ACK 9074 exchange illustrated between step 9070 and step 9080. The SIP INVITE message does not contain the information proprietary header or information from the proprietary header sent in the SIP INVITE message from SBC-1. PEER B 116 upon receiving the SIP INVITE message responds with a SIP 200 OK message. SBC-2 114 upon receiving the SIP 200 OK response message from PEER B 116 sends a SIP ACK message to PEER B 116. A first media call flow path has now been established from PEER A 102 to SBC-1 104 to MRF 1 (active MRF which performs transcoding of the media) to SBC-2 114 to PEER B 116.

In addition to the first media call flow path, SBC-1 104 also establishes a second media call flow path via a different MRF, MRF 2 108 before a condition indicative of a failure of MRF 1 106 is detected. The establishment of the second media call flow path via MRF 2 108 begins in step 9100. This second media call flow path may be established in parallel with the establishment of the first media call flow path via MRF 1 106 or after the completion of the establishment of the first media call flow path via MRF 1 106. Operation proceeds from step 9100 to step 9102.

In step 9102, SBC-1 104 generates a SIP INVITE message which includes the SIP proprietary header shown in box 9105, REQUEST-URI: MEDIA-REDIRECTION@SBC1.COM, X-SONUS-TARGET-DIALOG: ID1, and a SDP that will have A =INACTIVE. SBC-1 104 sends the SIP INVITE with the proprietary header to MRF 2 108 as part of the SIP INVITE-200 OK-ACK signals 9104 exchanged between SBC-1 104 and MRF 2 108 in steps 9102 and 9110. SBC-1 104 sends the SIP INVITE with the information included in box 9105 to MRF 2 108. MRF 2 108 receives in step 9110 the SIP INVITE message and responds with a SIP 200 OK message. The SBC-1 104 receives the SIP 200 OK response message and sends to MRF 2 108 a SIP ACK message which is received by MRF 2 108.

After receiving the SIP INVITE message, MRF 2 108 and SBC-2 114 exchange SIP INVITE-200 OK-ACK signals 9124 in steps 9120 and 9130. In step 9120, MRF 2 108 generates a SIP INVITE message which includes the information in box 9105 which was included in the SIP INVITE message received from SBC-1 104. MRF 2 108 then sends the generated SIP INVITE message to SBC-2 114 as part of the SIP INVITE-200 OK-ACK signals 9124. SBC-2 receives the SIP INVITE message. SBC-2 generates and sends a SIP 200 OK response message after receiving the SIP INVITE message to MRF 2 108. MRF 2 108 after receiving the SIP 200 OK message from SBC-2 114 sends an SIP ACK message to SBC-2 114. SBC-2 114 receives the SIP ACK message from MRF 2 in step 9130. Operation proceeds from step 9130 to step 9140. In step 9140, SBC-2 locally processes the SIP INVITE message with the information from box 9105 and does not use this path yet for media cut-through as the SDP indicated that it was inactive. The information received in the SIP message is stored in the SBC-2 114's memory. It should be noted that there is no signaling related to this SIP INVITE message that is propagated to PEER B 116. At this point, a first media call flow path is setup and is active and a second media call flow path is established but is not active. The active media call flow path is via MRF 1 106 and the inactive media call flow path is via MRF 2 108.

SBC-1 104 and SBC-2 114 monitor the media call flow and one of them detects a status condition indicative of a failure of the active MRF, MRF 1 106, the SBC which detects the status condition indicative of a failure redirects the media call flow from the first media call flow path to the second media call flow path. In this example, as described in box 9500, MRF 1 106 fails and SBC-2 114 detects a status condition indicative of a failure of MRF 1 106. The status condition indicative of a failure of MRF 1 106 may be, and in some embodiments is, a period of media activity greater than a threshold value.

Upon the detection by SBC-2 114 of a status condition indicative of a failure of MRF-1 106, operation proceeds to step 9510. In step 9510, SBC-2 114 generates a SIP RE-INVITE signal 9514 including SDP information, SDP is made A=SENDRECV> and sends it to SBC-1 104 via MRF-2 108 and includes the proprietary header information, SBC-1 IP address and dialog-ID=ID1, in the SIP RE-INVITE message. The SIP REINVITE message 9514 is received from SBC-2 114 by MRF 2 108 in step 9530. Operation proceeds from step 9520 to step 9530.

In step 9530, MRF 2 108 generates and sends a SIP RE-INVITE message 9534 with a SDP message indicating that MRF 2 is now active that is the second call media path established for the call is now the active call media path. The SIP RE-INVITE message 9534 also includes the Dialog-ID=ID1 from the SIP RE-INVITE message received from SBC-2 114. MRF 2 108 in step 9530 sends the generated SIP RE-INVITE message 9534 to SBC-1 104. Operation proceeds from step 9530 to step 9540.

In step 9540, SBC-1 104 receives and processes the SIP RE-INVITE message 9534. Using the proprietary header information of Dialog-ID=ID1, SBC-1 identifies the call leg between SBC-1 104 and MRF 1 106 and based on the SDP message indicating that MRF 2 is now the active MRF for the call switches the media for the call from the first media call path toward MRF 1 106 towards the second media call path and MRF 2 108. At this point, the media redirection has been completed with both SBC-1 104 and SBC-2 114 sending media for the call toward MRF 2 108 which is performing the transcoding function for the media of the call. It should be noted that the redirection of the media call flow has been accomplished without the call-leg between SBC-1 104 and the ingress PEER A 102 and the call-leg between SBC-2 114 and the egress PEER B 116 being impacted.

The third portion of the signaling flow will now be explained which shows what the signaling call legs and media path via MRF 2 108 looks like after the media flow redirection from MRF 1 106 to MRF 2 108. Bi-directional arrows 9714, 9724, 9734 and 9744 show the second media call flow path which is now active.

For media for the call which is being sent from PEER A 102 to PEER B 116, the follow steps are implemented. In step 9710, PEER A 102 generates RTP packets containing a media payload and sends them to SBC-1 104. At SBC-1 104 in step 9720, the RTP packets are received and sent to MRF 2 108. In step 9730, the RTP packets are received from SBC-1 104 by MRF 2 108 and the media payloads are transcoded. A new set of RTP packets are generated with the transcoded media payloads and sent to SBC-2 114 from MRF 2 108. In step 9740, the RTP packets are received from MRF 2 108 by SBC-2 114 and are sent to PEER B 116 where they are received and processed in step 9750.

For media for the call which is being sent from PEER B 116 to PEER A 102, the follow steps are implemented. In step 9750, PEER B 116 generates RTP packets containing a media payload and sends them to SBC-2 114. At SBC-2 114 in step 9740, the RTP packets are received and sent to MRF 2 108. In step 9730, the RTP packets are received from SBC-2 114 by MRF-2 108 and the media payloads are transcoded. A new set of RTP packets are generated with the transcoded media payloads and sent to SBC-1 104 from MRF 2 108. In step 9720, the RTP packets are received from MRF 2 108 by SBC-1 104 and are sent to PEER A 102 where they are received and processed in step 9710.

The monitoring and detection of the status condition of the active MRF, e.g., MRF 1 106 in the call flows initially established in the examples of FIGS. 5, 6, and 9 may be performed in a number of different ways. In at least some embodiments, the SBCs performing the monitoring and detection, e.g., SBC-1 and SBC-2 of FIGS. 5, 6, and 9, by maintaining the RTP packet loss count to detect media inactivity based on the IP peer (MRF-1) address at the SBCs. The MRF media addresses are known to the SBCs such that statistics are aggregated at an IP address level rather than on a per stream or call flow level. The SBCs are configured with a threshold value or level of RTP packet losses. If the maintained RTP packet loss crosses, or in some embodiments is equal to, this threshold level the MRF is assumed to be down. That is the SBC has detected a status condition of the MRF indicative of the MRF's failure.

In some embodiments each SBC maintains a RTP packet loss count for each call and hence for the MRFs present in the core network. One can configure a range of threshold values or levels based on the number of calls towards a MRF for faster detection.

Any RTP packet payload format, but most likely audio formats, may include the optional parameters "ptime" to specify the recommended length of time in milliseconds represented by the media in a packet, and/or "maxptime" to specify the maximum amount of media that can be encapsulated in each packet, expressed as time in milliseconds. The RTP packet loss threshold values indicative of failure of an MRF or media content processing device may be, and in some embodiments is, based on one or more RTP packet stream's "ptime" or "maxptime". For example, if ptime is 20 ms for one or more RTP packet audio streams, it may be a genuine case, i.e., not a case indicative of a failure, to not receive RTP packets on a given session—but towards a peer having multiple calls, it is not a practical scenario to not receive RTP packets on all the calls towards a given peer. If the consecutive non-reception of RTP packets for x-number of "ptime" intervals in the case of a single call qualifies for RTP inactivity or media inactivity, the consecutive non-reception of RTP packets for y-number of "ptime" intervals in the case of multiple calls qualifies for RTP inactivity or media inactivity, where y<x. The media loss towards a peer can be detected faster in the case of multiple calls towards a given peer than in the case of a single call toward a given peer. While for a single call, the media loss before detection could be of the order of 6 seconds while for hundreds of calls, the media loss detection could be improved to be of the order of 2 seconds. There is a value in the fact that the more calls in progress the quicker it is to detect a media outage. For a low number of calls, the media inactivity detection may be a bit slower but the number of impacted session is also lower and the outage event is less problematic. If the number of calls routed via a MRF increases, the above mechanism can be used for faster media inactivity detection. Therefore, the media inactivity detection threshold value or level may be based on the number of calls being processed by the MRF or media content processing device. In some such embodiments, the media inactivity threshold value decreases as the number of calls processed by the MRF or media content processing device increases. In some embodiments, the media inactivity threshold value is inversely proportional to the number of call flows or media call flows being processed by the media content processing device or MRF.

In some embodiments, media loss detection, e.g., RTP packet loss detection is based on one or more of the following mechanisms. For media processing entities having fixed rate audio codecs such as for example audio codecs in compliance with the G.711/G.729 standard the RTP packet for Comfort Noise (CN) is sent every 2 seconds. Assuming three consecutive CN packets are lost over during transmission it would mean packet loss detection after 6 seconds. For media content processing entities having variable rate audio codecs such as for example audio codecs in compliance with the Adaptive Multi-Rate (AMR) codec standard, the RTP packet for CN is typically sent after every 8th packet. Assuming three consecutive CN packets are lost during transmission with a ptime of 20 msec, it would mean packet loss detection after 20*3*8=480 msec. For low-bandwidth codecs like AMR, loss of CN packets can be used to detect RTP packet loss. For media content processing entities having video codecs, Immediate Feedback mode may be, and in some embodiments is, used to detect media inactivity or RTP packet loss by using RTCP ACK based mechanisms if RTP/Audio/video Profile Feedback (AVPF) is supported. RTP/Audio/video Profile Feedback is described in the Internet Engineering Task Force Request for Comment (RFC)-4585 entitled, "Extended RTP Profile for Real-time Transport Control Protocol (RTCP)-Based Feedback (RTP/AVPF)". For example, a RTCP ACK is scheduled twice every second for a codec like G.711. Assuming three consecutive RTCP ACK packet losses it would mean detection will occur after 1.5 seconds. A RTP packet loss beyond 5% for at least x number of calls over a window of a time duration of the order of 2-3 seconds from the same IP peer (MRF).

By using one or more of the aforementioned media inactivity detection techniques, an SBC can decrease the RTP/media-inactivity detection interval based on the number of calls anchored at a MRF instance (peer) or media content processing device. This is verified by the peer SBC that is also using its inactivity detection to make a decision whether or not to trigger a switchover to an alternate MRF or media content processing device. It should be noted that in some embodiments, the egress SBC always accepts and triggers a re-anchoring on receiving an INVITE from an ingress SBC.

The foregoing described media inactivity and RTP packet loss detection methods and apparatus may be, and in some embodiments are, utilized in the various exemplary embodiments of present invention described herein.

Figures 7, 7A:
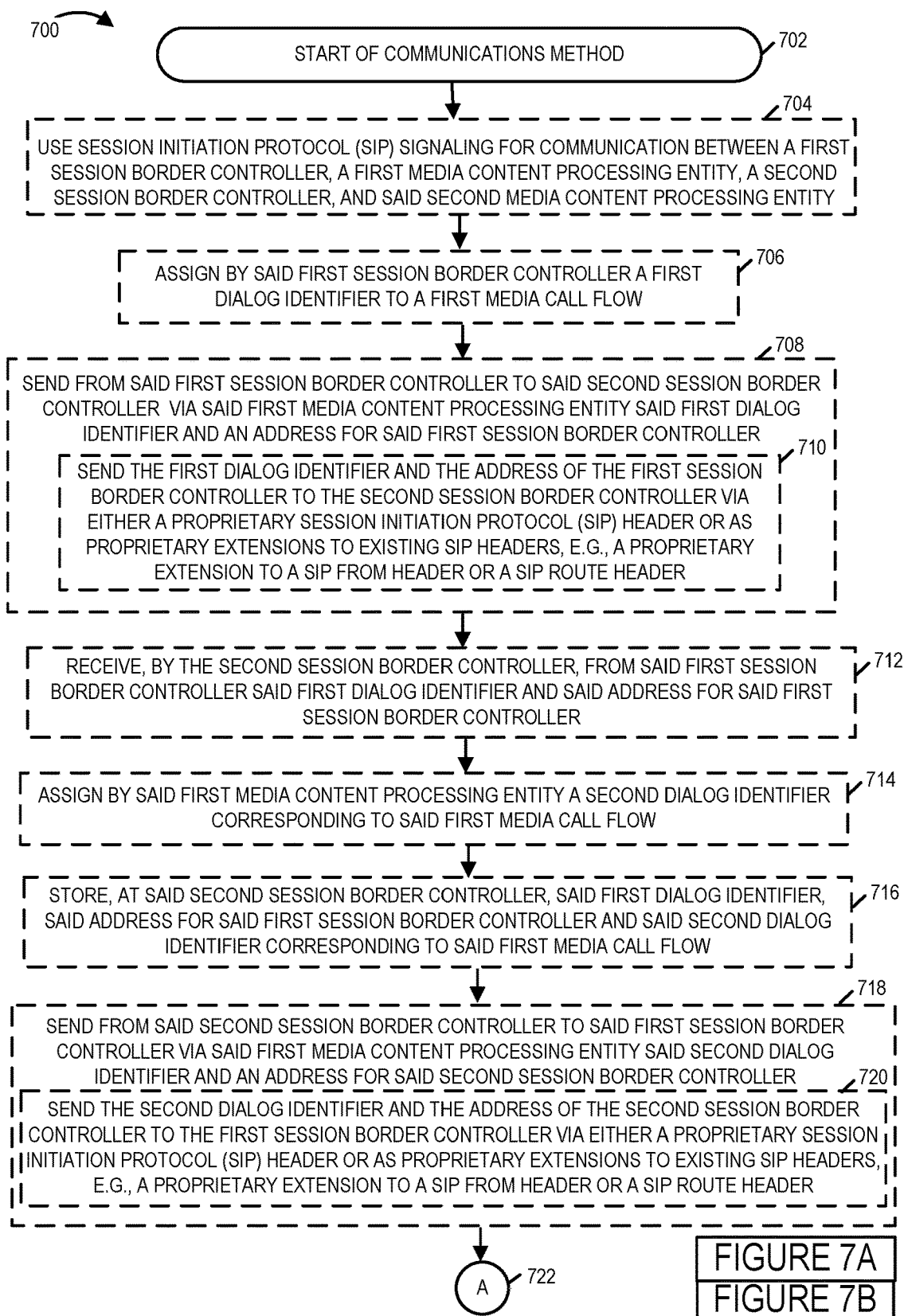
FIG. 7 comprises FIGS. 7A, 7B, and 7C.
FIG. 7A illustrates a first part of an exemplary method in accordance with an exemplary embodiment of the present invention.
Figure 7B:
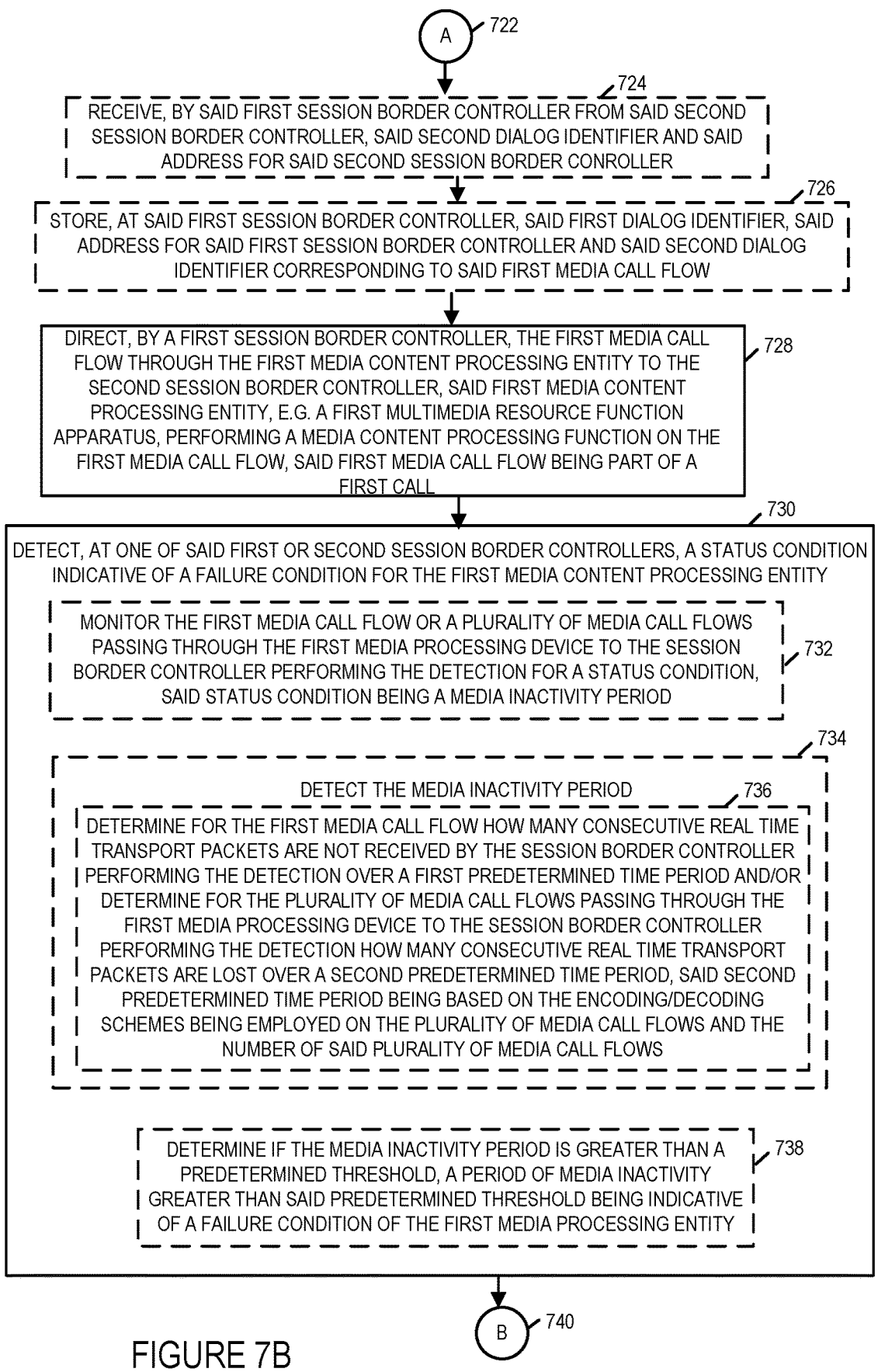
FIG. 7B illustrates a second part of an exemplary method in accordance with an exemplary embodiment of the present invention.
Figure 7C:
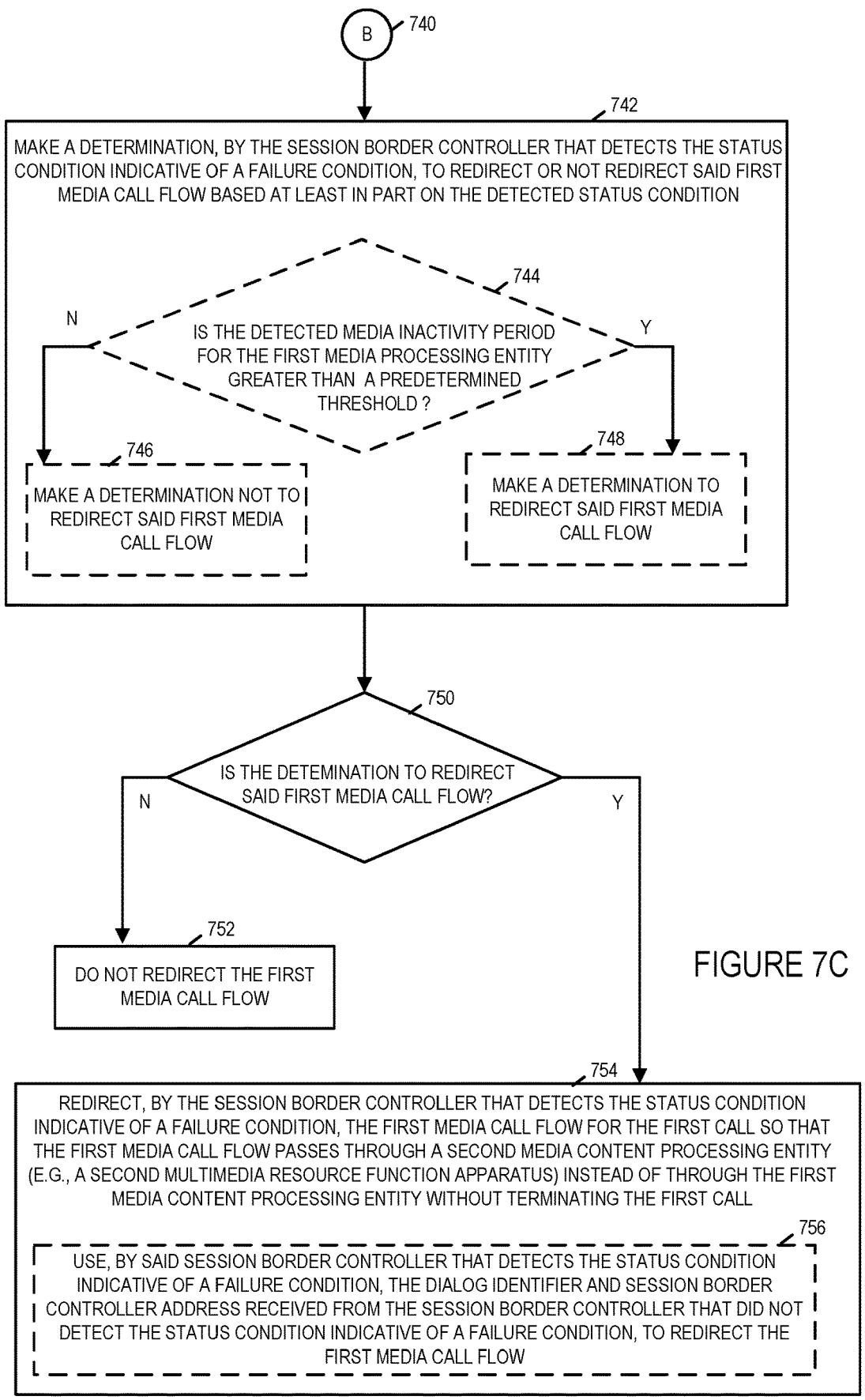
FIG. 7C illustrates a third part of an exemplary method in accordance with an exemplary embodiment of the present invention.

FIG. 7 includes a first part FIG. 7A, a second part FIG. 7B, and a third part FIG. 7C. The flowchart of FIG. 7 illustrates an exemplary communications method 700 in accordance an embodiment of the present invention. In this example, the Session Border Controllers and Media Resource Function devices are implemented in accordance with the Session Border Controller 300 of FIG. 3 and the Media Resource Function 400 of FIG. 4. The communications method 700 starts in start step 702 shown on FIG. 7A. Operation proceeds from step 702 to step 728. In some embodiments prior to proceeding to step 728, one or more of the optional steps 704, 706, 708, 710, 712, 714, 716, 718, 720, 726 are performed. In such a case operation proceeds from step 702 to optional step 704.

In step 704, a first Session Border Controller, a first media content processing entity, a second Session Border Controller, and a second media content processing entity are configured to communicate between one another using Session Initiation Protocol (SIP) signaling. Thereafter, the first Session Border Controller, first media content processing entity, second Session Border Controller, and second media processing entity use SIP signaling for communications between one another. Operation proceeds from step 704 to step 706.

In step 706, the first Session Border Controller assigns a first dialog identifier to a first media call flow. In some embodiments, the first Session Border controller stores the first dialog identifier in memory associated with the session state information associated with the media call flow. Operation proceeds from step 706 to step 708.

In step 708, the first Session Border Controller sends to the second Session Border Controller via the first media content processing entity the first dialog identifier and an address for the first Session Border Controller. In some embodiments, the step 708 includes an optional sub-step 710. In sub-step 710, the first dialog identifier and the address of the first Session Border Controller are sent from the first Session Border Controller to the second Session Border Controller in a SIP signal either in a proprietary SIP header or in one or more proprietary extensions to one or more existing SIP headers such as for example a SIP FROM header or a SIP ROUTE header. Operation proceeds from step 708 to step 712.

In step 712, receive, by the second Session Border Controller, the first dialog identifier for the first media call flow and the address for the first Session Border Controller sent from the first Session Border Controller. Operation proceeds from step 712 to step 714.

In step 714, the first media content processing entity assigns a second dialog identifier corresponding to the first media call flow. Operation proceeds from step 714 to step 716.

In step 716, the second Session Border Controller stores in memory at the second Session Border Controller, the first dialog identifier, the address for the first Session Border Controller and the second dialog identifier corresponding to the first media call flow. In some embodiments, this information is stored in memory with session state information corresponding to the SIP session of which the first media call flow is a part. Operation proceeds from step 716 to step 718.

In step 718, the second Session Border Controller sends to the first Session Border Controller via the first media content processing entity the second dial identifier and an address for the second Session Border Controller. In some embodiments, the step 718 includes an optional sub-step 720. In sub-step 720, the second dialog identifier and the address of the second Session Border Controller are sent from the second Session Border Controller to the first Session Border Controller in a SIP signal either in a proprietary SIP header or in one or more proprietary extensions to one or more existing SIP headers such as for example a SIP FROM header or a SIP ROUTE header. Operation proceeds from step 718 to step 724 shown on FIG. 7b via connection node A 722.

In step 724, the first Session Border Controller receives from the second Session Border Controller the second dialog identifier and the address for the second Session Border Controller. Operation proceeds from step 724 to step 726.

In step 726, the first Session Border Controller stores the first dialog identifier, the second dialog identifier and the address of the second Session order Controller corresponding to the first media call flow in memory. In some embodiments, this information is stored in memory with session state information corresponding to the SIP session of which the first media call flow is a part. Operation proceeds from step 726 to step 728.

In step 728, a first Session Border Controller directs a first media call flow through a first media content processing entity to a second Session Border Controller. In this example, the first media call flow is a part of a first call and the first media content processing entity performs a media content processing function on the first media call flow. Operation proceeds from step 728 to step 730.

In step 730, a status condition indicative of a failure condition for the first media content processing entity is detected at one of said first or second session border controllers. In some embodiments, step 730 includes optional sub-steps 732, 734, and 738. In monitoring sub-step 732, the first media call flow or a plurality of media call flows passing through the first media processing entity to the Session Border Controller performing the detection is monitored for a status condition. The status condition being a media inactivity period. Operation proceeds from sub-step 732 to sub-step 734. In sub-step 734, the media inactivity period is detected by the Session Border Controller performing the detection. In some embodiments, such as for example, those embodiments in which (i) the first media processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets, (iii) the media inactivity period is a period of time during which a consecutive number of the plurality of RTP packets passing through the first media content processing entity are not received by the Session Border Controller, and (iv) the predetermined threshold is determined based on the transcoding function being performed by the first Multimedia Resource Function, sub-step 734 includes optional sub-step 736. In sub-step 736, the detecting the media inactivity period of step 734 includes at least one of determining (i) determining for the first media call flow how many consecutive Real Time Transport Packets are not received by the Session Border Controller performing the detection over a first predetermined time period; or (ii) determining for the plurality of media call flows passing through the first media processing device and to the Session Border Controller performing the detection how many consecutive Real Time Transport Packets are lost over a second predetermined time period. The second predetermined time period being based on the encoding/decoding schemes being employed on the plurality of media call flows and the number of said plurality of media call flows. Operation proceeds from sub-step 734 to sub-step 738.

In sub-step 738, the Session Border Controller that detects the status condition determines if the media inactivity period is greater than a predetermined threshold. A period of media inactivity greater than the predetermined threshold is indicative of a failure condition of the first media processing entity.

Operation proceeds from step 730 via connection node B 740 to step 742 shown on FIG. 7C. In step 742, the Session Border Controller that detects the status condition indicative of a failure condition makes a determination to redirect or not redirect said first media call flow prior to redirecting the call flow for the first call. The determination being based at least in part on the detected status condition. In some embodiments for example those embodiments in which the status condition is a media inactivity period for the first media processing entity, the making a determination to redirect or not to redirect the first media call flow step 742 includes optional sub-steps 744, 746 and 748. In sub-step 744 the Session Border Controller that detects the status condition indicative of a failure condition compares the detected media inactivity period for the first media processing entity to a predetermined threshold. When the result of the comparison in sub-step 744 is that the media inactivity period is greater than the predetermined threshold, operation proceeds from sub-step 744 to sub-step 748. In sub-step 748, the Session Border Controller that detected the status condition indicative of a failure condition makes the determination to redirect the first media call flow. When the result of the comparison in sub-step 744 is that the media inactivity period is not greater than the predetermined threshold, operation proceeds from sub-step 744 to sub-step 746. In sub-step 746, the Session Border Controller that detected the status condition indicative of a failure condition makes the determination not to redirect the first media call flow. Operation proceeds from step 742 to decision step 750.

In decision step 750, if the determination in step 742 was to redirect the first media call flow, operation proceeds from step 750 to step 754. In step 754, the Session Border Controller that detected the status condition indicative of a failure condition redirects the first media call flow for the first call so that the first media call flow passes through a second media content processing entity instead of through the first media content processing entity without terminating the first call. In some embodiments, step 754 includes optional sub-step 756. In optional sub-step 756, the Session Border Controller that detects the status condition indicative of a failure uses the dialog identifier and Session Border Controller address received from the Session Border Controller that did not detect the status condition indicative of a failure condition, to redirect the first media call flow.

In decision step 750, if the determination in step 742 was to not redirect the first media call flow, operation proceeds from step 750 to step 752. In step 752, the Session Border Controller that detected the status condition indicative of a failure condition does not redirect the first media call flow.

In some embodiments, the first and second content media processing entities of the communications method 700 are either Multimedia Resource apparatus or systems or media recording servers or apparatus. In some embodiments, the first content media processing entity does not provide redundancy functionality. In some embodiments, neither the first or second content media processing entities provide redundancy functionality. In some of such embodiments, the first and second media content processing entities are Multimedia Resource Function entities that perform either transcoding, transrating or transizing on at least a portion of the media of the media call flow. In some those embodiments, a media content of the first media call flow includes at least one of audio, video or auxiliary-video, e.g., white board sharing, and the first and second media processing entities perform the transcoding, transrating or transizing on at least a portion of said audio, said video, or said auxiliary-video.

In some embodiments, such as for example, those embodiments in which (i) the first media content processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets, (iii) the media inactivity period is a period of time during which a consecutive number of the plurality of RTP packets passing through the first media content processing entity are not received by the Session, and (iv) the predetermined threshold is determined based on the transcoding function being performed by the first Multimedia Resource Function, the transcoding function being performed resulting in (1) RTP packets for an audio stream being encoded in accordance with a fixed rate audio encoding scheme such as for example used in G.711 ITU-T standard codecs, G.729 ITU-T standard codecs, G.723 ITU-T standard codecs, or Internet Low Bitrate Codecs (iLBCs) or a variable rate audio encoding scheme such as for example used in Adaptive Multi-Rate (AMR) codecs, G.722 ITU-T standard codecs, Enhanced Variable Rate Codecs (EVRC), or Opus codecs, or (2) RTCP (Real-time Transport Control Protocol) feedback packets for a video stream that provide feedback within a range of 0.5 second to 1.5 seconds indicating Packet Loss Indication (PLI), Slice Loss Indication (SLI), and/or Reference Picture Selection Indication (RPSI).

In some embodiments, the predetermined threshold is based on a recommended length of time represented by the media in each RTP packet (ptime) for the encoding scheme being employed or the maximum amount of media that can be encapsulated in each packet expressed as a time for the encoding scheme being employed (maxptime). In some of these embodiments, the predetermined threshold is set to be more than two times the recommended length of time represented by the media in each packet (ptime) or more than two times the maximum amount of media that can be encapsulated in each packet expressed as a time (maxptime). In some embodiments, the predetermined threshold is set to about 3 times the recommended length of time represented by the media in each packet (ptime) or about 3 times the maximum amount of media that can be encapsulated in each packet expressed as a time (maxptime). In some embodiments, the predetermined threshold is set to a time period approximately equal to an expected time for three consecutive CN RTP packets to be received by the Session Border Controller performing the detection in accordance with the encoding scheme employed. In some such embodiments, the predetermined threshold is set to 6 seconds when the transcoding function being performed results in RTP packets for an audio stream being encoded in accordance with a fixed rate audio encoding scheme such as for example used in G.711 ITU-T standard codecs, G.729 ITU-T standard codecs, G.723 ITU-T standard codecs, or Internet Low Bitrate Codecs (iLBCs). In some embodiments, the predetermined threshold is set to 480 milliseconds when the transcoding function being performed results in RTP packets for an audio stream being encoded in accordance with a variable rate audio encoding scheme such as for example used in Adaptive Multi-Rate (AMR) codecs, G.722 ITU-T standard codecs, Enhanced Variable Rate Codecs (EVRC), or Opus codecs. In some embodiments, the predetermined threshold is set to 3 seconds when the transcoding function being performed results in RTCP feedback packets for a video stream.

In some embodiments in which (i) the first media processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets for an audio stream, (iii) the media inactivity period is a period of time during which a consecutive number of the plurality of RTP packets passing through the first media content processing entity are not received by the Session, and (iv) the predetermined threshold is determined based on the transcoding function being performed by the first Multimedia Resource Function, the consecutive number of the plurality of RTP packets passing through the first media content processing entity and not being received by the Session Border Controller performing the detection is the consecutive number of Comfort Noise (CN) RTP packets for the audio stream not received by the Session Border Controller performing the detection from the first media content processing entity, said CN RTP packets being RTP packets carrying a comfort noise payload.

Figures 8, 8A:
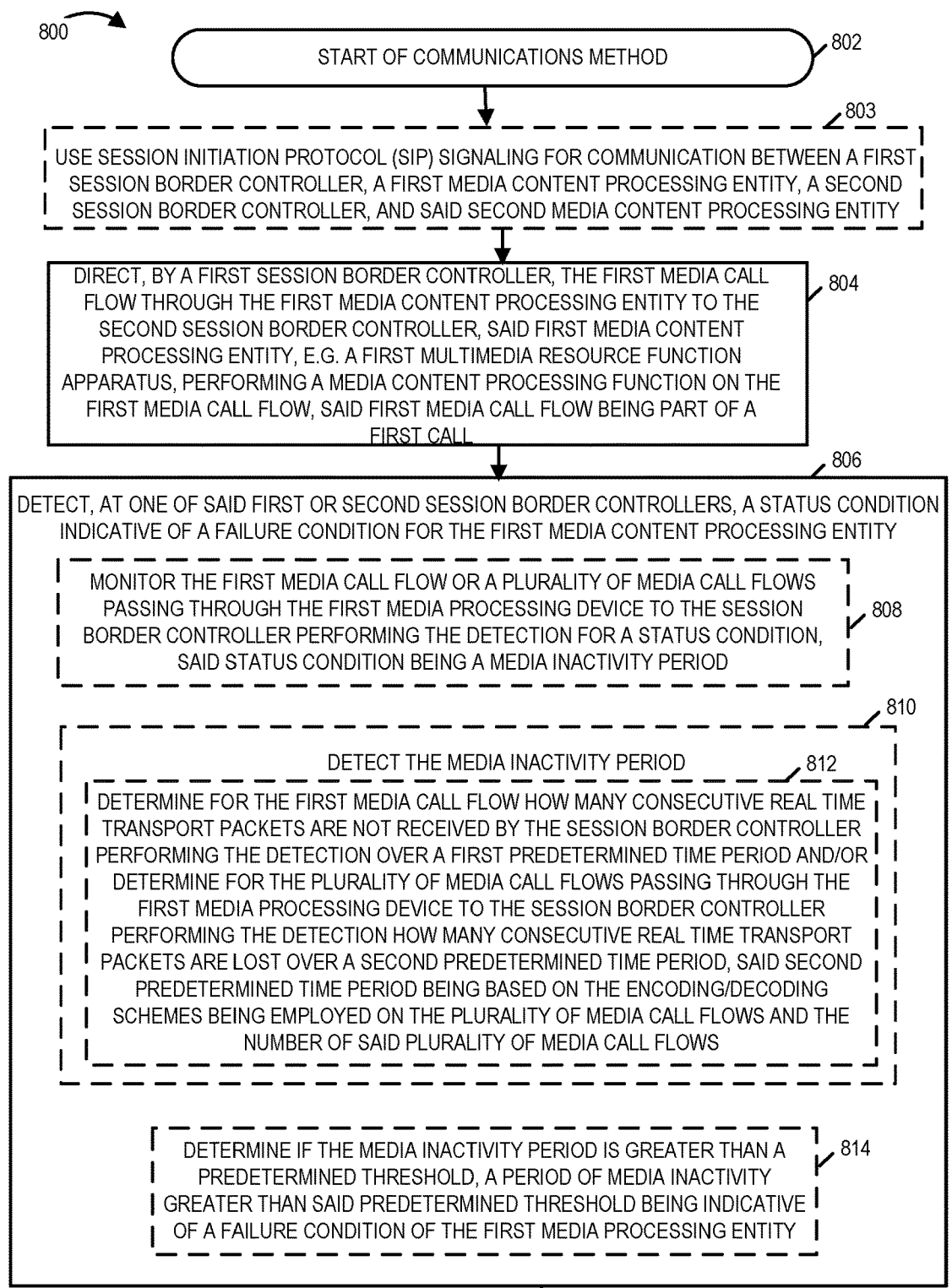
FIG. 8 comprises FIGS. 8A, 8B, and 8C.
FIG. 8A illustrates a first part of an exemplary method in accordance with an exemplary embodiment of the present invention.
Figure 8B:
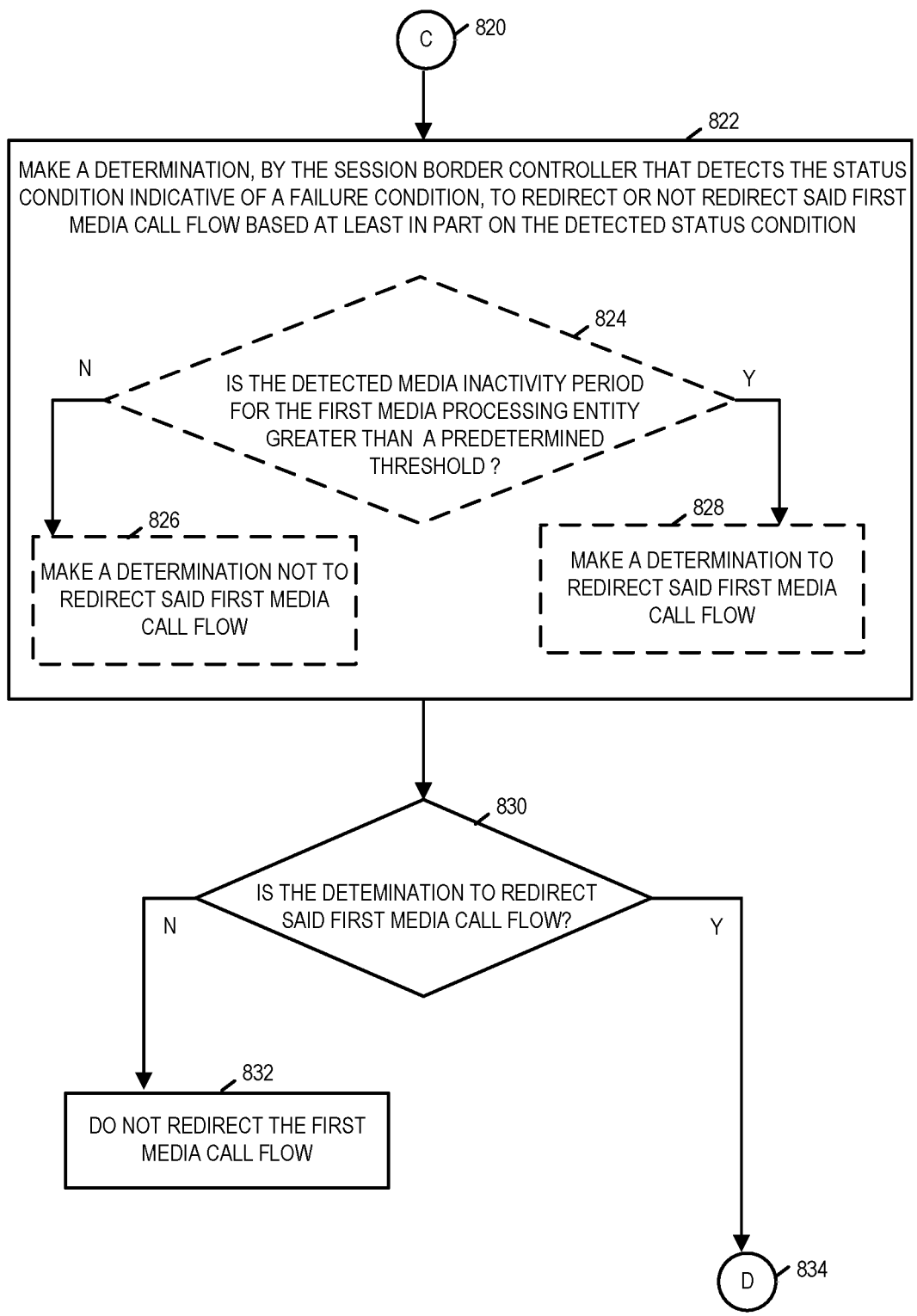
FIG. 8B illustrates a second part of an exemplary method in accordance with an exemplary embodiment of the present invention.
Figure 8C:
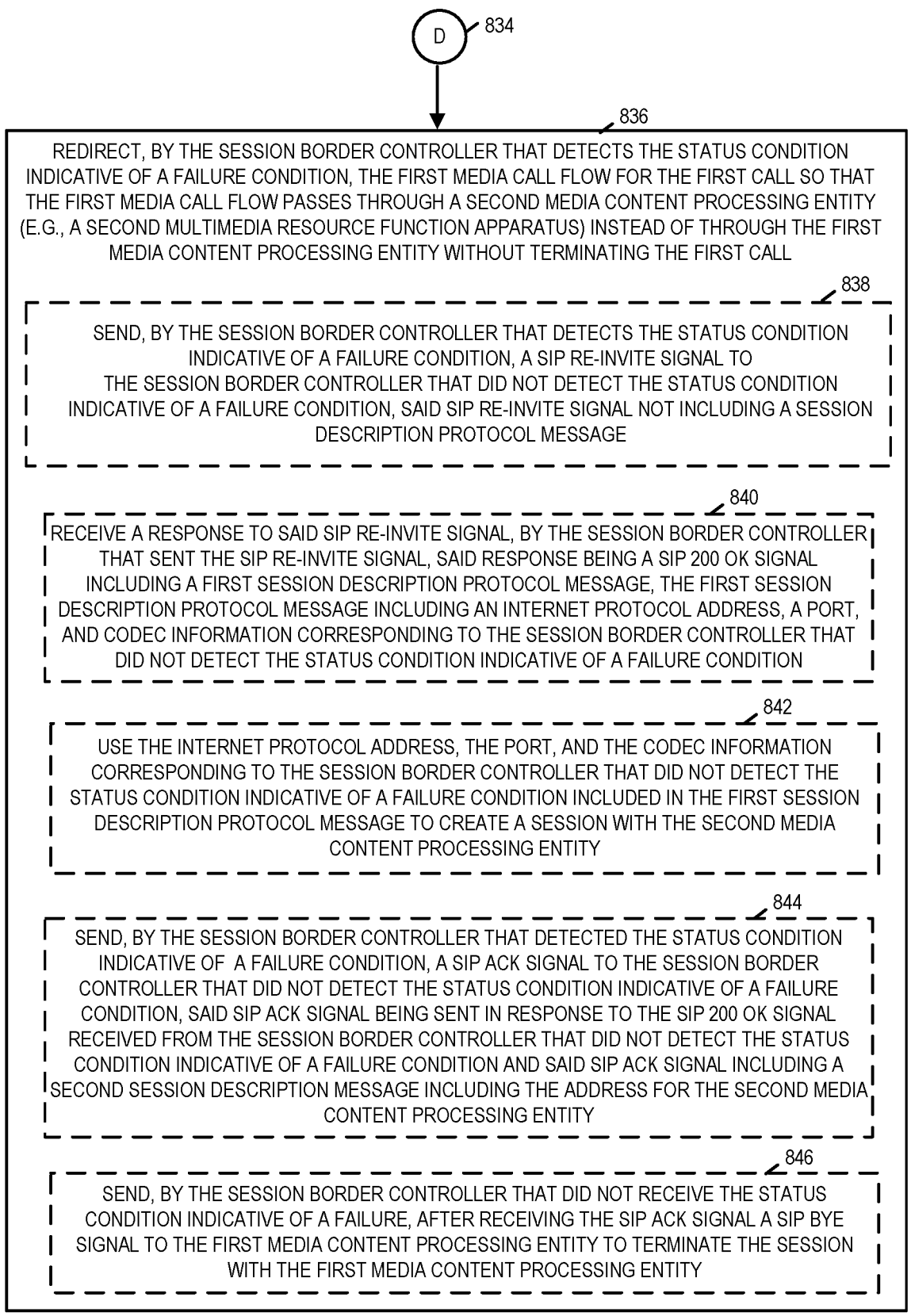
FIG. 8C illustrates a third part of an exemplary method in accordance with an exemplary embodiment of the present invention.

FIG. 8 includes a first part FIG. 8A, a second part FIG. 8B, and a third part FIG. 8C. The flowchart of FIG. 8 illustrates another embodiment of a communications method, communication method 800, in accordance with the present invention. In this example, the Session Border Controllers and Media Resource Function devices are implemented in accordance with the Session Border Controller 300 of FIG. 3 and the Media Resource Function 400 of FIG. 4. The communications method 800 starts in start step 802 shown on FIG. 8A. Operation proceeds from step 802 to step 804. In some embodiments prior to proceeding to step 804, optional step 803 is performed. In such a case operation proceeds from step 802 to optional step 803.

In step 803, a first Session Border Controller, a first media content processing entity, a second Session Border Controller, and a second media content processing entity are configured to communicate between one another using Session Initiation Protocol (SIP) signaling. Thereafter, the first Session Border Controller, first media content processing entity, second Session Border Controller, and second media processing entity use SIP signaling for communications between one another. Operation proceeds from step 803 to step 804.

In step 804, a first Session Border Controller directs a first media call flow through the first media content processing entity to the second Session Border Controller. In this example, the first media call flow is a part of a first call and the first media content processing entity performs a media content processing function on the first media call flow. Operation proceeds from step 804 to step 806.

In step 806, a status condition indicative of a failure condition for the first media content processing entity is detected at one of said first or second session border controllers. In some embodiments, step 806 includes optional sub-steps 808, 810, and 814. In monitoring sub-step 808, the first media call flow or a plurality of media call flows passing through the first media processing entity to the Session Border Controller performing the detection is monitored for a status condition. The status condition being a media inactivity period. Operation proceeds from sub-step 808 to sub-step 810. In sub-step 810, the media inactivity period is detected by the Session Border Controller performing the detection. In some embodiments, such as for example, those embodiments in which (i) the first media processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets, (iii) the media inactivity period is a period of time during which a consecutive number of the plurality of RTP packets passing through the first media content processing entity are not received by the Session Border Controller, and (iv) the predetermined threshold is determined based on the transcoding function being performed by the first Multimedia Resource Function, sub-step 810 includes optional sub-step 812. In sub-step 812, the detecting the media inactivity period of step 810 includes at least one of determining (i) determining for the first media call flow how many consecutive Real Time Transport Packets are not received by the Session Border Controller performing the detection over a first predetermined time period; or (ii) determining for the plurality of media call flows passing through the first media processing device and to the Session Border Controller performing the detection how many consecutive Real Time Transport Packets are lost over a second predetermined time period. The second predetermined time period being based on the encoding/decoding schemes being employed on the plurality of media call flows and the number of said plurality of media call flows. Operation proceeds from sub-step 810 to sub-step 814.

In sub-step 814, the Session Border Controller that detects the status condition determines if the media inactivity period is greater than a predetermined threshold. A period of media inactivity greater than the predetermined threshold is indicative of a failure condition of the first media processing entity. Operation proceeds from step 806 to step 822 shown on FIG. 8B via connection node C 820.

In step 822, the Session Border Controller that detects the status condition indicative of a failure condition makes a determination to redirect or not redirect said first media call flow prior to redirecting the call flow for the first call. The determination being based at least in part on the detected status condition. In some embodiments for example those embodiments in which the status condition is a media inactivity period for the first media processing entity, the making a determination to redirect or not to redirect the first media call flow step 822 includes optional sub-steps 824, 826 and 826. In sub-step 824 the Session Border Controller that detects the status condition indicative of a failure condition compares the detected media inactivity period for the first media processing entity to a predetermined threshold. When the result of the comparison in sub-step 824 is that the media inactivity period is greater than the predetermined threshold, operation proceeds from sub-step 824 to sub-step 828. In sub-step 828, the Session Border Controller that detected the status condition indicative of a failure condition makes the determination to redirect the first media call flow. When the result of the comparison in sub-step 824 is that the media inactivity period is not greater than the predetermined threshold, operation proceeds from sub-step 824 to sub-step 826. In sub-step 826, the Session Border Controller that detected the status condition indicative of a failure condition makes the determination not to redirect the first media call flow. Operation proceeds from step 822 to decision step 830.

In decision step 830, if the determination in step 822 was to redirect the first media call flow, operation proceeds from step 830 to step 836 shown on FIG. 8C via connection node 834. In step 836, the Session Border Controller that detected the status condition indicative of a failure condition redirects the first media call flow for the first call so that the first media call flow passes through a second media content processing entity instead of through the first media content processing entity without terminating the first call. In some embodiments, step 836 includes one or more optional sub-steps 838, 840, 842, 844, 846. In optional sub-step 838, the Session Border Controller that detects the status condition indicative of a failure sends a SIP RE-INVITE signal to the Session Border Controller that did not detect the status condition indicative of a failure condition. The SIP RE-INVITE signal that is sent does not include a session description protocol message. Operation proceeds from sub-step 838 to sub-step 840.

In sub-step 840, the Session Border Controller that sent the SIP RE-INVITE without SDP signal receives a response to the SIP RE-INVITE signal. The response being a SIP 200 OK signal including a first session description protocol message. The first session description protocol message that is received includes an internet protocol address, a port and codec information corresponding to the Session Border Controller that did not detect the status condition indicative of a failure condition. Operation proceeds from sub-step 840 to sub-step 842.

In sub-step 842, the Session Border Controller that receives the 200 OK response to the SIP RE-INVITE message uses the internet protocol address, the port and the codec information corresponding to the Session Border Controller that did not detect the status condition indicative of a failure condition included in the first session description protocol message to create a session with the second media content processing entity. Operation proceeds from sub-step 842 to sub-step 844.

In sub-step 844, the Session Border Controller that detected the status condition indicative of a failure condition sends a SIP ACK signal to the Session Border Controller that did not detect the status condition indicative of a failure condition. The SIP ACK signal being sent in response to the SIP 200 OK signal received from the Session Border Controller that did not detect the status condition indicative of a failure condition. The SIP ACK signal including a second session description message including the address for the second media content processing entity. Operation proceeds from sub-step 844 to sub-step 846.

In sub-step 846, the Session Border Controller that did not receive the status condition indicative of a failure, after receiving the SIP ACK signal sends a SIP BYE signal to the first media content processing entity to terminate the session with the first media content processing entity. It is realized that in many but not necessarily all instances this SIP BYE message may not be received or processed if the first media content processing entity has failed. However, in other instances where there is only a partial failure this message and the message is received by the first media content processing entity it allows for a graceful termination of the session with the first media content processing entity.

In decision step 830, if the determination in step 822 was to not redirect the first media call flow, operation proceeds from step 822 to step 832. In step 832, the Session Border Controller that detected the status condition indicative of a failure condition does not redirect the first media call flow.

Similar to the method 700 in some embodiments, the first and second content media processing entities of the communications method 800 are either Multimedia Resource apparatus or systems or media recording servers or apparatus. In some embodiments, the first content media processing entity does not provide redundancy functionality. In some embodiments, neither the first or second content media processing entities provide redundancy functionality. In some of such embodiments, the first and second media content processing entities are Multimedia Resource Function entities that perform either transcoding, transrating or transizing on at least a portion of the media of the media call flow. In some those embodiments, a media content of the first media call flow includes at least one of audio, video or auxiliary-video, e.g., white board sharing, and the first and second media processing entities perform the transcoding, transrating or transizing on at least a portion of said audio, said video, or said auxiliary-video.

Also in some embodiments, such as for example, those embodiments in which (i) the first media processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets, (iii) the media inactivity period is a period of time during which a consecutive number of the plurality of RTP packets passing through the first media content processing entity are not received by the Session, and (iv) the predetermined threshold is determined based on the transcoding function being performed by the first Multimedia Resource Function, the transcoding function being performed resulting in (1) RTP packets for an audio stream being encoded in accordance with a fixed rate audio encoding scheme such as for example used in G.711 ITU-T standard codecs, G.729 ITU-T standard codecs, G.723 ITU-T standard codecs, or Internet Low Bitrate Codecs (iLBCs) or a variable rate audio encoding scheme such as for example used in Adaptive Multi-Rate (AMR) codecs, G.722 ITU-T standard codecs, Enhanced Variable Rate Codecs (EVRC), or Opus codecs, or (2) RTCP (Real-time Transport Control Protocol) feedback packets for a video stream that provide feedback within a range of 0.5 second to 1.5 seconds indicating Packet Loss Indication (PLI), Slice Loss Indication (SLI), and/or Reference Picture Selection Indication (RPSI).

In some embodiments, the predetermined threshold is based on a recommended length of time represented by the media in each RTP packet (ptime) for the encoding scheme being employed or the maximum amount of media that can be encapsulated in each packet expressed as a time for the encoding scheme being employed (maxptime). In some of these embodiments, the predetermined threshold is set to be more than two times the recommended length of time represented by the media in each packet (ptime) or more than two times the maximum amount of media that can be encapsulated in each packet expressed as a time (maxptime). In some embodiments, the predetermined threshold is set to about 3 times the recommended length of time represented by the media in each packet (ptime) or about 3 times the maximum amount of media that can be encapsulated in each packet expressed as a time (maxptime). In some embodiments, the predetermined threshold is set to a time period approximately equal to an expected time for three consecutive CN RTP packets to be received by the Session Border Controller performing the detection in accordance with the encoding scheme employed. In some such embodiments, the predetermined threshold is set to 6 seconds when the transcoding function being performed results in RTP packets for an audio stream being encoded in accordance with a fixed rate audio encoding scheme such as for example used in G.711 ITU-T standard codecs, G.729 ITU-T standard codecs, G.723 ITU-T standard codecs, or Internet Low Bitrate Codecs (iLBCs). In some embodiments, the predetermined threshold is set to 480 milliseconds when the transcoding function being performed results in RTP packets for an audio stream being encoded in accordance with a variable rate audio encoding scheme such as for example used in Adaptive Multi-Rate (AMR) codecs, G.722 ITU-T standard codecs, Enhanced Variable Rate Codecs (EVRC), or Opus codecs. In some embodiments, the predetermined threshold is set to 3 seconds when the transcoding function being performed results in RTCP feedback packets for a video stream.

In some embodiments in which (i) the first media processing content entity performing a media content processing function on the first media call flow is a first Multimedia Resource Function apparatus or system that performs a transcoding function of the first media call flow, (ii) the first media call flow includes a Real-time Transport Protocol (RTP) packet stream including a plurality of RTP packets for an audio stream, (iii) the media inactivity period is a period of time during which a consecutive number of the plurality of RTP packets passing through the first media content processing entity are not received by the Session, and (iv) the predetermined threshold is determined based on the transcoding function being performed by the first Multimedia Resource Function, the consecutive number of the plurality of RTP packets passing through the first media content processing entity and not being received by the Session Border Controller performing the detection is the consecutive number of Comfort Noise (CN) RTP packets for the audio stream not received by the Session Border Controller performing the detection from the first media content processing entity, said CN RTP packets being RTP packets carrying a comfort noise payload.

FIG. 11 illustrates an assembly of modules 1100 for use in a MRF in accordance with an exemplary embodiment of the present invention. The assembly of modules 1100 may be, and in some embodiments is, used as the assembly of modules 418 in MRF 400 illustrated in FIG. 4. In some embodiments, the assembly of modules 1100 is used as the assembly of modules 419 in MRF 400 illustrated in FIG. 4. In some embodiments, some of the modules of the assembly of modules 1100 are implemented as hardware as part of the assembly of modules 419 and some of the modules of the assembly of modules 1100 are implemented in software as part of the assembly of modules 418. The assembly of modules 1100 includes transcoder modules including audio and video codecs 1102, a dialog identifier assignment module configured to assign one or more dialog identifiers to a first media call flow, a memory storage control module configured to store in memory data/information, e.g., dialog identifiers and contact information for Session Border Controllers such as for example SBC IP addresses and port information, and a RTP and RTCP packet generation module 1108 that is configured to transcode media content received in RTP packets and generate new RTP packets with the transcoded media content and new RTCP packets.

Figure 12B:
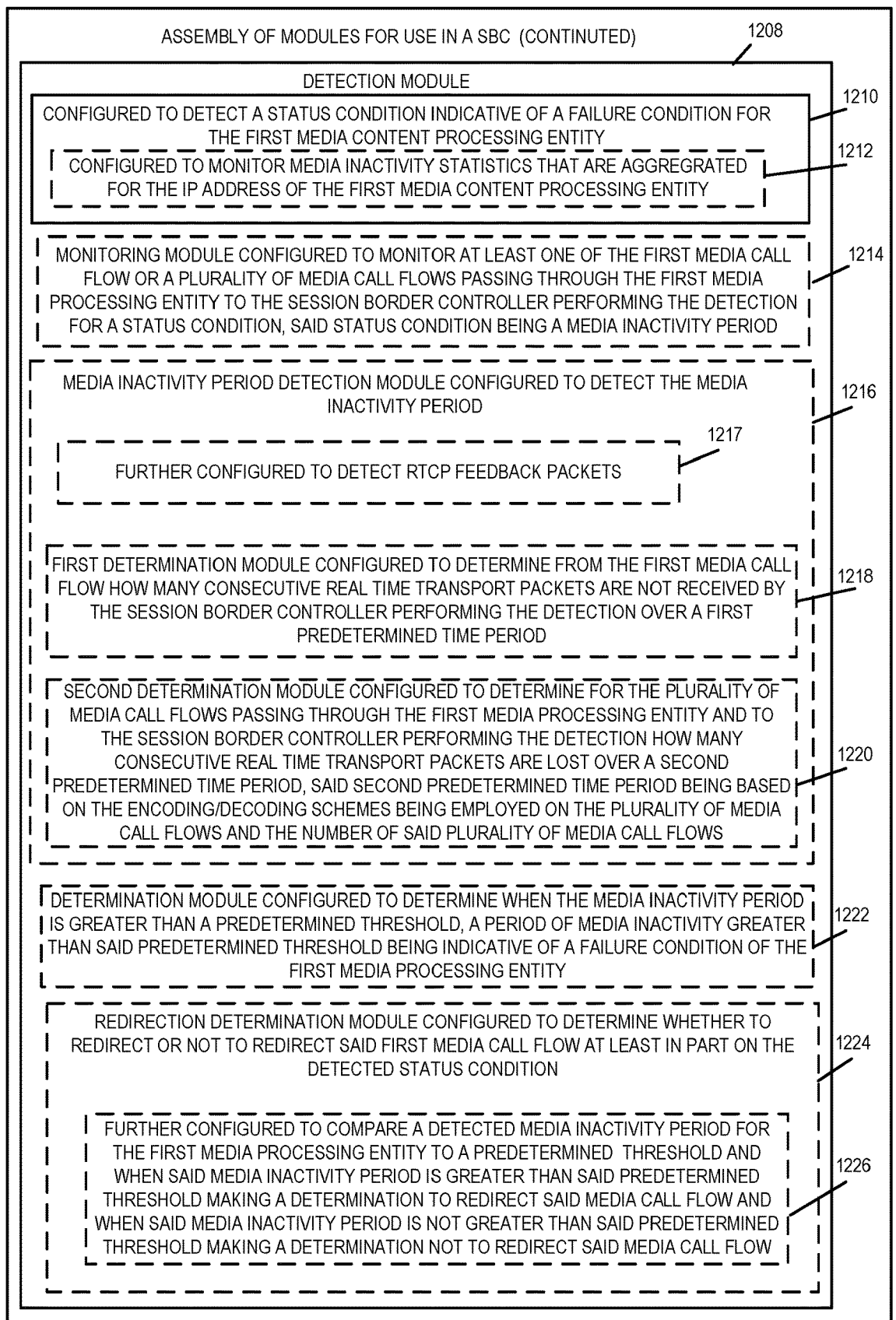
FIG. 12B illustrates a second part of an exemplary assembly of modules for use in a Session Border Controller in accordance with an exemplary embodiment of the present invention.
Figure 12C:
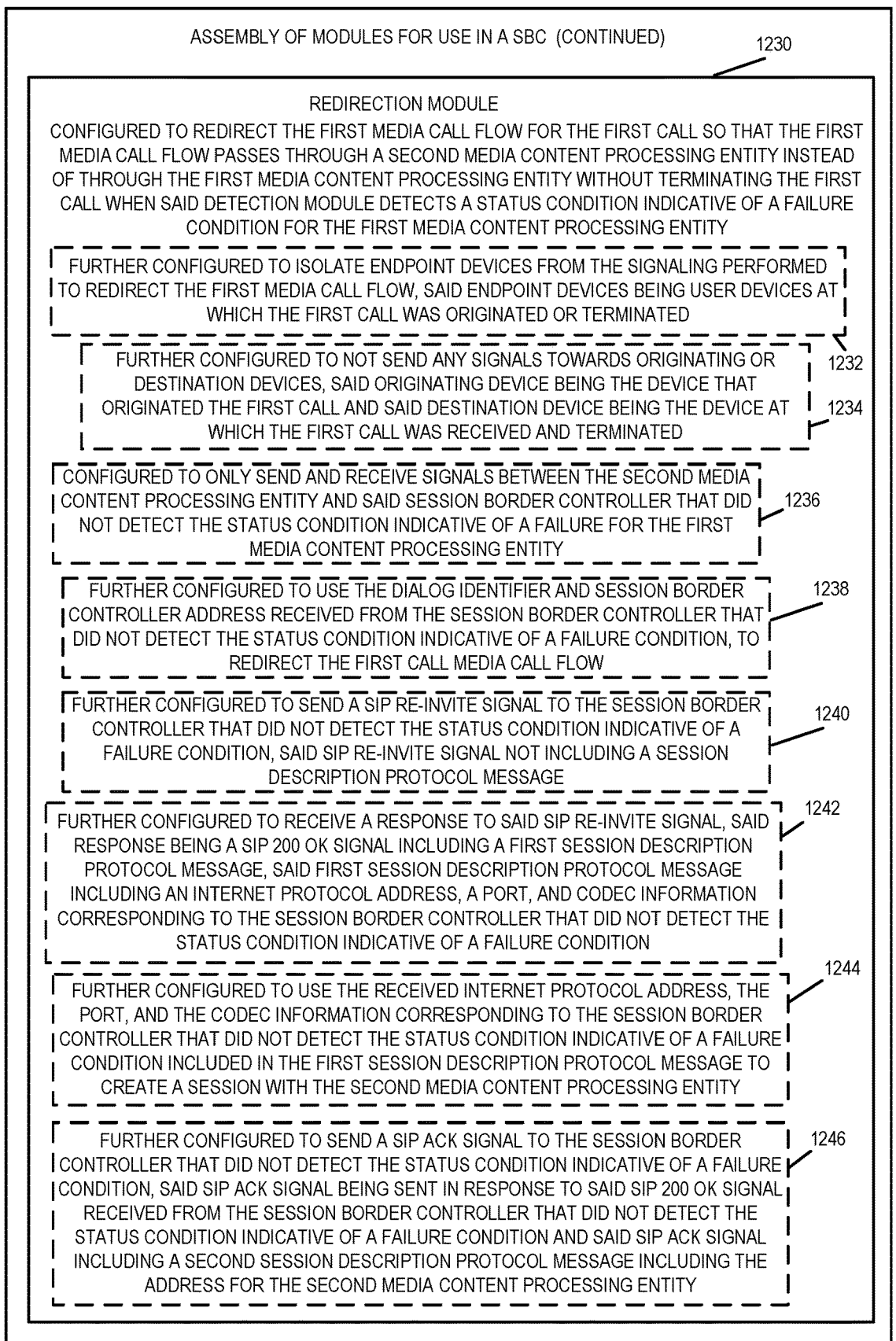
FIG. 12C illustrates a third part of an exemplary assembly of modules for use in a Session Border Controller in accordance with an exemplary embodiment of the present invention.

FIG. 12 which comprises a first part FIG. 12A, a second part FIG. 12B and a third part FIG. 12C illustrates an assembly of modules for use in a SBC in accordance with an exemplary embodiment of the present invention. The assembly of modules 1200 may be, and in some embodiments is, used as the assembly of modules 318 in SBC 300 illustrated in FIG. 3. In some embodiments, the assembly of modules 1200 is used as the assembly of assembly 319 in SBC 300 illustrated in FIG. 3. In some embodiments, some of the modules of the assembly of modules 1200 are implemented as hardware as part of the assembly of modules 319 and some of the modules of the assembly of modules 1200 are implemented in software as part of the assembly of modules 318. The assembly of modules 1200 includes a media call flow direction module 1202 shown on FIG. 12A, an optional dialog identifier assignment module 1202 shown on FIG. 12A, an optional memory storage control module 1206 shown on FIG. 12B, a detection module 1210 shown on FIG. 12B, and a redirection module 1230 shown on FIG. 12C.

The media call flow direction module 1202 is configured to direct a first media call flow through a first media content processing entity to a second Session Border Controller. The optional dialog identifier assignment module 1204 is configured to assign one or more dialog identifiers to a first media call flow. The optional memory storage control module 1206 is configured to store in memory data/information, e.g., dial identifiers, session control data, contact information for SBCs, MRFs such as IP address and port information, SDP messages, and proprietary header information.

The detection control module 1208 shown on FIG. 12B is configured to detect a status condition indicative of a failure condition for the first media content processing entity as shown in box 1210. In some embodiments, the configuration to detect a status condition indicative of a failure condition for the first media content processing entity further includes configuring the detection module to monitor media inactivity statistics that are aggregated for the IP address of the first media content processing entity as shown in box 1212.

In some embodiments, the detection module 1208 includes an optional monitoring module 1214 configured to monitor at least one of the first media call flow or a plurality of media call flows passing through the first media processing entity to the session border controller performing the detection for a status condition, said status condition being a media inactivity period.

In some embodiments, the detection module 1208 includes optional media inactivity period detection module 1216 configured to detect the media inactivity period. In some embodiments, the media inactivity period detection module 1216 is further configured to detect RTCP feedback packets as illustrated in box 1217. In some embodiments, the media inactivity period detection module 1216 includes a first determination module 1218 configured to determine from the first media call flow how many consecutive real time transport packets are not received by the session border controller performing the detection over a first predetermined time period. In some embodiments, the media inactivity period detection module 1216 includes a second determination module 1220 configured to determine for the plurality of media call flows passing through the first media processing entity and to the session border controller performing the detection how many consecutive real time transport packets are lost over a second predetermined time period, said second predetermined time period being based on the encoding/decoding schemes being employed on the plurality of media call flows and the number of said plurality of media call flows.

In some embodiments, the detection module 1208 includes a determination module 1222 configured to determine when the media inactivity period is greater than a predetermined threshold, a period of media inactivity greater than said predetermined threshold being indicative of a failure condition of the first media processing entity.

In some embodiments, the detection module 1208 includes a redirection determination module 1224 configured to determine whether to redirect or not to redirect said first media call flow at least in part on the detected status condition. In some of such embodiments, the redirection determination module is further configured as shown in box 1226 to compare a detected media inactivity period for the first media processing entity to a predetermined threshold and when said media inactivity period is greater than said predetermined threshold making a determination to redirect said media call flow and when said media inactivity period is not greater than said predetermined threshold making a determination not to redirect said media call flow.

The redirection module 1230 illustrated in FIG. 12C is configured to redirect the first media call flow for the first call so that the first media call flow passes through a second media content processing entity instead of through the first media content processing entity without terminating the first call when said detection module detects a status condition indicative of a failure condition for the first media content processing entity. In some embodiments as shown in box 1232, the redirection module 1230 is further configured to isolate endpoint devices from the signaling performed to redirect the first media call flow, said endpoint devices being user devices at which the first call was originated or terminated. In some embodiments as shown in box 1234, the redirection module 1230 is further configured to not send any signals towards originating or destination devices, said originating device being the device that originated the first call and said destination device being the device at which the first call was received and terminated. In some embodiments as shown in box 1236, the redirection module 1230 is configured to only send and receive signals between the second media content processing entity and said session border controller that did not detect the status condition indicative of a failure for the first media content processing entity. In some embodiments as shown in box 1238, the redirection module 1230 is configured to use the dialog identifier and session border controller address received from the session border controller that did not detect the status condition indicative of a failure condition, to redirect the first call media call flow. In some embodiments as shown in box 1240, the redirection module 1230 is further configured to send a SIP RE-INVITE signal to the session border controller that did not detect the status condition indicative of a failure condition, said SIP RE-INVITE signal not including a Session Description Protocol message. In some embodiments as shown in box 1242, the redirection module 1230 is further configured to receive a response to said SIP RE-INVITE signal, said response being a SIP 200 OK signal including a first Session Description Protocol message including an Internet Protocol address, a port and CODEC information corresponding to the session border controller that did not detect the status condition indicative of a failure condition. In some embodiments as shown in box 1244, the redirection module 1230 is further configured to use the received Internet Protocol address, the port and the codec information corresponding to the session border controller that did not detect the status condition indicative of a failure condition included in the first Session Description Protocol message to create a session with the second media content processing entity. In some embodiments as shown in box 1246, redirection module 1230 is further configured to send a SIP ACK signal to the session border controller that did not detect the status condition indicative of a failure condition, said SIP ACK signal being sent in response to said SIP 200 OK signal received from the session border controller that did not detect the status condition indicative of a failure condition and said SIP ACK signal including a second Session Description Protocol message including the address for the second media content processing entity.

Various embodiments of methods in accordance with the present invention will now be described. A first embodiment, embodiment 1, of a communications method comprising: directing, by a first Session Border Controller, a first media call flow through a first media content processing entity to a second Session Border Controller, said first media content processing entity (first Multimedia Resource Function appa-ratus) performing a media content processing function on the first media call flow, said first media call flow being part of a first call; detecting, at one of said first or second Session Border Controllers, a status condition indicative of a failure condition for the first media content processing entity (e.g., a Multimedia Resource Function apparatus); redirecting, by the Session Border Controller that detects the status condition indicative of a failure condition, the first media call flow for the first call so that the first media call flow passes through a second media content processing entity (e.g., a second Multimedia Resource Function apparatus) instead of through the first media content processing entity (first Multimedia Resource Function apparatus) without terminating the first call.

A communications method embodiment 1A including the communications method of embodiment 1 wherein said redirecting of the first media call flow for the first call is performed in a manner that isolates endpoint devices from the signaling to redirect the first media call flow, said endpoint devices being user devices at which the first call was originated or terminated.

A communications method embodiment 1B including the communications method of embodiment 1 wherein redirecting of the first media call flow for the first call is performed without signaling towards originating or destination devices for redirecting the first media call flow, said originating device being the device that originated the first call and said destination device being the device at which the first call was received and terminated.

A communications method embodiment 1C including the communications method of embodiment 1B wherein said redirecting is performed with signaling only between said first Session Border Controller, said second Session Border Controller and second media content processing entities.

A communications method embodiment 1D including the communications method of embodiment 1 further including not notifying either a first or second endpoint device that said first media call flow is being redirected or upon completion of said redirection that the first media call flow has been redirected, said first and second endpoints being devices at which said first call is terminated.

A communications method embodiment 1E including the communications method of embodiment 1 wherein said first media content processing entity has an IP address and said detecting, at one of said first or second Session Border Controllers, a status condition indicative of a failure condition for the first media content processing entity includes monitoring media inactivity statistics that are aggregated for the IP address of the first media content processing entity.

A communications method embodiment 1F including the communications method of embodiment 1E wherein said media inactivity statistics that are aggregated for the IP address of the first media content processing entity are statistics based on the number of packets lost for a plurality of packet streams being received from the first media content processing entity at the Session Border Controller performing the detection.

A communications method embodiment 2 including the communications method of embodiment 1 wherein said first and second media content processing entities are either Multimedia Resource Function apparatus or media recording servers.

A communications method embodiment 2A including the communications method of embodiment 2 wherein said first content media processing entity does not provide redundancy functionality.

A communications method embodiment 2B including the communications method of embodiment 2A wherein said first and second media content processing entities are Multimedia Resource Function entities that perform either transcoding, transrating or transizing on at least a portion of the media of the media call flow.

A communications method embodiment 2BB including the communications method of embodiment 2B wherein a media content of said first media call flow includes at least one of audio, video, or auxiliary-video (white board sharing) and said first and second media processing entities perform said transcoding, transrating or transizing on at least a portion of said audio, said video, or said auxiliary-video.

A communications method embodiment 3 including the communications method of embodiment 1 wherein said detecting, at one of said first or second Session Border Controllers, a status condition indicative of a failure condition for the first media content processing entity includes: monitoring at least one of the first media call flow or a plurality of media call flows passing through the first media processing entity to the Session Border Controller performing the detection for a status condition, said status condition being a media inactivity period; detecting the media inactivity period; determining if the media inactivity period is greater than a predetermined threshold, a period of media inactivity greater than said predetermined threshold being indicative of a failure condition of the first media processing entity.

A communications method embodiment 4 including the communications method of embodiment 3 wherein said first media processing content entity performing a media content processing function on the first media call flow is a first Multimedia Resource Function apparatus that performs a transcoding function on said first media call flow, said first media call flow including a Real Time Transport Protocol (RTP) packet stream including a plurality of RTP packets, said media inactivity period being a period of time during which a consecutive number of the plurality of RTP packets passing through the first media content processing entity are not received by the Session Border Controller performing the detection and said predetermined threshold being determined based on the transcoding function being performed.

A communications method embodiment 4A including the communications method of embodiment 4 wherein detecting said media inactivity period includes at least one of: (i) determining for the first media call flow how many consecutive Real Time Transport Packets are not received by the Session Border Controller performing the detection over a first predetermined time period; or (ii) determining for the plurality of media call flows passing through the first media processing entity and to the Session Border Controller performing the detection how many consecutive Real Time Transport Packets are lost over a second predetermined time period, said second predetermined time period being based on the encoding/decoding schemes being employed on the plurality of media call flows and the number of said plurality of media call flows.

A communications method embodiment 5 including the communications method of embodiment 4, wherein the transcoding function being performed results in RTP packets being encoded by at least one of the following encoding schemes: a fixed rate audio codec encoding scheme, a variable rate audio codec encoding scheme, or a video codec encoding scheme supporting Audio/video Profile Feedback (AVPF).

A communications method embodiment 6 including the communications method of embodiment 5, wherein the predetermined threshold is based on a recommended length of time represented by the media in each RTP packet (ptime) for the encoding scheme being employed or the maximum amount of media that can be encapsulated in each packet expressed as a time for the encoding scheme being employed (maxptime).

A communication method of embodiment 7 including the communications method of embodiment 6 wherein the predetermined threshold is set to be more than two times the recommended length of time represented by the media in each packet (ptime) or more than two times the maximum amount of media that can be encapsulated in each packet expressed as a time (maxptime).

A communications method embodiment 7A including the method of embodiment 7, wherein the predetermined threshold is set to about 3 times the recommended length of time represented by the media in each packet (ptime) or about 3 times the maximum amount of media that can be encapsulated in each packet expressed as a time (maxptime).

A communication method embodiment 8 including the method of embodiment 4 wherein said consecutive number of RTP packets passing through the first media content processing entity and not being received by the Session Border Controller performing the detection is the consecutive number of Comfort Noise (CN) RTP packets not received by the Session Border Controller performing the detection from the first media content processing entity, said CN RTP packets being RTP packets carrying a comfort noise payload for an audio stream.

A communications method embodiment 9 including the method of embodiment 7 wherein the predetermined threshold is set to a time period approximately equal to an expected time for three consecutive CN RTP packets to be received by the Session Border Controller performing the detection in accordance with the encoding scheme employed.

The communications method embodiment 9A including the method of embodiment 9 wherein the predetermined threshold is set to 6 seconds when said codec is a fixed bit rate audio codec and 480 milliseconds when said codec is a variable bit rate audio codec.

The communications method embodiment 9B including the method of embodiment 3 wherein said predetermined threshold is set to 3 seconds, said first media processing content entity performing a media content processing function on the first media call flow is a first Multimedia Resource Function apparatus that performs a video transcoding function on said first media call flow, said first media call flow includes RTP packets with video payloads, and said detecting the media inactivity period includes detecting RTCP feedback packets.

A communications method embodiment 10 including the communications method of embodiment 1 further comprising: making a determination, by the Session Border Controller that detects the status condition indicative of a failure condition, to redirect or not to redirect said first media call flow based at least in part on the detected status condition, said determination being made prior to said redirecting of the first media call flow for the first call.

A communications method embodiment 11 including the communications method of embodiment 10 wherein said status condition is a media inactivity period for the first media processing entity and said making a determination to redirect or not to redirect said first media call flow comprises: comparing, by the Session Border Controller that detects the status condition indicative of a failure condition, the detected media inactivity period for the first media processing entity to a predetermined threshold and when said media inactivity period is greater than said predetermined threshold said Session Border Controller that detects the status condition indicative of a failure condition determines to redirect said media call flow and when said media inactivity interval is not greater than said predetermined threshold said Session Border Controller that detects the status condition indicative of a failure condition determines not to redirect said media call flow.

A communications method embodiment 12 including the communications method of embodiment 1 wherein Session Initiation Protocol (SIP) signaling is used between said first Session Border Controller, said first media content processing entity, said second Session Border Controller and said second media content processing entity, said method further comprising: assigning by said first Session Border Controller a first dialog identifier to the first media call flow; sending from said first Session Border Controller to said second Session Border Controller via said first media content media processing entity said first dialog identifier and an address for said first Session Border Controller; receiving at second Session Border Controller said first dialog identifier and said address for said first Session Border Controller; assigning by said first media content processing device a second dialog identifier to said first media call flow; storing, at said second Session Border Controller, said first dialog identifier, said address for said first Session Border Controller and said second dialog identifier corresponding to said first media call flow; sending from said second Session Border Controller to said first Session Border Controller via said first media content processing entity said second dialog identifier and an address for said second Session Border Controller; receiving, at said first Session Border Controller, said second dialog identifier and said address for said second Session Border Controller; storing, at said first Session Border Controller, said first dialog identifier, said address for said second Session Border Controller and said second dialog identifier corresponding to said first media call flow; and using, by said Session Border Controller that detects the status condition indicative of a failure condition, the dialog identifier and Session Border Controller address received from the Session Border Controller that did not detect the status condition indicative of a failure condition, to redirect the first call flow media.

A communications method embodiment 13 including the communications method of embodiment 12 wherein the first dialog identifier and the address of the first Session Border Controller are sent to the second Session Border Controller via either a proprietary Session Initiation Protocol (SIP) header or as proprietary extensions to existing SIP headers.

A communications method embodiment 14 including the communications method of embodiment 13 wherein the existing SIP header is a SIP From header or a SIP Route header.

A communications method embodiment 15 including the communications method of embodiment 1 wherein Session Initiation Protocol (SIP) signaling is used between said first Session Border Controller, said first media content processing entity, said second Session Border Controller and said second media content processing entity and wherein said redirecting includes: sending, by said Session Border Controller that detects the status condition indicative of a failure condition, a SIP RE-INVITE signal to the Session Border Controller that did not detect the status condition indicative of a failure condition, said SIP RE-INVITE signal not including a Session Description Protocol message; receiving a response to said SIP RE-INVITE signal, by the Session Border Controller that sent the SIP RE-INVITE signal, said response being a SIP 200 OK signal including a first Session Description Protocol message, said first Session Description Protocol message including an Internet Protocol Address, a Port, and Codec information corresponding to the Session Border Controller that did not detect the status condition indicative of a failure condition; and using, the Internet Protocol Address, the Port, and the Codec information corresponding to the Session Border Controller that did not detect the status condition indicative of a failure condition included in the first Session Description Protocol message to create a session with the second media content processing entity.

A communications method embodiment 16 including the communications method of embodiment 15 wherein said redirecting further includes: sending, by said Session Border Controller that detected the status condition indicative of a failure condition, a SIP ACK signal to the Session Border Controller that did not detect the status condition indicative of a failure condition, said SIP ACK signal being sent in response to said SIP 200 OK signal received from the Session Border Controller that did not detect the status condition indicative of a failure condition and said SIP ACK signal including a second Session Description message including the address for the second media content processing entity.

Various embodiments of systems in accordance with the present invention will now be described. A first communications system embodiment, communications system embodiment 1, comprising: a first Session Border Controller including a media call flow direction module configured to direct a first media call flow through a first media content processing entity to a second Session Border Controller, said first media call flow being part of a first call; said second Session Border Controller including an Input/Output interface configured to receive said first media call flow; said first media content processing entity (first Multimedia Resource Function apparatus) configured to perform a media content processing function on the first media call flow; and at least one of said first and second Session Border Controllers including a detection module configured to detect a status condition indicative of a failure condition for the first media content processing entity (Multimedia Resource Function apparatus) and a redirection module configured to redirect the first media call flow for the first call so that the first media call flow passes through a second media content processing entity (second Multimedia Resource Function apparatus) instead of through the first media content processing entity (first Multimedia Resource Function apparatus) without terminating the first call when said detection module detects a status condition indicative of a failure condition for the first media content processing entity.

A communications system embodiment 1A including the communications system embodiment 1 wherein said redirection module is further configured to isolate endpoint devices from the signaling performed to redirect the first media call flow, said endpoint devices being user devices at which the first call was originated or terminated.

A communications system embodiment 1B including the communications system embodiment 1 wherein said redirection module is further configured to not send any signals towards originating or destination devices, said originating device being the device that originated the first call and said destination device being the device at which the first call was received and terminated.

A communications system embodiment 1C including the communications system embodiment 1B wherein said redirection module is configured to only send and receive signals between the second media content processing entity and said Session Border Controller that did not detect the status condition indicative of a failure for the first media content processing entity.

A communication systems embodiment 1D including the communications systems embodiment 1 wherein said first and second Session Border Controllers are configured to not notify either a first or second endpoint device that said first media call flow is being redirected or upon completion of said redirection that the first media call flow has been redirected, said first and second endpoints being devices at which said first call is terminated.

A communication system embodiment 1E including the communications system embodiment 1 wherein said first media content processing entity has an IP address and wherein configuring said detection module to detect a status condition indicative of a failure condition for the first processing entity includes configuring said detection module to monitor media inactivity statistics that are aggregated for the IP address of the first media content processing entity.

A communications system embodiment 1F including the communications system embodiment 1E wherein said media inactivity statistics that are aggregated for the IP address of the first media content processing entity are statistics based on the number of packets lost for a plurality of packet streams being received from the first media content processing entity at the Session Border Controller performing the detection.

A communications system embodiment 2 including the communications system embodiment 1 wherein said first and second media content processing entities are either Multimedia Resource Function apparatus or media recording servers.

A communications system embodiment 2A including the communications system embodiment 2 wherein said first content media processing entity does not provide redundancy functionality.

A communications system embodiment 2B including the communications system embodiment 2A wherein said first and second media content processing entities are Multimedia Resource Function entities that perform either transcoding, transrating or transizing on at least a portion of the media of the media call flow.

A communications system embodiment 2BB including the communications system embodiment 2B wherein a media content of said first media call flow includes at least one of audio, video, or auxiliary-video (white board sharing) and said first and second media processing entities are configured to perform said transcoding, transrating or transizing on at least a portion of said audio, said video, or said auxiliary-video.

A communications system embodiment 3 including the communications system embodiment 1 wherein said detection module includes: a monitoring module configured to monitor at least one of the first media call flow or a plurality of media call flows passing through the first media processing entity to the Session Border Controller performing the detection for a status condition, said status condition being a media inactivity period; a media inactivity period detection module configured to detect the media inactivity period; a determination module configured to determine when the media inactivity period is greater than a predetermined threshold, a period of media inactivity greater than said predetermined threshold being indicative of a failure condition of the first media processing entity.

A communications system embodiment 4 including the communications system embodiment 3, wherein said first media content processing entity configured to perform a media content processing function on the first media call flow is a first Multimedia Resource Function apparatus configured to perform a transcoding function on said first media call flow, said first media call flow including a Real Time Transport Protocol (RTP) packet stream including a plurality of RTP packets, said media inactivity period being a period of time during which a consecutive number of the plurality of RTP packets passing through the first media content processing entity are not received by the Session Border Controller performing the detection and said predetermined threshold being determined based on the transcoding function being performed.

A communications system embodiment 4A including the communications system embodiment 4 wherein said media inactivity period detection module includes at least one of: (i) a first determination module configured to determine from the first media call flow how many consecutive Real Time Transport Packets are not received by the Session Border Controller performing the detection over a first predetermined time period; or (ii) a second determination module configured to determine for the plurality of media call flows passing through the first media processing entity and to the Session Border Controller performing the detection how many consecutive Real Time Transport Packets are lost over a second predetermined time period, said second predetermined time period being based on the encoding/decoding schemes being employed on the plurality of media call flows and the number of said plurality of media call flows.

A communications system embodiment 5 including the communications system embodiment 4, wherein said first media processing entity includes a fixed rate audio codec, a variable rate audio codec, or a video codec supporting Audio/video Profile Feedback.

A communications system embodiment 6 including the communications system embodiment 4, wherein the predetermined threshold is based on a recommended length of time represented by the media in each RTP packet (ptime) for an encoding scheme being employed to encode said RTP packets or the maximum amount of media that can be encapsulated in each packet expressed as a time for the encoding scheme being employed (maxptime) to encode said RTP packets.

A communications system embodiment 7 including the communications system embodiment 6 wherein the predetermined threshold is set to be more than two times the recommended length of time represented by the media in each packet (ptime) or more than two times the maximum amount of media that can be encapsulated in each packet expressed as a time (maxptime).

A communications system embodiment 7A including the communications system embodiment 7, wherein the predetermined threshold is set to about 3 times the recommended length of time represented by the media in each packet (ptime) or about 3 times the maximum amount of media that can be encapsulated in each packet expressed as a time (maxptime).

A communications system embodiment 8 including the communications system embodiment 4 wherein said consecutive number of RTP packets passing through the first media content processing entity and not being received by the Session Border Controller performing the detection is the consecutive number of Comfort Noise (CN) RTP packets not received by the Session Border Controller performing the detection from the first media content processing entity, said CN RTP packets being RTP packets carrying a comfort noise payload for an audio stream.

A communications system embodiment 9 including the communications system embodiment 7 wherein the predetermined threshold is set to a time period approximately equal to an expected time for three consecutive CN RTP packets to be received by the Session Border Controller performing the detection in accordance with the encoding scheme employed.

A communications system embodiment 9A including the communications system embodiment 9 wherein the predetermined threshold is set to 6 seconds when said codec is a fixed bit rate audio codec and 480 milliseconds when said codec is a variable bit rate audio codec.

A communications system embodiment 9B including the communications system embodiment 3 wherein said predetermined threshold is set to 3 seconds, said first media processing content entity configured to perform a media content processing function on the first media call flow is a first Multimedia Resource Function apparatus configured to perform a video transcoding function on said first media call flow, said first media call flow includes RTP packets with video payloads, and said media inactivity period detection module is further configured to detect RTCP feedback packets.

A communications system embodiment 10 including the communications system embodiment 1 wherein said detection module further comprises: a redirection determination module configured to determine whether to redirect or not to redirect said first media call flow based at least in part on the detected status condition.

A communications system embodiment 11 including the communications system embodiment 10 wherein said status condition is a media inactivity period for the first media processing entity and wherein configuring said redirection determination module to determine whether to redirect or not to redirect said first media call flow comprises: configuring said redirection determination module to compare a detected media inactivity period for the first media processing entity to a predetermined threshold and when said media inactivity period is greater than said predetermined threshold making a determination to redirect said media call flow and when said media inactivity period is not greater than said predetermined threshold making a determination not to redirect said media call flow.

A communications system embodiment 12 including the communications system embodiment 1 wherein Session Initiation Protocol (SIP) signaling is used between said first Session Border Controller, said first media content processing entity, said second Session Border Controller and said second media content processing entity, said communications system further comprising: a dialog identifier assignment module included in said first Session Border Controller, said dialog assignment module configured to assign a first dialog identifier to the first media call flow; an Input/Output Interface included in said first Session Border Controller configured to send from said first Session Border Controller to said second Session Border Controller via said first media content media processing entity said first dialog identifier and an address for said first Session Border Controller; said Input/Output Interface included in said second Session Border Controller further configured to receive said first dialog identifier and said address for said first Session Border Controller; a dialog identifier assignment module included in said first media content processing device configured to assign a second dialog identifier to said first media call flow; a memory storage control module included in said second Session Border Controller configured to store in memory at said second Session Border Controller, said first dialog identifier, said address for said first Session Border Controller and said second dialog identifier corresponding to said first media call flow; said Input/Output Interface included in said second Session Border Controller further configured to send from said second Session Border Controller to said first Session Border Controller via said first media content processing entity said second dialog identifier and an address for said second Session Border Controller; said Input/Output Interface included in said first Session Border Controller further configured to receive said second dialog identifier and said address for said second Session Border Controller; a memory storage control module included in said first Session Border Controller configured to store in memory at said first Session Border Controller, said first Session Border Controller, said first dialog identifier, said address for said second Session Border Controller and said second dialog identifier corresponding to said first media call flow; and said redirection module further configured to use the dialog identifier and Session Border Controller address received from the Session Border Controller that did not detect the status condition indicative of a failure condition, to redirect the first media call flow.

A communications system embodiment 13 including the communications system embodiment 12 wherein the first dialog identifier and the address of the first Session Border Controller are sent to the second Session Border Controller via either a proprietary Session Initiation Protocol (SIP) header or as proprietary extensions to existing SIP headers.

A communications system embodiment 14 including the communications system embodiment 13 wherein the existing SIP header is a SIP From header or a SIP Route header.

A communications system embodiment 15 including the communications system embodiment 1 wherein Session Initiation Protocol (SIP) signaling is used between said first Session Border Controller, said first media content processing entity, said second Session Border Controller and said second media content processing entity and wherein said media redirection module is configured as part of said first media call flow redirection to: (i) send a SIP RE-INVITE signal to the Session Border Controller that did not detect the status condition indicative of a failure condition, said SIP RE-INVITE signal not including a Session Description Protocol message, (ii) receive a response to said SIP RE-INVITE signal, said response being a SIP 200 OK signal including a first Session Description Protocol message, said first Session Description Protocol message including an Internet Protocol Address, a Port, and Codec information corresponding to the Session Border Controller that did not detect the status condition indicative of a failure condition; and (iii) use the received Internet Protocol Address, the Port, and the Codec information corresponding to the Session Border Controller that did not detect the status condition indicative of a failure condition included in the first Session Description Protocol message to create a session with the second media content processing entity.

A communications system embodiment 16 including the communications system embodiment 15 wherein said media redirection module is further configured as part of said first media call flow redirection to: send a SIP ACK signal to the Session Border Controller that did not detect the status condition indicative of a failure condition, said SIP ACK signal being sent in response to said SIP 200 OK signal received from the Session Border Controller that did not detect the status condition indicative of a failure condition and said SIP ACK signal including a second Session Description Protocol message including the address for the second media content processing entity.

The techniques of various embodiments may be implemented using software, hardware and/or a combination of software and hardware. Various embodiments are directed to apparatus, e.g., communications device such as a session border controllers, e.g., a session border controller, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The aforementioned method embodiments and accompanying method claims present elements of the various steps in a sample order, and are not meant to be limited to the specific order or hierarchy presented.

In various embodiments devices described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware, e.g., circuits, or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller (SBC) including a processor configured to implement one, multiple or all of the steps of one or more methods of the invention.

In some embodiments, the processor or processors, e.g., CPUs, of one or more devices, e.g., of the communications device, e.g., session border controller, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, with a processor which includes a module corresponding to each of the steps of the various described methods performed by the device in which the processor is included. In some but not all embodiments an apparatus, e.g., a communications device, e.g., a session border controller, includes a module corresponding to each of the steps of the various described methods performed by the device in which the processor is included. The modules may be implemented using software and/or hardware. The hardware may be circuits, ASICs or other specialized or dedicated circuitry.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   directing, by a first Session Border Controller, a first media call flow through a first media content processing entity to a second Session Border Controller, said first media content processing entity performing a media content processing function on media of the first media call flow, said first media call flow being part of a first call, said media content processing function being one of transcoding, transrating or transizing at least a portion of the media of the first media call flow, said media of said first media call flow including at least one of audio, video or auxiliary-video;
   detecting, at one of said first or second Session Border Controllers, a status condition indicative of a failure condition for the first media content processing entity;
   redirecting, by the Session Border Controller that detects the status condition indicative of a failure condition, the first media call flow for the first call so that the first media call flow passes through a second media content processing entity instead of through the first media content processing entity without terminating the first call;
   wherein said first media content processing entity has an Internet Protocol address; and
   wherein detecting, at one of said first or second Session Border Controllers, a status condition indicative of a failure condition for the first media content processing entity includes monitoring media inactivity statistics that are aggregated for the Internet Protocol address of the first media content processing entity.

2. The communications method of claim 1,
wherein said first media content processing entity performing a media content processing function on the first media call flow is a first Multimedia Resource Function apparatus that performs a transcoding function on at least a portion of the media of said first media call flow, said first media call flow including a Real Time Transport Protocol (RTP) packet stream including a plurality of RTP packets; and
wherein said media inactivity statistics that are aggregated for the Internet Protocol address of the first media content processing entity are statistics based on the number of packets lost for a plurality of packet streams being received from the first media content processing entity at the Session Border Controller performing the detection.

3. The communications method of claim 2, wherein the transcoding function being performed results in RTP packets being encoded by at least one of the following encoding schemes: a fixed rate audio codec encoding scheme, a variable rate audio codec encoding scheme, or a video codec encoding scheme supporting Audio/Video Profile Feedback (AVPF).

4. The communications method of claim 1 further comprising:
making a determination, by the Session Border Controller that detects the status condition indicative of a failure condition, to redirect or not to redirect said first media call flow based at least in part on the detected status condition, said determination being made prior to said redirecting of the first media call flow for the first call.

5. A communications method comprising:
directing, by a first Session Border Controller, a first media call flow through a first media content processing entity to a second Session Border Controller, said first media content processing entity performing a media content processing function on media of the first media call flow, said first media call flow being part of a first call, said media content processing function being one of transcoding, transrating or transizing at least a portion of the media of the first media call flow, said media of said first media call flow including at least one of audio, video or auxiliary-video;
detecting, at one of said first or second Session Border Controllers, a status condition indicative of a failure condition for the first media content processing entity;
redirecting, by the Session Border Controller that detects the status condition indicative of a failure condition, the first media call flow for the first call so that the first media call flow passes through a second media content processing entity instead of through the first media content processing entity without terminating the first call;
wherein Session Initiation Protocol (SIP) signaling is used between said first Session Border Controller, said first media content processing entity, said second Session Border Controller and said second media content processing entity, said method further comprising:
assigning by said first Session Border Controller a first dialog identifier to the first media call flow;
sending from said first Session Border Controller to said second Session Border Controller via said first media content processing entity said first dialog identifier and an address for said first Session Border Controller;
receiving at said second Session Border Controller said first dialog identifier and said address for said first Session Border Controller;
assigning by said first media content processing entity a second dialog identifier to said first media call flow;
storing, at said second Session Border Controller, said first dialog identifier, said address for said first Session Border Controller and said second dialog identifier corresponding to said first media call flow;
sending from said second Session Border Controller to said first Session Border Controller via said first media content processing entity said second dialog identifier and an address for said second Session Border Controller;
receiving, at said first Session Border Controller, said second dialog identifier and said address for said second Session Border Controller;
storing, at said first Session Border Controller, said first dialog identifier, said address for said second Session Border Controller and said second dialog identifier corresponding to said first media call flow; and
using, by said Session Border Controller that detects the status condition indicative of a failure condition, the dialog identifier and Session Border Controller address received from the Session Border Controller that did not detect the status condition indicative of a failure condition, to redirect the first call flow media.

6. The communications method of claim 5, wherein the first dialog identifier and the address of the first Session Border Controller are sent to the second Session Border Controller via either a proprietary Session Initiation Protocol (SIP) header or as proprietary extensions to existing SIP headers.

7. A communications method comprising:
directing, by a first Session Border Controller, a first media call flow through a first media content processing entity to a second Session Border Controller, said first media content processing entity performing a media content processing function on media of the first media call flow, said first media call flow being part of a first call, said media content processing function being one of transcoding, transrating or transizing at least a portion of the media of the first media call flow, said media of said first media call flow including at least one of audio, video or auxiliary-video;
detecting, at one of said first or second Session Border Controllers, a status condition indicative of a failure condition for the first media content processing entity;
redirecting, by the Session Border Controller that detects the status condition indicative of a failure condition, the first media call flow for the first call so that the first media call flow passes through a second media content processing entity instead of through the first media content processing entity without terminating the first call;
wherein Session Initiation Protocol (SIP) signaling is used between said first Session Border Controller, said first media content processing entity, said second Session Border Controller and said second media content processing entity and wherein said redirecting includes:
sending, by said Session Border Controller that detects the status condition indicative of a failure condition, a SIP RE-INVITE signal to the Session Border Controller that did not detect the status condition indicative of a failure condition, said SIP RE-INVITE signal not including a Session Description Protocol message;

receiving a response to said SIP RE-INVITE signal, by the Session Border Controller that sent the SIP RE-INVITE signal, said response being a SIP 200 OK signal including a first Session Description Protocol message, said first Session Description Protocol message including an Internet Protocol Address, a Port, and Codec information corresponding to the Session Border Controller that did not detect the status condition indicative of a failure condition; and using, the Internet Protocol Address, the Port, and the Codec information corresponding to the Session Border Controller that did not detect the status condition indicative of a failure condition included in the first Session Description Protocol message to create a session with the second media content processing entity.

8. A communications system comprising:
a first Session Border Controller including memory and a media call flow direction module configured to direct a first media call flow through a first media content processing entity to a second Session Border Controller, said first media call flow being part of a first call;
said second Session Border Controller including memory and an Input/Output interface configured to receive said first media call flow;
said first media content processing entity configured to perform a media content processing function on media of the first media call flow, said media content processing function being one of transcoding, transrating or transizing at least a portion of the media of the first media call flow, said media of said first media call flow including at least one of audio, video or auxiliary-video; and
at least one of said first and second Session Border Controllers including a detection module configured to detect a status condition indicative of a failure condition for the first media content processing entity and a redirection module configured to redirect the first media call flow for the first call so that the first media call flow passes through a second media content processing entity instead of through the first media content processing entity without terminating the first call when said detection module detects a status condition indicative of a failure condition for the first media content processing entity;
wherein said first media content processing entity has an Internet Protocol address; and
wherein said detection module is further configured to monitor media inactivity statistics that are aggregated for the Internet Protocol address of the first media content processing entity.

9. The communications system of claim 8, wherein said first media content processing entity includes a fixed rate audio codec, a variable rate audio codec, or a video codec supporting Audio/Video Profile Feedback.

10. A communications system comprising:
a first Session Border Controller including memory and a media call flow direction module configured to direct a first media call flow through a first media content processing entity to a second Session Border Controller, said first media call flow being part of a first call;
said second Session Border Controller including memory and an Input/Output interface configured to receive said first media call flow;
said first media content processing entity configured to perform a media content processing function on media of the first media call flow, said media content processing function being one of transcoding, transrating or transizing at least a portion of the media of the first media call flow, said media of said first media call flow including at least one of audio, video or auxiliary-video; and
at least one of said first and second Session Border Controllers including a detection module configured to detect a status condition indicative of a failure condition for the first media content processing entity and a redirection module configured to redirect the first media call flow for the first call so that the first media call flow passes through a second media content processing entity instead of through the first media content processing entity without terminating the first call when said detection module detects a status condition indicative of a failure condition for the first media content processing entity;
wherein Session Initiation Protocol (SIP) signaling is used between said first Session Border Controller, said first media content processing entity, said second Session Border Controller and said second media content processing entity, said communications system further comprising:
a dialog identifier assignment module included in said first Session Border Controller, said dialog identifier assignment module configured to assign a first dialog identifier to the first media call flow;
an Input/Output Interface included in said first Session Border Controller configured to send from said first Session Border Controller to said second Session Border Controller via said first media content processing entity said first dialog identifier and an address for said first Session Border Controller;
said Input/Output Interface included in said second Session Border Controller further configured to receive said first dialog identifier and said address for said first Session Border Controller;
a dialog identifier assignment module included in said first media content processing entity configured to assign a second dialog identifier to said first media call flow;
a memory storage control module included in said second Session Border Controller configured to store in said memory of said second Session Border Controller, said first dialog identifier, said address for said first Session Border Controller and said second dialog identifier corresponding to said first media call flow;
said Input/Output Interface included in said second Session Border Controller further configured to send from said second Session Border Controller to said first Session Border Controller via said first media content processing entity said second dialog identifier and an address for said second Session Border Controller;
said Input/Output Interface included in said first Session Border Controller further configured to receive said second dialog identifier and said address for said second Session Border Controller;
a memory storage control module included in said first Session Border Controller configured to store in said memory of said first Session Border Controller, said first dialog identifier, said address for said second Session Border Controller and said second dialog identifier corresponding to said first media call flow; and
said redirection module further configured to use the dialog identifier and Session Border Controller address received from the Session Border Controller that did not detect the status condition indicative of a failure condition, to redirect the first media call flow.

11. The communications system of claim 10 wherein the first dialog identifier and the address of the first Session Border Controller are sent to the second Session Border Controller via either a proprietary Session Initiation Protocol (SIP) header or as proprietary extensions to existing SIP headers.

12. A communications system comprising:
a first Session Border Controller including memory and a media call flow direction module configured to direct a first media call flow through a first media content processing entity to a second Session Border Controller, said first media call flow being part of a first call;
said second Session Border Controller including memory and an Input/Output interface configured to receive said first media call flow;
said first media content processing entity configured to perform a media content processing function on media of the first media call flow, said media content processing function being one of transcoding, transrating or transizing at least a portion of the media of the first media call flow, said media of said first media call flow including at least one of audio, video or auxiliary-video; and
at least one of said first and second Session Border Controllers including a detection module configured to detect a status condition indicative of a failure condition for the first media content processing entity and a redirection module configured to redirect the first media call flow for the first call so that the first media call flow passes through a second media content processing entity instead of through the first media content processing entity without terminating the first call when said detection module detects a status condition indicative of a failure condition for the first media content processing entity;
wherein Session Initiation Protocol (SIP) signaling is used between said first Session Border Controller, said first media content processing entity, said second Session Border Controller and said second media content processing entity and wherein said media redirection module is configured as part of said first media call flow redirection to:
(i) send a SIP RE-INVITE signal to the Session Border Controller that did not detect the status condition indicative of a failure condition, said SIP RE-INVITE signal not including a Session Description Protocol message;
(ii) receive a response to said SIP RE-INVITE signal, said response being a SIP 200 OK signal including a first Session Description Protocol message, said first Session Description Protocol message including an Internet Protocol Address, a Port, and Codec information corresponding to the Session Border Controller that did not detect the status condition indicative of a failure condition; and
(iii) use the received Internet Protocol Address, the Port, and the Codec information corresponding to the Session Border Controller that did not detect the status condition indicative of a failure condition included in the first Session Description Protocol message to create a session with the second media content processing entity.

13. A non-transitory computer readable medium including a first set of computer executable instructions which when executed by a processor of a first Session Border Controller cause the first Session Border Controller to:
direct a first media call flow through a first media content processing entity to a second Session Border Controller, said first media content processing entity performing a media content processing function on media of the first media call flow, said first media call flow being part of a first call, said media content processing function being one of transcoding, transrating or transizing at least a portion of the media of the first media call flow, said media of said first media call flow including at least one of audio, video or auxiliary-video;
detect at the first Session Border Controller a status condition indicative of a failure condition for the first media content processing entity;
redirect the first media call flow for the first call so that the first media call flow passes through a second media content processing entity instead of through the first media content processing entity without terminating the first call;
wherein said first media content processing entity has an Internet Protocol address; and
wherein said to detect at the first Session Border Controller a status condition indicative of a failure condition for the first media content processing entity includes monitoring media inactivity statistics that are aggregated for the Internet Protocol address of the first media content processing entity.

14. The communications method of claim 1, wherein redirecting of the first media call flow for the first call is performed without signaling towards originating or destination devices for redirecting the first media call flow, said originating device being the device that originated the first call and said destination device being the device at which the first call was received and terminated.

15. The communications method of claim 1, wherein said first and second media content processing entities are either Multimedia Resource Function apparatus or media recording servers.

16. The communications method of claim 5,
wherein said first media processing content entity performing a media content processing function on the first media call flow is a first Multimedia Resource Function apparatus that performs a transcoding function on at least a portion of the media of said first media call flow, said first media call flow including a Real Time Transport Protocol (RTP) packet stream including a plurality of RTP packets for an audio stream; and
wherein said detecting the status condition indicative of a failure condition includes determining for the first media call flow how many consecutive Comfort Noise RTP packets are not received by the Session Border Controller performing the detection over a first predetermined time period, said Comfort Noise packets being RTP packets carrying a comfort noise payload.

17. The communication method of claim 7, wherein said first and second media content processing entities are either Multimedia Resource Function apparatus or media recording servers.

18. The communications method of claim 7,
wherein said first media processing content entity performing a media content processing function on the first media call flow is a first Multimedia Resource Function apparatus that performs a transcoding function on at least a portion of the media of said first media call flow, said first media call flow including a Real Time Transport Protocol (RTP) packet stream including a plurality of RTP packets for an audio stream; and
wherein said detecting the status condition indicative of a failure condition includes determining for the first media call flow how many consecutive Comfort Noise RTP packets are not received by the Session Border Controller performing the detection over a first predetermined time period, said Comfort Noise packets being RTP packets carrying a comfort noise payload.

19. The communications system of claim 8, wherein said redirection module is further configured to not send any signals toward originating or destination devices, said originating device being the device that originated the first call and said destination device being the device at which the first call was received and terminated.

20. The communications system of claim 8, wherein said first and second media content processing entities are either Multimedia Resource Function apparatus or media recording servers.

* * * * *